United States Patent [19]

Matsumoto et al.

[11] Patent Number: 5,648,050

[45] Date of Patent: *Jul. 15, 1997

[54] METAL CARRIER

[75] Inventors: Toshiki Matsumoto, Kariya; Tetsuya Toyao, Toyoake; Tetsuya Nakamura, Chiryu; Shigeru Maehara, Kariya; Hiromasa Aoki, Nagoya; Tatsuya Fujita; Senta Tojo, both of Kariya; Kinji Hodaira, Okazaki; Takeshi Matsui, Toyohashi; Yushi Fukuda, Chita-gun, all of Japan

[73] Assignee: Nippondenso Co., Ltd., Japan

[*] Notice: The term of this patent shall not extend beyond the expiration date of Pat. No. 5,599,509.

[21] Appl. No.: 213,806

[22] Filed: Mar. 16, 1994

[30] Foreign Application Priority Data

Mar. 17, 1993 [JP] Japan .................... 5-56908
Dec. 24, 1993 [JP] Japan .................... 5-350447

[51] Int. Cl.$^6$ .................... F01N 3/28; B01J 35/02
[52] U.S. Cl. .................... 422/180; 422/169; 422/170; 422/177; 422/179; 502/439; 502/527; 60/299
[58] Field of Search .................... 422/179, 180, 422/177, 169, 170; 502/439, 527; 60/299; 428/593

[56] References Cited

U.S. PATENT DOCUMENTS

| | | | |
|---|---|---|---|
| 4,152,302 | 5/1979 | Nonnenmann et al. | 502/527 |
| 4,162,993 | 7/1979 | Retallick | 502/527 |
| 4,186,172 | 1/1980 | Scholz | 422/180 |
| 4,282,186 | 8/1981 | Nonnenmann et al. | 422/180 |
| 4,400,860 | 8/1983 | Nonnenmann et al. | 29/890 |
| 4,519,120 | 5/1985 | Nonnenmann et al. | 29/890 |
| 4,647,435 | 3/1987 | Nonnenmann | 422/180 |
| 4,753,918 | 6/1988 | Cyron | 502/439 |
| 4,886,711 | 12/1989 | Foldvary | 502/527 |
| 4,958,428 | 9/1990 | Humpolik | 422/180 |
| 4,987,034 | 1/1991 | Hitachi et al. | 502/527 |
| 5,079,210 | 1/1992 | Kaji et al. | 502/527 |
| 5,278,125 | 1/1994 | Iida et al. | 502/527 |
| 5,403,559 | 4/1995 | Swars | 422/180 |

FOREIGN PATENT DOCUMENTS

| | | |
|---|---|---|
| 8908738.0 | 9/1989 | Germany . |
| 453450 | 5/1992 | Japan . |
| 462316 | 5/1992 | Japan . |
| 478939 | 7/1992 | Japan . |
| 478938 | 7/1992 | Japan . |
| 557197 | 3/1993 | Japan . |
| 5184938 | 7/1993 | Japan . |
| 92/02716 | 2/1992 | WIPO . |
| 92/13635 | 8/1992 | WIPO . |

*Primary Examiner*—Robert J. Warden
*Assistant Examiner*—Hien Tran
*Attorney, Agent, or Firm*—Cushman Darby & Cushman Intellectual Property Group of Pillsbury Madison & Sutro, LLP

[57] ABSTRACT

It is the primary object of the present invention to provide a catalyst converter which can hold a sufficient amount of catalyst to raise the temperature thereof to the catalyst activation temperature in a short time without enlarging the metal carrier itself. The metal carrier 1 is arranged in the course of an exhaust manifold 3 of an engine 2 and is composed of an alternating winding of a flat sheet 7 and a corrugated sheet 8, wherein slit parts 9 are formed in the flat sheet 7 and the corrugated sheet 8 of the metal carrier 1 in an end portion thereof, on the side the engine 2.

12 Claims, 48 Drawing Sheets

METAL CARRIER

This application claims the benefit of the prior application Nos.5-56908 and 5-350447 filed respectively in Japan on Mar. 17, 1993 and Dec. 24, 1993 the content of which are incorporated hereinto by reference.

BACKGROUND OF THE INVENTION

1. Field of the Invention

The present invention generally relates to a metal carrier. More particularly, the present invention relates to a metal carrier which is arranged in some place within an exhaust gas passage of an internal combustion engine for holding back a catalyst which is capable of reducing the exhaust gas from an internal combustion engine.

2. Description of the Related Art

Conventionally, metal carriers made of metal foils of band-like flat sheet and corrugated sheet wound or laminated together, such as the one disclosed in the Japanese Utility Model Publication Laid-Open No. 4-62316. On the other hand, a metal carrier provided with slit parts throughout metal foils, constructing the metal carrier holding the catalyst has been disclosed in the Japanese Examined Patent Publication No. 3-71177.

However, the metal carrier disclosed in the Japanese Utility Model Publication Laid-Open No. 4-62316 has a problem that this catalyst has so large a heat capacity that, at a low temperature, it takes a long time to achieve the temperature at which the catalyst is active, and as a result, until the catalyst is activated, unreduced exhaust gas from the internal combustion engine is exhausted into the atmosphere.

On the other hand, the metal carrier disclosed in the Japanese Examined Patent Publication No. 3-71177 has a problem that the strength of metal carrier itself is weakened by the slit parts formed throughout the metal foil.

SUMMARY OF THE INVENTION

An object of the present invention is to provide an improved metal carrier which can rapidly achieve the temperature at which the catalyst held by the metal carrier is active and, at the same time, has a high strength without enlarging the size thereof.

It is the first preferable mode of the present invention to provide a metal carrier for a catalyst converter which is composed of a flat sheet and a corrugated sheet alternatingly laminated, arranged in the course of an exhaust gas passage of an internal combustion engine, and a plurality of slit parts is formed on the metal carrier at only the upstream side of the exhaust gas passage.

It is the second preferable mode of the present invention to provide a metal carrier for a catalyst converter which is arranged in the course of an exhaust gas passage of an internal combustion engine, and includes a small heat capacity area formed only at the upstream side of the exhaust gas passage which is smaller in heat capacity than the downstream side of the exhaust gas passage.

By employing the above arrangement to embody the first preferable mode of the present invention, a plurality of slit parts are formed only at the upstream side of the exhaust gas passage of the metal carrier. Therefore, the heat capacity is so small only at this upstream side that the temperature of the metal carrier can easily be raised by the exhaust gas from the internal combustion engine.

After easily raising the temperature of the upstream side, the heat can easily be conducted to the downstream side of the metal carrier.

Furthermore, due to the composition with slit parts formed only at the upstream side, the high strength of the metal carrier can be obtained.

The second preferable mode of the present invention forms a small heat capacity area only at the upstream side of the exhaust gas passage of the metal carrier. Therefore, at the upstream side, the temperature of the metal carrier can easily be raised by the exhaust gas from the internal combustion engine.

After the temperature of the upstream side has easily been raised, the heat can easily be conducted to the downstream from the metal carrier by the flow of the exhaust gas.

Furthermore, due to the composition with slit parts formed only at the upstream side, the high strength of the metal carrier can be obtained.

By employing the present invention, a metal carrier which can hold a catalyst, can rapidly raise the temperature of the catalyst to activate the catalyst, and has a sufficient strength.

DETAILED DESCRIPTION OF THE EMBODIMENTS

First Embodiment

Figure 1:
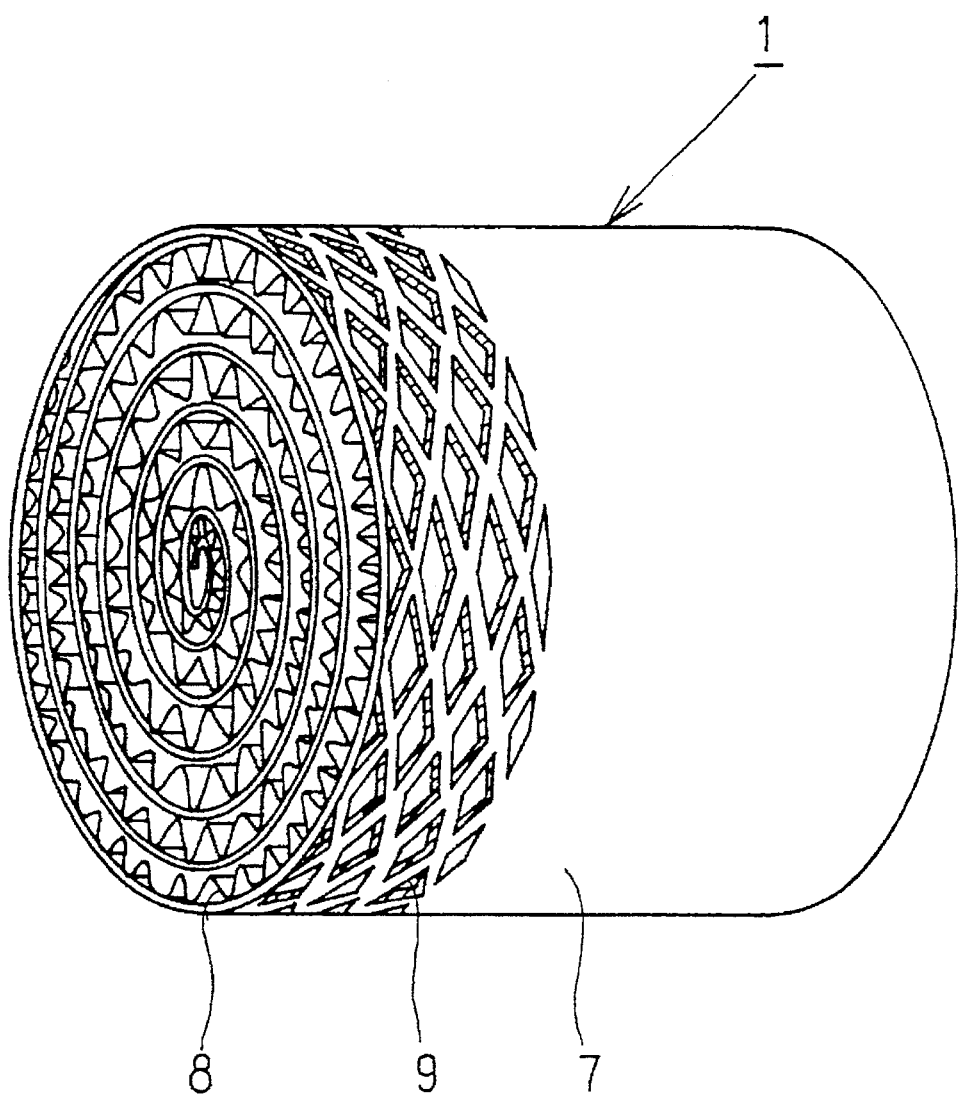
FIG. 1 is a perspective view illustrating the metal carrier of the first embodiment according to the present invention.
Figure 2:
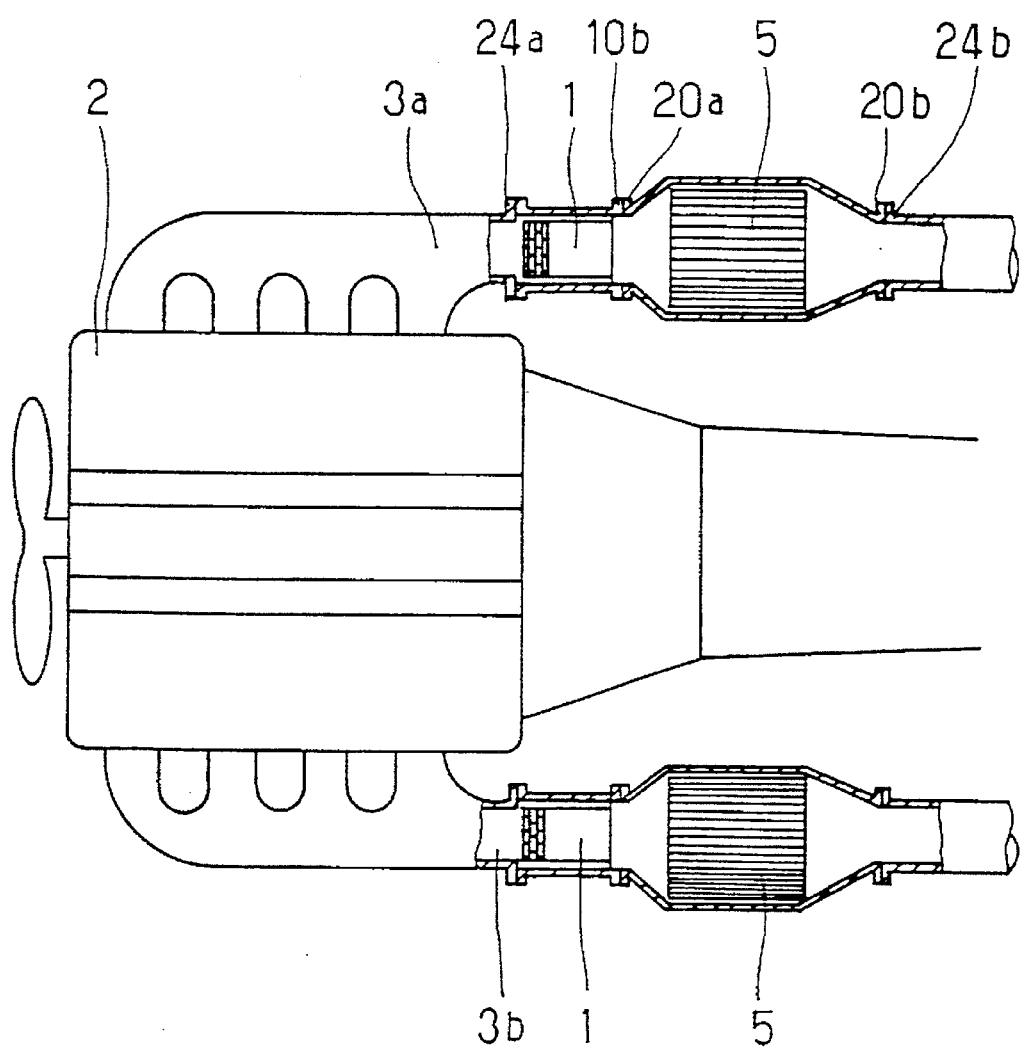
FIG. 2 is a composition view illustrating the entirety mounted with the metal carrier of the first embodiment according to the present invention.
Figure 3:
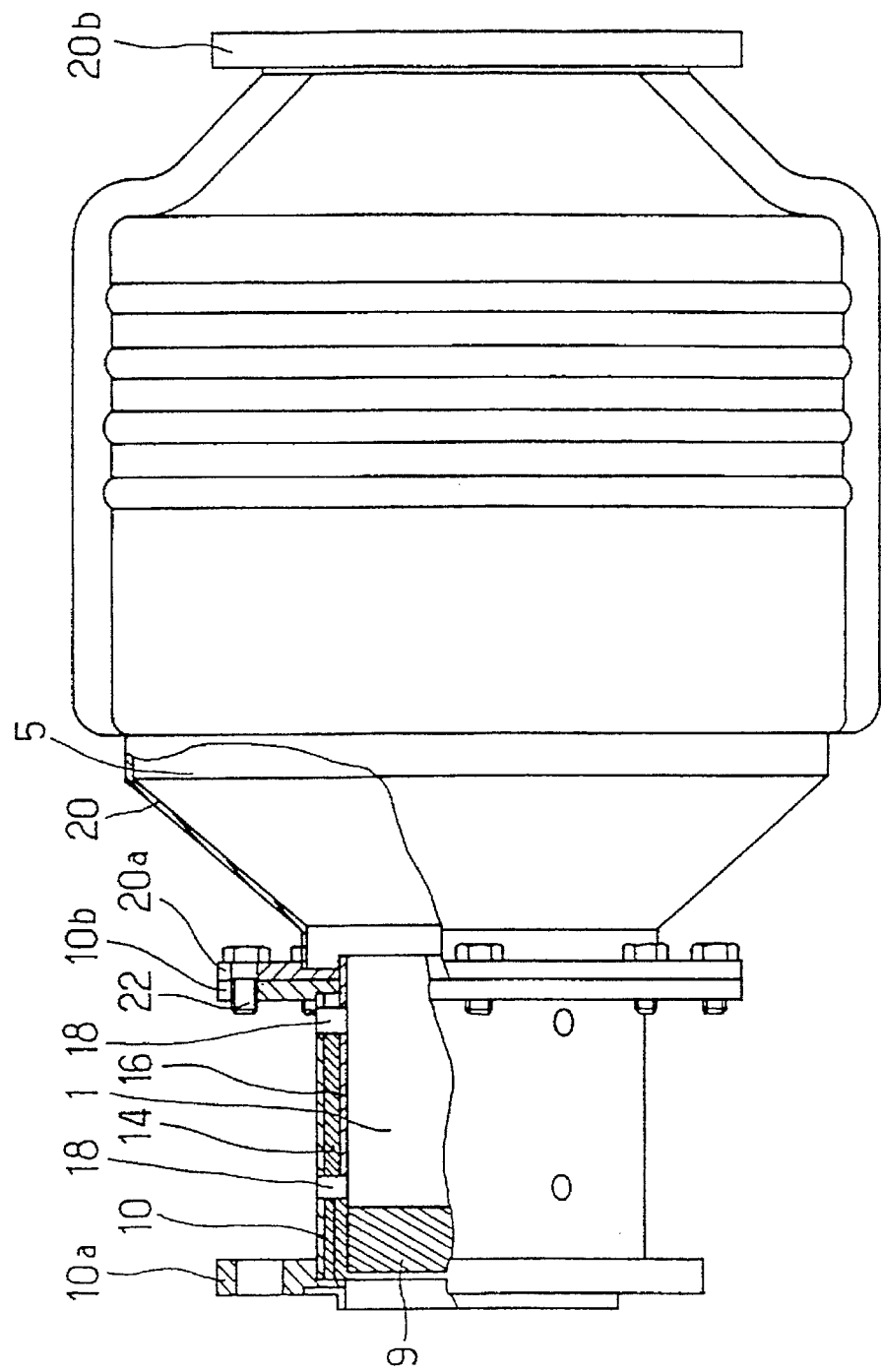
FIG. 3 is a fragmentary sectional view illustrating the holding structure of the metal carrier.

Referring to FIGS. 1 through 3, the first embodiment according to the present invention will now be described.

FIG. 2 is a fragmentary sectional view illustrating exhaust manifolds 3a and 3b, which constitute the exhaust gas passages of an engine (internal combustion engine) 2, including metal carriers for catalyst converter, 1, which are the metal carriers of the first embodiment according to the present invention.

The engine 2 is, e.g., of V8 and 4000 cc specifications. Eight pieces of exhaust manifolds extended from the engine 2 are grouped into 2 pieces of exhaust manifold 3a and 3b which consist of 4 pieces of exhaust manifolds respectively.

Within each exhaust manifolds 3a or 3b, the metal carrier 1 of the first embodiment is arranged in some place and a start catalyst 5 having a large capacity of 1300 cc is arranged in the immediate downstream therefrom.

FIG. 1 is a perspective view illustrating the metal carrier 1 of the first embodiment, and FIG. 3 is a view illustrating the holding structure of the metal carrier 1 and catalyst converter 5 at the downstream side from the engine 2.

The metal carrier 1 of the first embodiment is composed of a flat sheet 7 and a corrugated sheet 8.

Both the flat sheet 7 and the corrugated sheet 8 are band-like metal sheets of 80 mm in width and 0.03 to 0.20 mm in thickness, composed of chrome (Cr, 18 to 24 wt %), aluminum (Al, 4.5 to 5.5 wt %), rare earth metal elements (REM, 0.1 to 0.2 wt %) and the rest, iron (Fe), respectively (Fe-Cr-Al composition).

Figure 4:
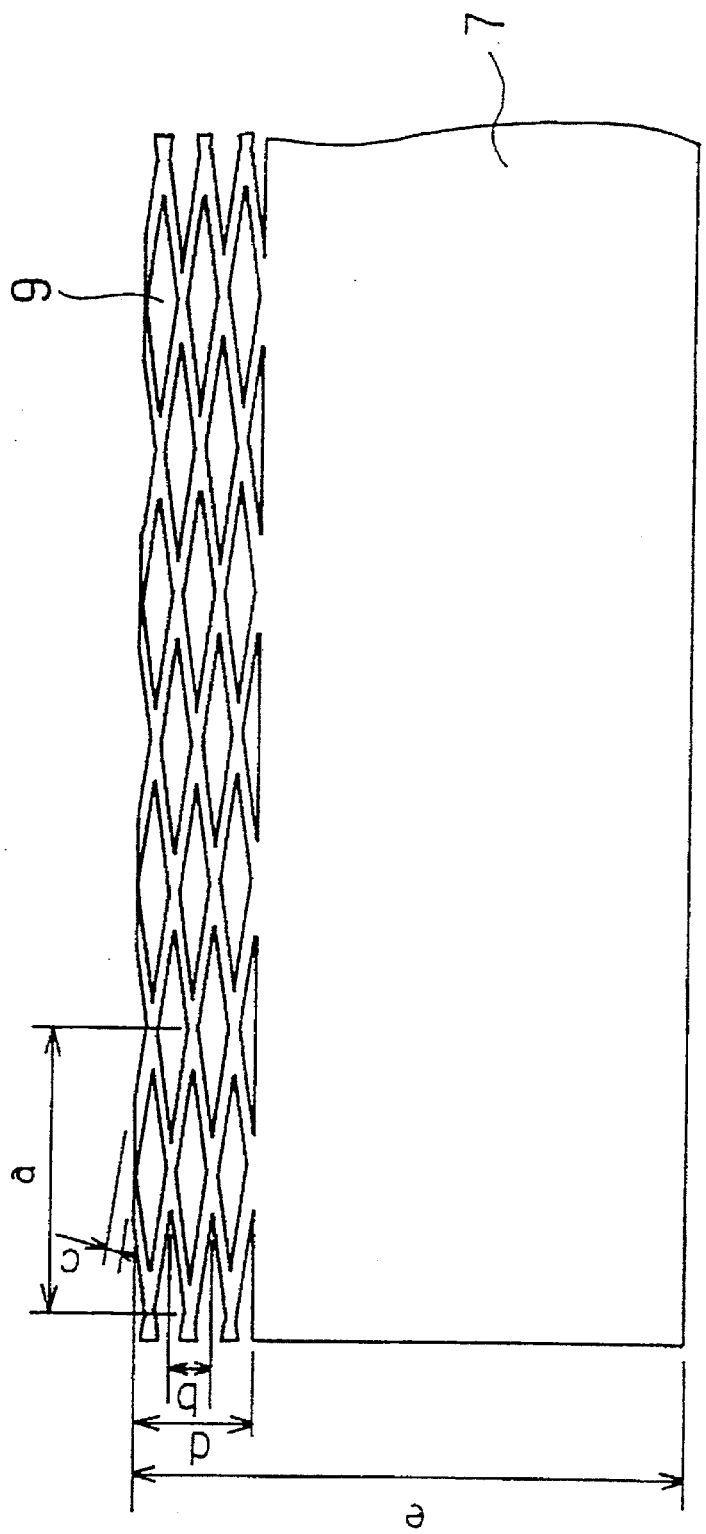
FIG. 4 is a development view illustrating the flat sheet to be used for the metal carrier of the first embodiment.

Slit parts 9 are formed at one side of the flat sheet 7 and corrugated sheet 8, whereas each slit part is shaped roughly rhombic of 15 mm wide. The slit parts 9 are continuously arranged at a regular interval of 0.16 mm. Furthermore, as illustrated in FIG. 4, the roughly rhombus forming the slit parts 9 are adjacently arranged to be parallel with each other.

The corrugated sheet 8 has a pitch of 2.5 mm and a height of 1.25 mm.

The flat sheet 7 and the corrugated sheet 8 are alternatingly wound to form the metal carrier 1 of the first embodiment with the slit parts formed only at one end part as illustrated in FIG. 1.

As illustrated in FIG. 3, the metal carrier 1 is fixedly held by a supporting rod 18 within an outer ring 10 via a short-fiber inorganic heat-insulation material of 5 mm thick, 14, and a long-fiber inorganic heat-insulating material of 1 mm thick, 16, whereas the outer ring 10 includes an exhaust manifold mounting flange 10a and a start catalyst mounting flange 10b. The supporting rod 18 is arranged in six places coincidently with the portion of the metal carrier 1 with no slit parts 9, whereas those six places are almost equally arranged in the circumferential direction with three places at the upstream side and the three places at the downstream side. By welding one end of the supporting rod 18 to the outer surface of the metal carrier 1 and the other end thereof to the outer ring 10, the metal carrier 1 is fixedly held by the outer ring 10.

The start catalyst 5, a monolithic catalyst carrier, is fixedly held within an outer ring for start catalyst, 20, via a spacer part (not illustrated), whereas the outer ring 20 includes a metal carrier mounting flange 20a and a exhaust pipe mounting flange 20b.

The outer ring 10 and the outer ring for start catalyst, 20, are integrated by connecting the start catalyst mounting flange 10b on the outer ring 10 and the metal carrier mounting flange 20a on the outer ring 20 to each other with bolts 22. Furthermore, by connecting the exhaust manifold mounting flange 10a to flanges 24a and 24b arranged in the downstream of the exhaust manifold 3 illustrated in FIG. 2 with bolts (not illustrated), the metal carrier 1 and the start catalyst 5 are arranged in the downstream of the exhaust manifolds 3a and 3b extended from the engine 2.

Particularly at this time, the slit parts 9 formed in the flat sheet 7 and corrugated sheet 8 of the metal carrier 1 are arranged to be at the side of the engine 2.

Next, the procedure for manufacturing the metal carrier 1 will be described.

In the first place, a flat sheet with the roughly rhombic slit parts 9 illustrated in FIG. 4 is obtained by a method of shearing (lath metal), pressing or etching.

The dimensions of the rhombus of the slit parts 9 illustrated in FIG. 4 are set to the following:

a (vertical length of rhombus)=2 mm b (horizontal length of rhombus)=1 mm c (slit-to-slit length)=0.16 mm d (slit width)=15mm e (metal sheet width)=80 mm By forming a corrugation at a pitch of 2.5 mm and a height of 1.25 mm on the flat sheet with slit parts formed by the above method, the corrugated sheet 8 with the slit parts 9 of 15 mm wide at one end can be obtained. In this example, the slit width is about 18% of the sheet width.

Figure 5:
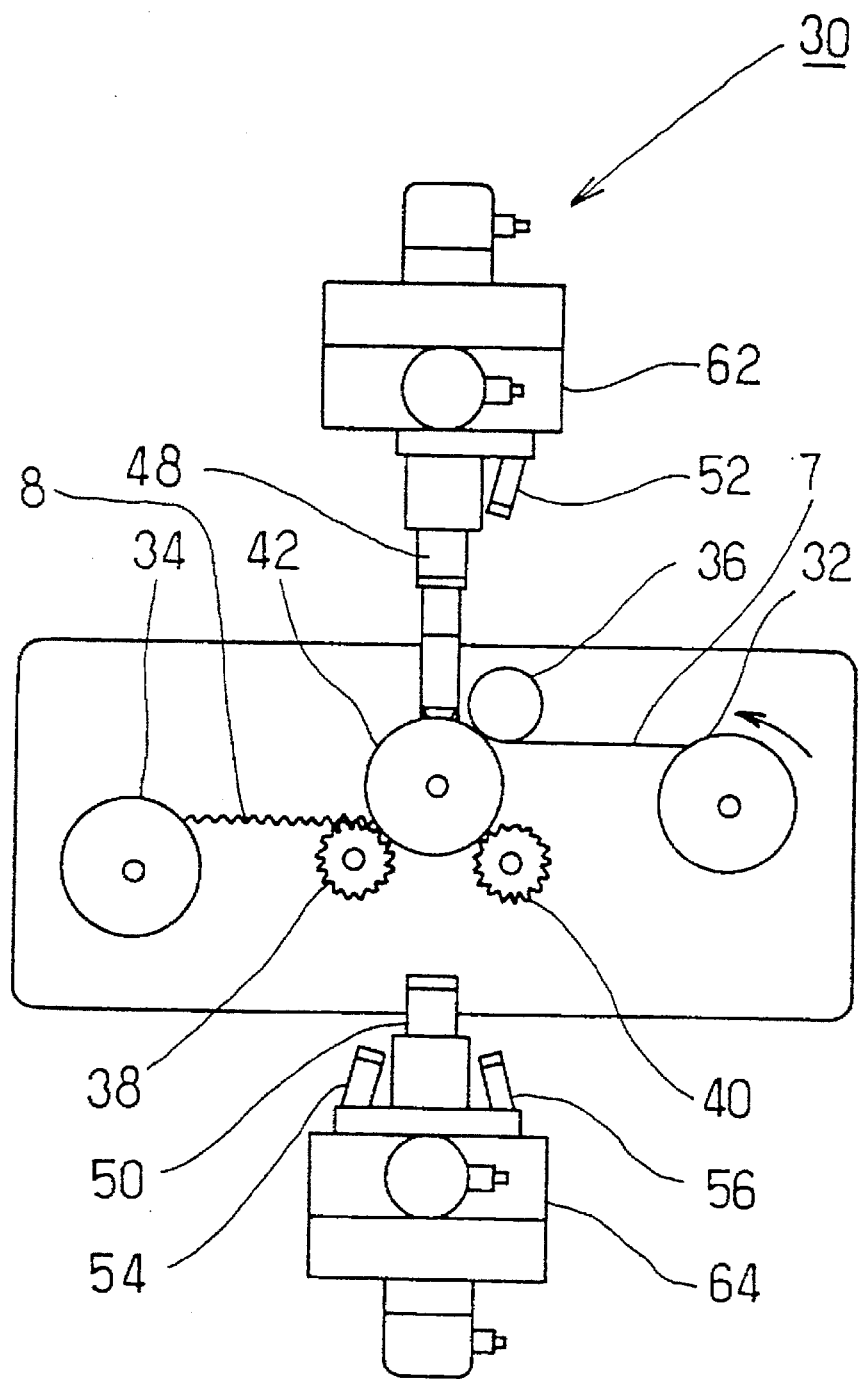
FIG. 5 is a front view illustrating a manufacturing system for manufacturing the metal carrier of the first embodiment according to the present invention.
Figure 6:
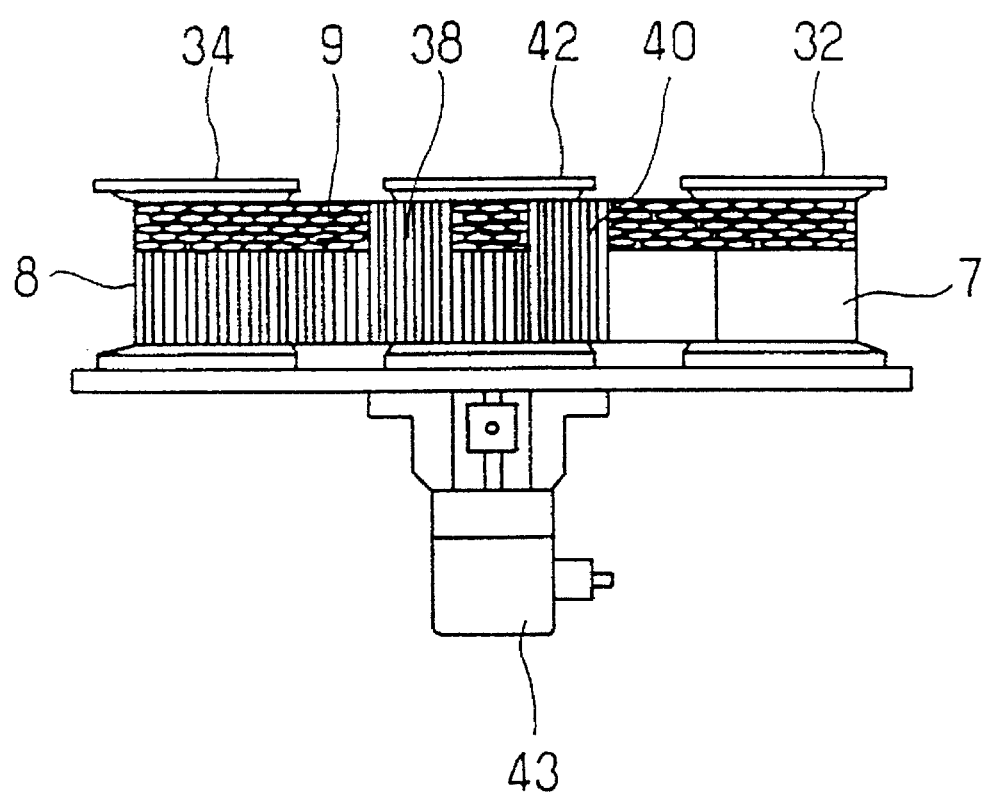
FIG. 6 is a top view illustrating a manufacturing system for manufacturing the metal carrier of the first embodiment according to the present invention.
Figure 7:
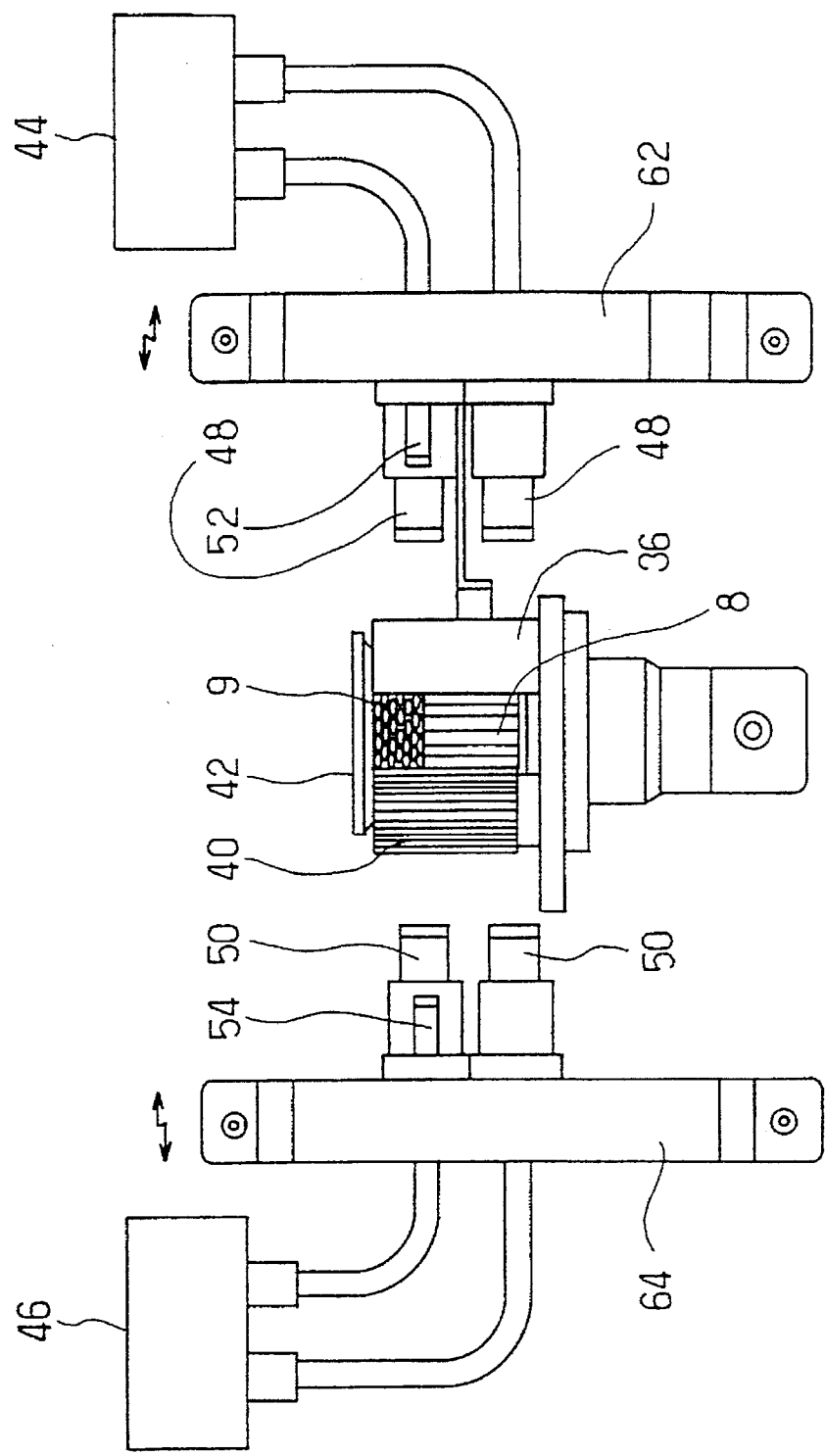
FIG. 7 is a side view illustrating a manufacturing system for manufacturing the metal carrier of the first embodiment according to the present invention.

The flat sheet 7 and corrugated sheet 8 with the slit parts 9 formed therein are alternatingly wound and laser welded on a manufacturing system illustrated in FIGS. 5 through 7.

Here, FIG. 5 is a front view illustrating the manufacturing machine, FIG. 6 is a top view thereof, and FIG. 7 is a side view thereof.

Winding and laser welding methods will specifically be described.

The flat sheet 7 is wound around a guide sheet 32, and the corrugated sheet 8 is wound around a guide sheet 34 (FIG. 6). The flat sheet 7 is guided by a tension roller for flat sheet controlling, 36, and the corrugated sheet 8 is guided by tension rollers for corrugated sheet controlling, 38 and 40, to a guide sheet 42. By driving the guide sheet 42 by a motor 43, the flat sheet 7 and the corrugated sheet 8 are wound while being laminated together.

Furthermore, during this winding and laminating, the flat sheet 7 and the corrugated sheet 8 are laser welded by YAG lasers 44 and 46 via laser guns 48 and 50.

As the laser welding is applied to the points on which the flat sheet 7 contacts the crests of the corrugated sheet 8, the extremely precise positioning of these points is required. To meet this requirement, a manufacturing system 30 employs laser displacement sensors 52, 54 and 56 for detecting the laser welding position. For detecting the displacement, non-contact overcurrent type sensors or contact type sensors may be used instead of these laser type sensors. Furthermore, according to the detection signals outputted from these sensors, a servo motor (not illustrated) is driven, and accordingly X–Y tables 62 and 64 for fixing the laser guns 48 and 50 are shifted.

Specifically, the laser displacement sensor 52 detects a gap between the laser gun 48 and the metal carrier 1, and outputs the detection signals to the servo motor (not illustrated). The laser displacement sensor 54, on the other hand, detects a gap between the laser gun 50 and the corrugation valley formed on the corrugated sheet 8, and outputs the detection signals to the servo motor (not illustrated). The laser displacement sensor 56 detects the position of the corrugation formed on the corrugated sheet 8 at the crest side in a half-pitch delayed position, and outputs the detection signals to the servo motor (not illustrated). The servo motor drives the X–Y tables 62 and 64 to their proper positions according to these detection signals.

Controlled as described in the above, the manufacturing system 30 can precisely laser weld the flat sheet 7 and the crests of the corrugated sheet 8.

In this way, the flat sheet 7 and the corrugated sheet 8 can be wound and laminated together, the slit parts 9 can be formed only at one end side, and the metal carrier 1 laser welded at the specified position of the flat sheet 7 and crests of corrugated sheet 8 can be obtained.

For employing this metal carrier for a catalyst converter, the metal carrier is heated at 800° to 1200° C. for 1 to 10 hours to deposit the oxide of Aluminum over the metal surface. Then, the metal carrier is impregnated in a slurry containing $\gamma$-$Al_2O_3$ for wash coat process. Following the wash coat process, the metal carrier is impregnated in an aqueous solution of catalytic metal, such as platinum (Pt) or rhodium (Rh), and then fired again.

After completing the above processes, the metal carrier for catalyst converter in which the catalyst is held can be obtained.

The first embodiment functions as follows:

In the first embodiment, the functions described below can be achieved by arranging the slit parts 9 of 15 mm wide formed at one end part of the metal carrier 1 at the upstream side of the exhaust manifolds 3a and 3b constituting the exhaust gas passages.

After the engine 2 starts, the exhaust gas emitted from each cylinder exhausting process flows through the exhaust manifolds 3a and 3b, and collides with the slit parts 9 positioned at the upstream side of the metal carrier 1. As a result, the temperature of the slit parts 9 rises most rapidly also due to the small heat capacity resulted from the deliberate formation of the slits. When the temperature reaches the activation temperature of the catalyst held by the metal carrier 1 (approx. 300° C. in the case of the present invention), the exhaust gas is begun to be purified at the upstream side of the metal carrier 1. During this purification, the oxidations of the hydrocarbon (HC) and carbon monoxide (CO) contained in the exhaust gas generate reaction heat. This reaction heat is conducted towards the downstream, and, together with the heat conduction within the metal carrier 1, successively causes the temperature rise and catalyst activation from the slit parts 9 towards the downstream.

Consequently, in tens of seconds after the engine 2 starts, the catalyst itself can be activated throughout the metal carrier 1.

In the same way, in the start catalyst 5 arranged in the immediate downstream from the metal carrier 1, the catalyst activation is successively caused from around the upstream side towards the downstream, and in about 30 seconds after the engine 2 starts, the catalyst activation can be achieved throughout the start catalyst 5.

In the first embodiment, even if a large volume of exhaust gas flows when the engine 2 is heavily loaded, more than 80% of the HC and CO within the exhaust gas can be purified by the metal carrier 1 and the start catalyst 5.

The temperature rise characteristics were compared between the metal carrier according to the present invention and a conventional metal carrier.

Figure 8:
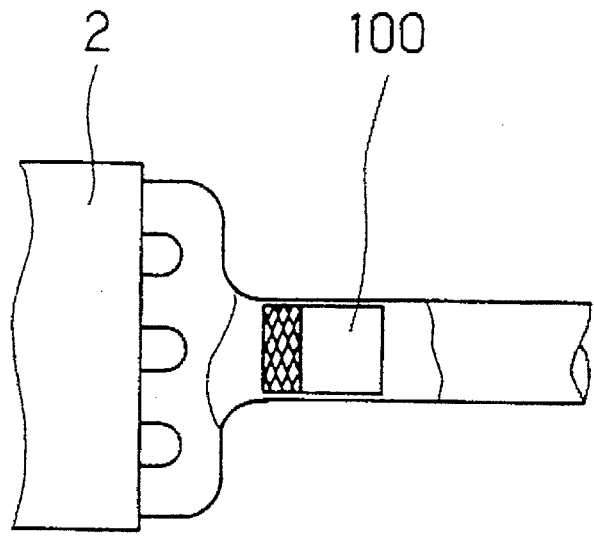
FIG. 8 is an illustrative view illustrating the position of the metal carrier and the engine applied for a comparative experiment.

In comparative experiment, the metal carrier according to the present invention and the conventional metal carrier were composed as illustrated in FIG. 8. In the metal carrier 100 according to the present invention, slit parts were formed only at one end part of a flat sheet and corrugated sheet as formed in the first embodiment. In the conventional metal carrier, a band-like sheet material with no slit parts on the metal carrier 100 was employed. Both the metal carriers were exactly the same in size.

Figure 9A:
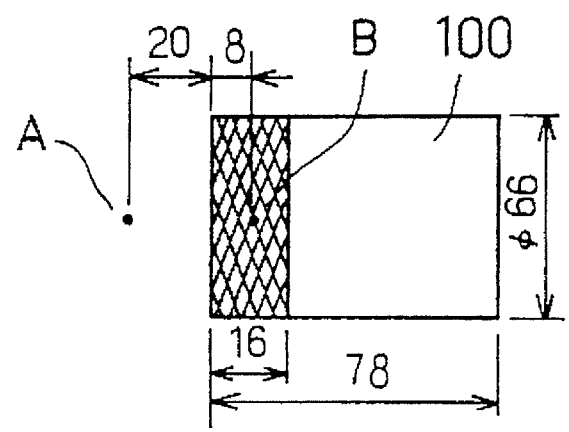
FIG. 9A is a side view illustrating the metal carrier according to the present invention to be subjected to the comparative experiment.
Figure 9B:
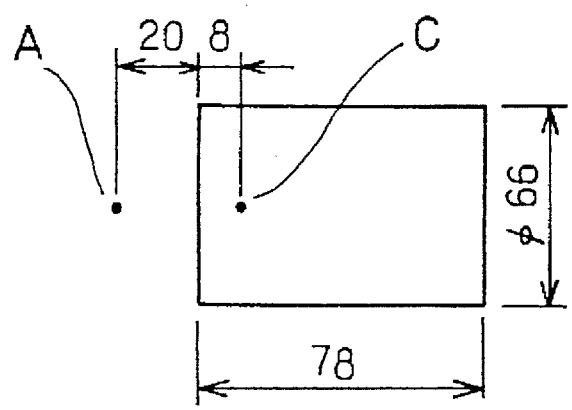
FIG. 9B is a side view illustrating a metal carrier to be compared with in the comparative experiment.

The metal carriers are illustrated in FIGS. 9A and 9B respectively, which were arranged at such a distance that the exhaust gas emitted from the engine could reach about 300° C. in 2 to 3 seconds after the engine started.

The temperature rise in each metal carrier was measured at 8 mm distant from the upstream side of the metal carrier towards the downstream side and in the axially central part of the metal carrier.

Figure 10:
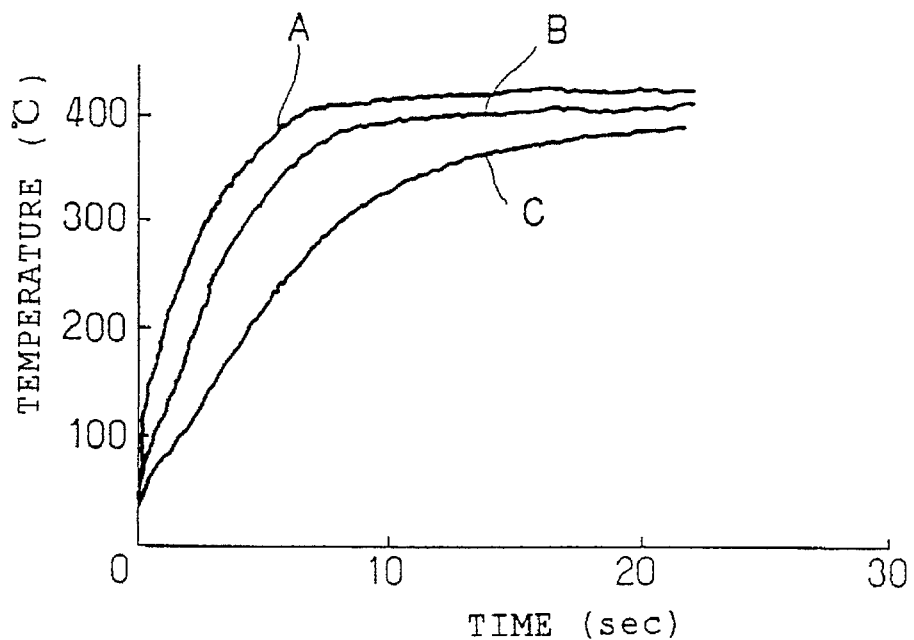
FIG. 10 is a characteristic diagram illustrating the results of the comparative experiment.

FIG. 10 illustrates the results of the above comparative experiment. In this figure, A denotes the temperature state of the exhaust gas at 20 mm upstream from each catalyst carrier, B denotes the temperature state within the metal carrier according to the present invention, and C denotes the temperature state within the conventional metal carrier.

As it is evident from FIG. 10, it took the metal carrier according to the present invention to reach about 300° C. in 4 to 5 seconds after the engine started, while it took the conventional metal carrier 8 to 9 seconds after the engine started.

This tells that by forming the slit parts at the upstream side of the metal carrier, the heat capacity of the portion exposed to the exhaust gas at the highest temperature could be reduced, and rapid temperature rise could be achieved.

Figure 11:
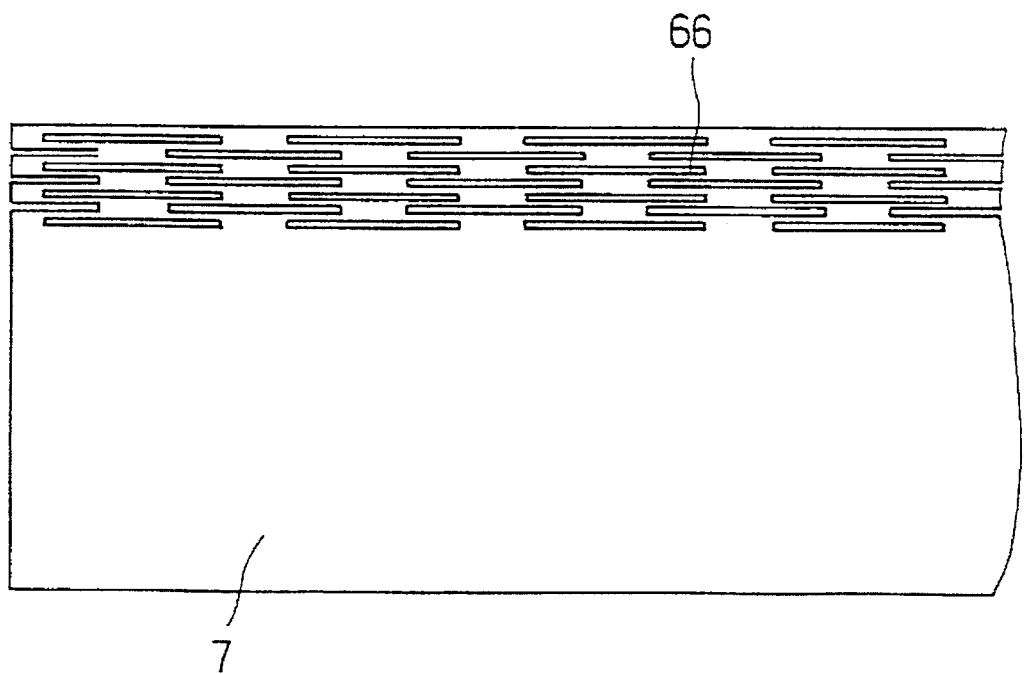
FIG. 11 is a development view illustrating another embodiment of the slit shape to be used for the present invention.
Figure 12:
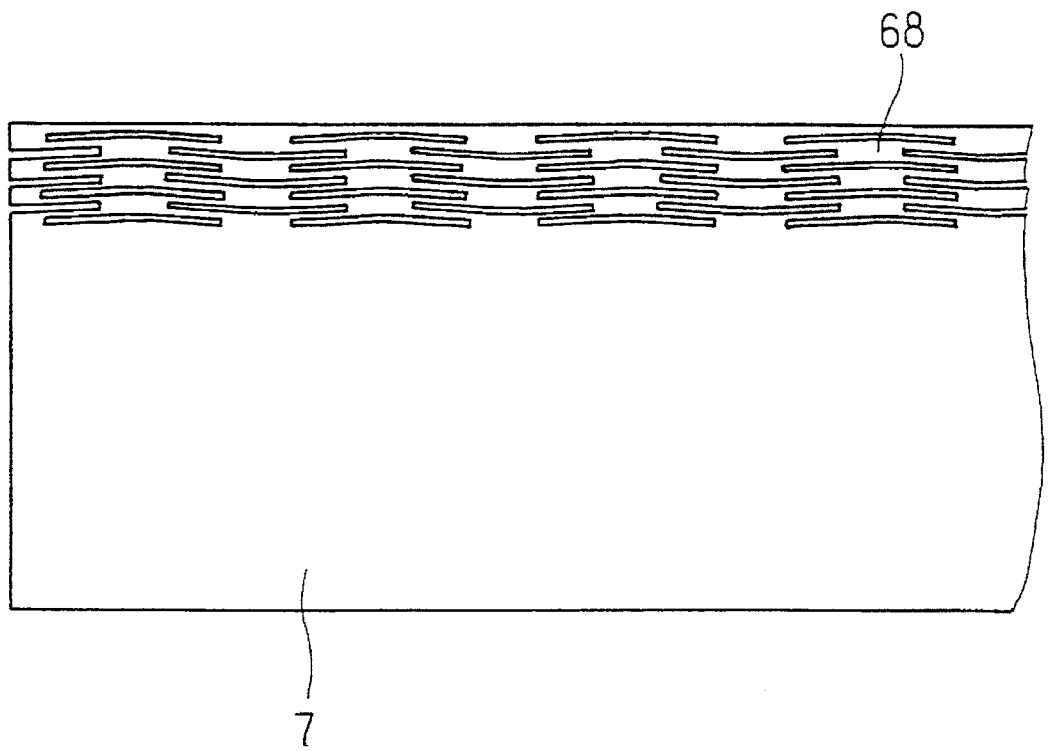
FIG. 12 is a development view illustrating another embodiment of the slit shape to be used for the present invention.

Although the slit parts are rhombic in the first embodiment, the present invention is not limited to this shape but may employ rectangular slit parts 66 in FIG. 11 or corrugated slit parts 68 in FIG. 12.

Furthermore, though the flat sheet and the corrugated sheet are laser welded for connection in the above embodiment, the present invention is not limited to this connection way but may employ brazing or spot welding.

Moreover, though the flat sheet and the corrugated sheet are alternatingly wound to obtain the metal carrier in the first embodiment, the present invention is not limited to this way but may alternatingly laminate the flat sheet and the corrugated sheet to obtain the metal carrier.

Second Embodiment

The temperature rise characteristics can be obtained by sufficiently reducing the heat capacity by forming the slit parts 9 in both the flat sheet 7 and the corrugated sheet 8 as in the first embodiment. A problem with this method, however, is that the portions of the flat sheet 7 and corrugated sheet 8 in which the slit parts 9 are formed sustain reduced strength.

Figure 13:
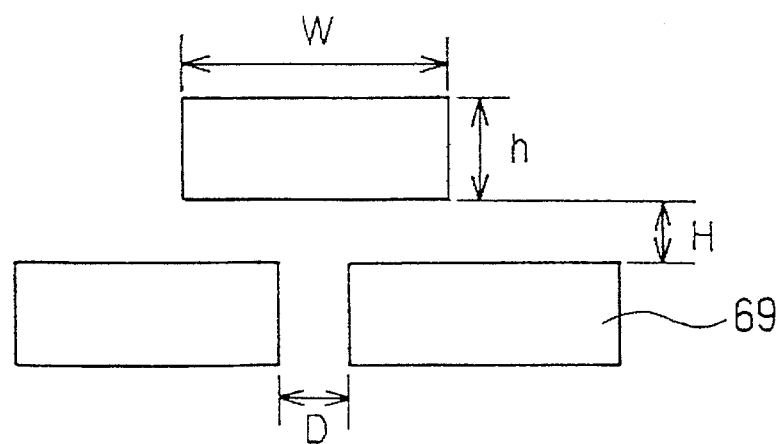
FIG. 13 is fragmentary enlarged view illustrating the slit parts for describing the second embodiment.

For example, if the slit parts 69 in FIG. 13 are formed as illustrated, H and D parts should be narrowed or W and h parts should be enlarged to reduce the apparent heat capacity.

Figure 14:
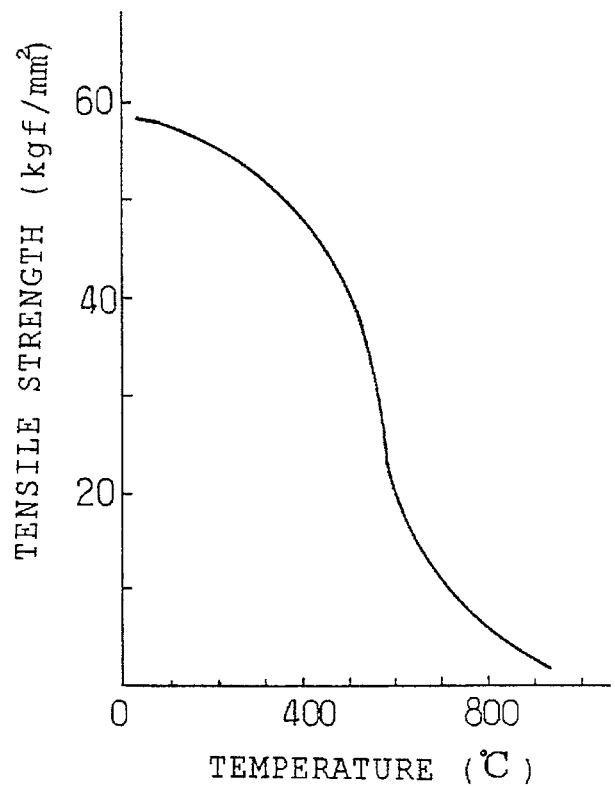
FIG. 14 is a characteristic diagram illustrating the relation between the temperature and tensile strength of the material.

As illustrated in FIG. 14, however, the materials composing the flat sheet and the corrugated sheet have smaller allowable stress as the temperature rises, and for this reason, durability and strength should be taken into account. Therefore, from the viewpoint of durability and strength, the slit shape is tend to be restricted.

In order to solve this problem, the second embodiment is so arranged that only either the flat sheet or the corrugated sheet is provided with the slit parts in the front part thereof which is coincided with the inflow direction of the exhaust gas, and the other sheet is not provided with any slit parts, and most part of the required strength is borne by the non-slit parts.

Figure 15:
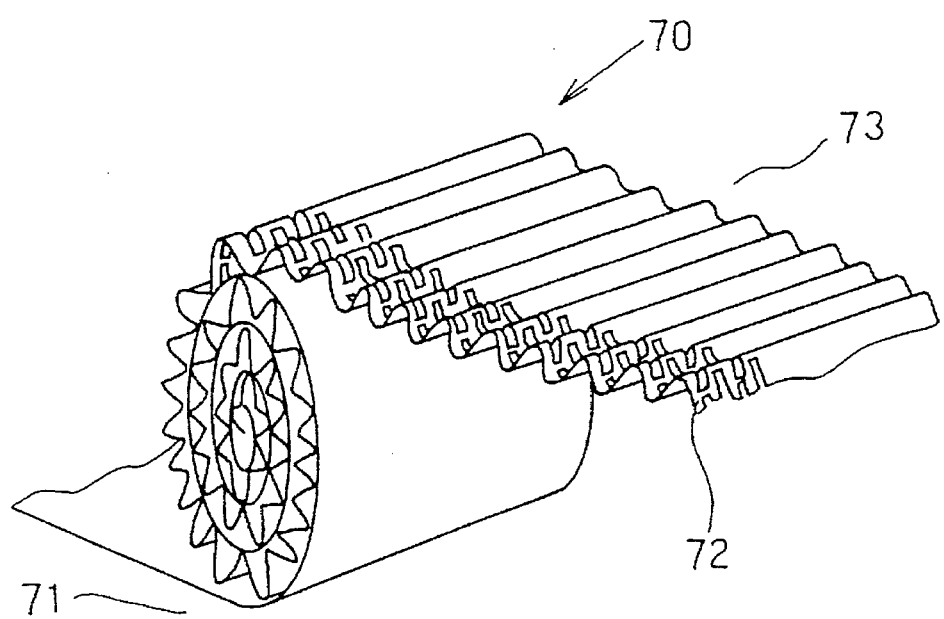
FIG. 15 is a perspective view illustrating the metal carrier of the second embodiment.

FIG. 15 is a development view of the metal carrier 70 of the second embodiment.

The metal carrier 70 is formed by an alternate winding of a flat sheet 71 with no slit parts and a corrugated sheet 73 with slit parts 72 formed at an end part of one side.

In this arrangement, the metal carrier 70 which has both temperature rise performance and durability to a sufficient extent can be obtained.

Figure 16:
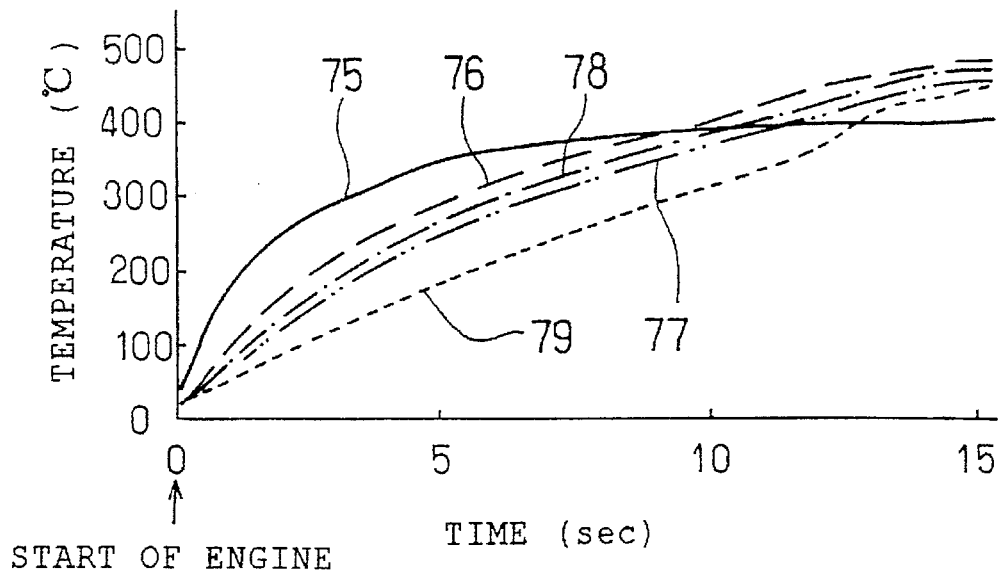
FIG. 16 is a characteristic diagram illustrating the relation between the temperature and tensile strength of the second embodiment and reference embodiment.

FIG. 16 is a characteristic view illustrating the specific comparison in specific temperature rise performance.

In this figure, 75 denotes the temperature of the gas flows into the metal carrier, 76 denotes the case with the metal carrier of the first embodiment with slit parts formed both in the flat sheet and in the corrugated sheet, 77 denotes the case with the metal carrier of the second embodiment with slit parts formed only in the flat sheet, 78 denotes the metal carrier of the second embodiment with slit parts formed only in the corrugated sheet, and 79 denotes the case with the conventional metal carrier with no slit parts.

As it is evident from FIG. 16, the metal carrier with slit formed in either the flat sheet or the corrugated sheet can achieve sufficient temperature rise characteristics compared with the conventional metal carrier.

Furthermore, in the second embodiment, as the slit parts are formed only either in the flat sheet or in the corrugated sheet, the slit shape can be made smaller compared with the first embodiment, and the strength can be borne by the other flat sheet or corrugated sheet with no slit parts.

As a result, the second embodiment has secondary effects that the surface area for heat capacity per unit volume of the slit parts can be enlarged and the supporting volume per unit volume can also be increased.

Although the second embodiment is so arranged that slit parts are formed in the corrugated sheet but not formed in the flat sheet, the second embodiment is not limited to this arrangement but may be so arranged that slit parts are formed in the flat sheet but not formed in the corrugated sheet.

Furthermore, though in the first embodiment, the metal carrier is obtained by alternatingly winding the flat sheet and the corrugated sheet, the present invention is not limited to this method but may obtain the metal carrier by alternatingly laminating the flat sheet and the corrugated sheet.

Third Embodiment

Figure 17:
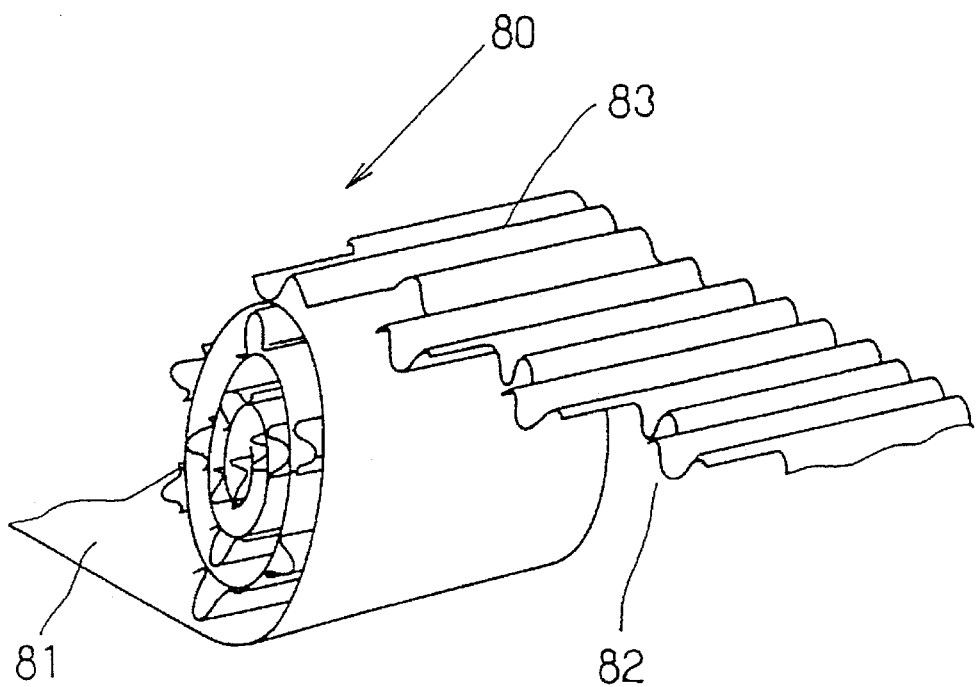
FIG. 17 is a fragmentary exploded view illustrating the metal carrier of the third embodiment.

FIG. 17 illustrates the metal carrier 80 of the third embodiment. This metal carrier 80 is formed by laminating and winding a corrugated sheet 83 provided with cutouts 82 at one end at the upstream side when a flat sheet 81 and the metal carrier 80 are arranged within the exhaust gas passage to reduced the heat capacity.

Also in this arrangement, the same effects as those of the second embodiment can be obtained.

Also in this embodiment, cutouts may be formed only in the flat sheet 81.

What is more, though the metal carrier 80 is obtained by alternatingly winding the flat sheet and the corrugated sheet in the above embodiment, the metal carrier 80 may be obtained by simply laminating the flat sheet and the corrugated sheet together.

Moreover, in the first embodiment, though the metal carrier is obtained by alternatingly winding the flat sheet and the corrugated sheet, the present invention is not limited to this method but may obtain the metal carrier by alternatingly laminating the flat sheet and the corrugated sheet.

Fourth Embodiment

The fourth embodiment will now be described in depth.

Figure 18:
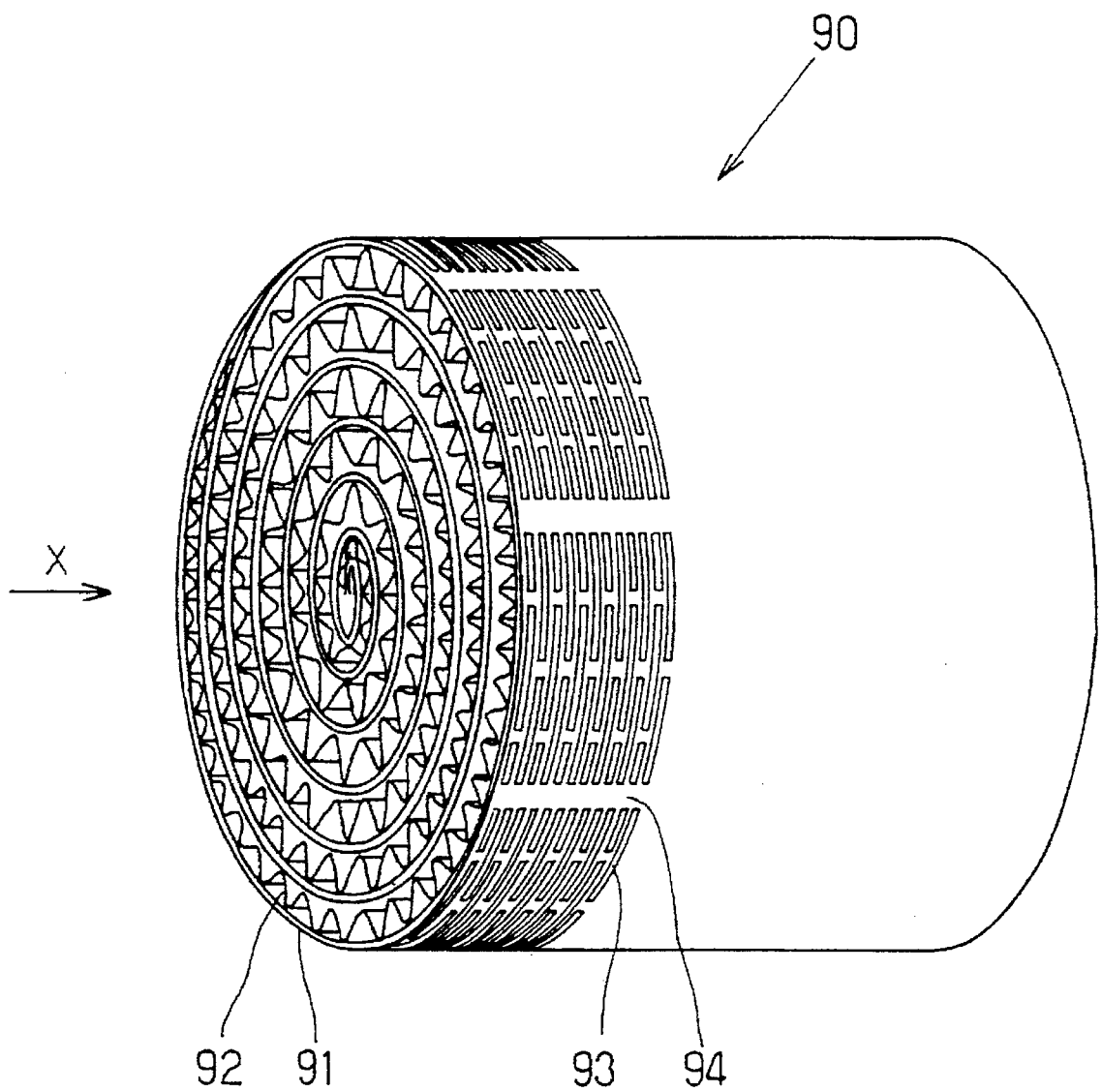
FIG. 18 is a perspective view illustrating the metal carrier of the fourth embodiment.

FIG. 18 is a type view of a metal carrier 90 according to the present invention.

The metal carrier 90 is formed by laminating or winding a flat sheet 91 and a corrugated sheet 92.

As is the case with the first embodiment, the flat sheet 91 and the corrugated sheet 92 are of Fe-Cr-Al composition with Cr (18 to 24 wt %), Al (4.5 to 5.5 wt %), REM (0.1 to 0.2 wt %) and the rest, Fe, respectively.

The flat sheet 91 and the corrugated sheet 92 are 60 mm wide and 0.03 to 0.20 mm thick. Slit parts 93 are formed for a width of 30.95 mm in both the flat sheet 91 and the corrugated sheet 92. In this example, the slit width is about 52% of the sheet width.

Furthermore, the slit parts 93 are not formed throughout the circumferential lengths of the flat sheet 91 and corrugated sheet 92 but at least either the flat sheet 91 or the corrugated sheet 92 are provided with non-slit parts 94 in an exhaust gas flow direction as denoted by x in FIG. 18.

Figure 19:
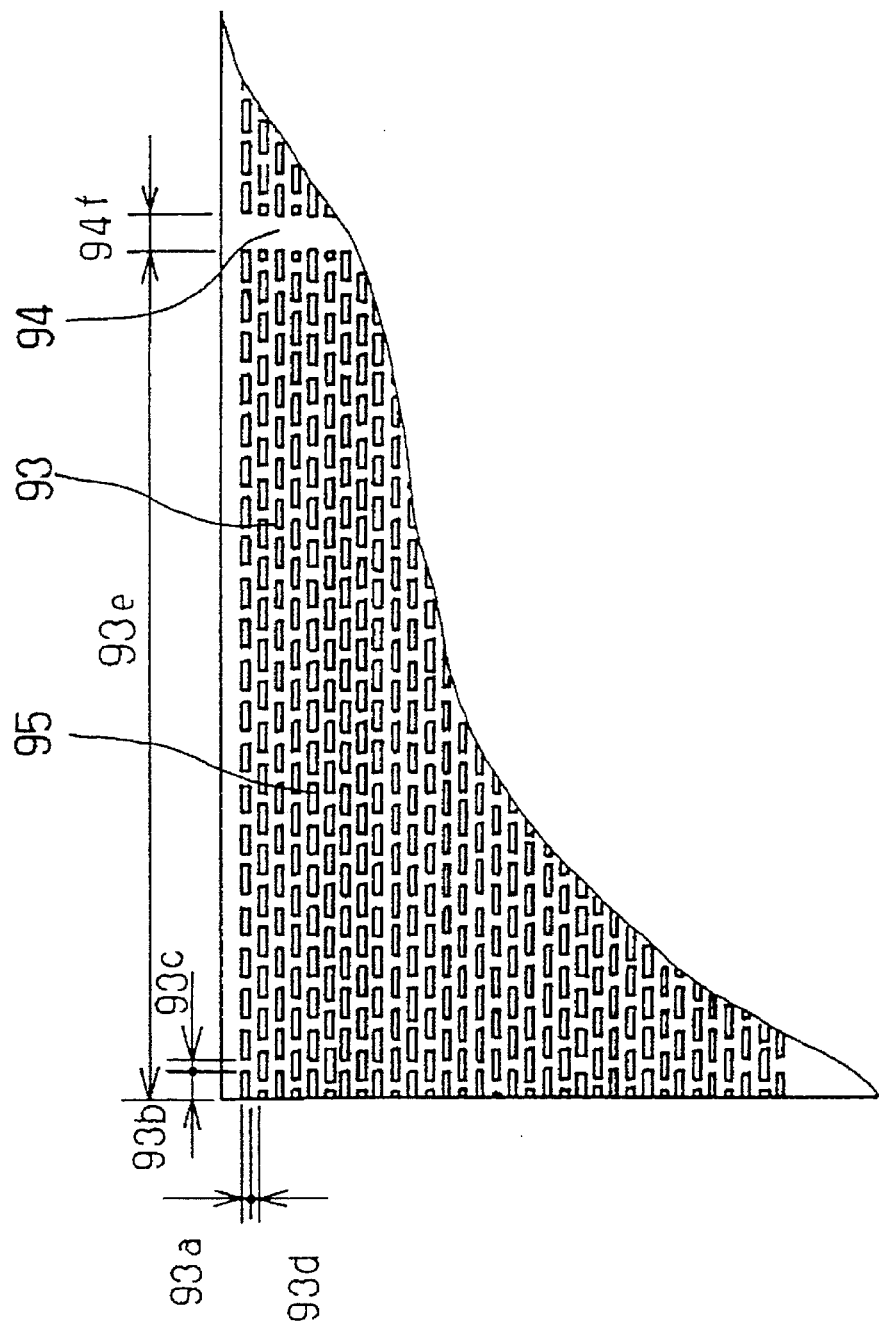
FIG. 19 is a development view illustrating the flat sheet to be used for the metal carrier of the fourth embodiment.

FIG. 19 is a development view illustrating the details of the shape of the slit parts 93 formed in the flat sheet 91 employed in the fourth embodiment.

Each slit of slit parts 93 has a slit width 93a of 0.55 mm, a slit length 93b of 1.7 mm and a slit interval 93c of 0.6 mm, and each line of the slit parts 93 is displaced by a half pitch from the adjacent lines thereof with the mesh width 93d of 0.4 mm therebetween. The slit groups 95 with a width 93e of 47.7 mm, which is an assembly of the slits parts 93 are successively formed with the non-slit parts 94 of a width 94f of 2 mm therebetween.

The corrugated sheet 92 is also provided with the slit parts 93 and the non-slit parts 94 in the same arrangement as the slit groups 95 formed in the flat sheet 91, and furthermore, uneven parts are successively formed at a pitch of 4.77 mm and a height of 1.75 mm.

Then, by alternatingly laminating and winding the flat sheet 91 and the corrugated sheet 92, the metal carrier 90 of the fourth embodiment with non-slit parts in an exhaust gas flow direction denoted by x is formed.

Then, the functions of the fourth embodiment according to the present invention will be described.

In the fourth embodiment, the metal carrier 90 is formed with the non-slip parts 94 of 2 mm wide in the slit parts of 30.95 mm wide at every 47.7 mm.

This metal carriers 90 are arranged within the exhaust manifolds 3a and 3b constituting exhaust gas passages instead of the metal carriers 1.

As illustrated in FIG. 2, after the engine 2 starts, the exhaust gas emitted from each cylinder exhausting process flows through the exhaust manifolds 3a and 3b, and collides with the slit groups 95 positioned at the upstream side of the metal carrier 90. As a result, the temperature of the slit group 95 rises most rapidly also due to the small heat capacity resulted from the deliberate formation of the slits.

Incidentally, the heat conductivity of the slit groups 95 of the fourth embodiment is approx. 1/10 of the case where no slit parts 93 are provided.

When the temperature of the slit groups 95 reaches the activation temperature of the catalyst held by the metal carrier 90 (about 300° C.), the exhaust gas is begun to be purified, and the catalyst activation is successively made towards the downstream by the reaction heat and the heat conduction within the metal carrier 90.

In this way, in seconds after the engine 2 starts, the catalyst activation can be made throughout the metal carrier 90.

On the other hand, the pulsation of the exhaust gas collided with the slit groups 95 and the vibration of the engine 2 gives a considerable stimulus force (approx. 5 G) to the metal carrier 90. By providing the non-slit parts 94, however, the resonance frequency of the metal carrier 90 can be improved better than the maximum stimulus frequency (approx. 500 Hz) of the engine 2.

Consequently, the metal carrier 90 can have a highly durable structure.

The non-slit parts 94, which are formed both in the flat sheet 91 and in the corrugated sheet 92 in the fourth embodiment, may be formed either in the flat sheet 91 or in the corrugated sheet 92.

Figure 20:
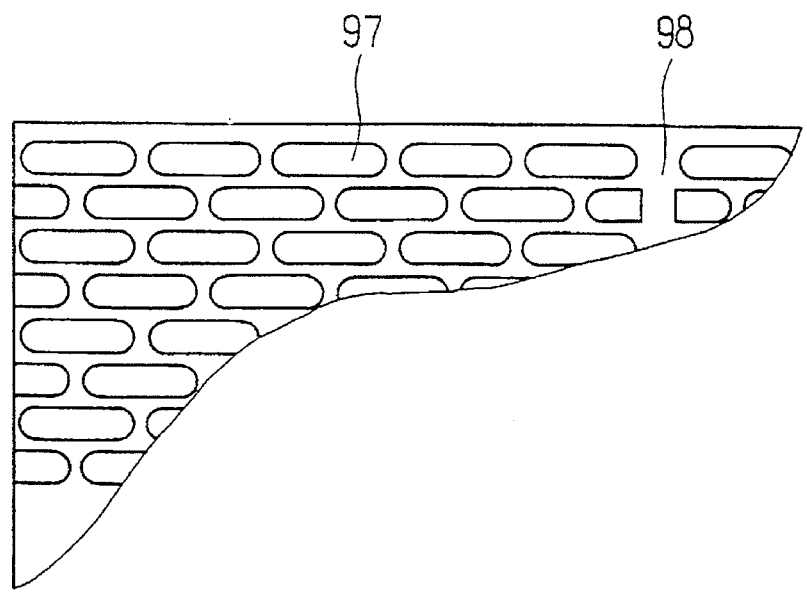
FIG. 20 is a development view illustrating another embodiment of the slit shape to be used for the fourth embodiment.

Furthermore, in the fourth embodiment, the slit parts 93 are formed rectangular. However, the present invention is not limited to this shape but may provide the non-slit parts in the roughly rhombic slit parts as illustrated in FIG. 4, the non-slit part in the corrugated slit parts as illustrated in FIG. 12, or non-slit parts 98 in ellipsoidal slit parts 97 as illustrated in FIG. 20.

Figure 21:
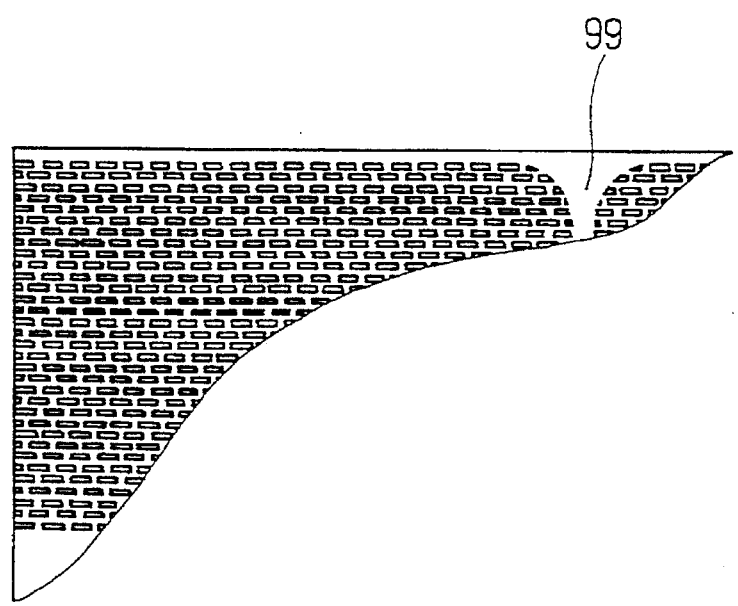
FIG. 21 is a development view illustrating another embodiment of the slit shape to be used for the fourth embodiment.

Moreover, in the fourth embodiment, though the non-slit parts 94 are linear in the fourth embodiment, as illustrated in FIG. 21, the non-slit parts 99 with enlarged corners is also acceptable.

As described in the above, according to the present invention, a metal carrier for a catalyst converter which is highly resistant to vibrations and can achieve high and rapid purification performance can be obtained.

Fifth Embodiment

The fifth embodiment according to the present invention will be described.

Figure 22:
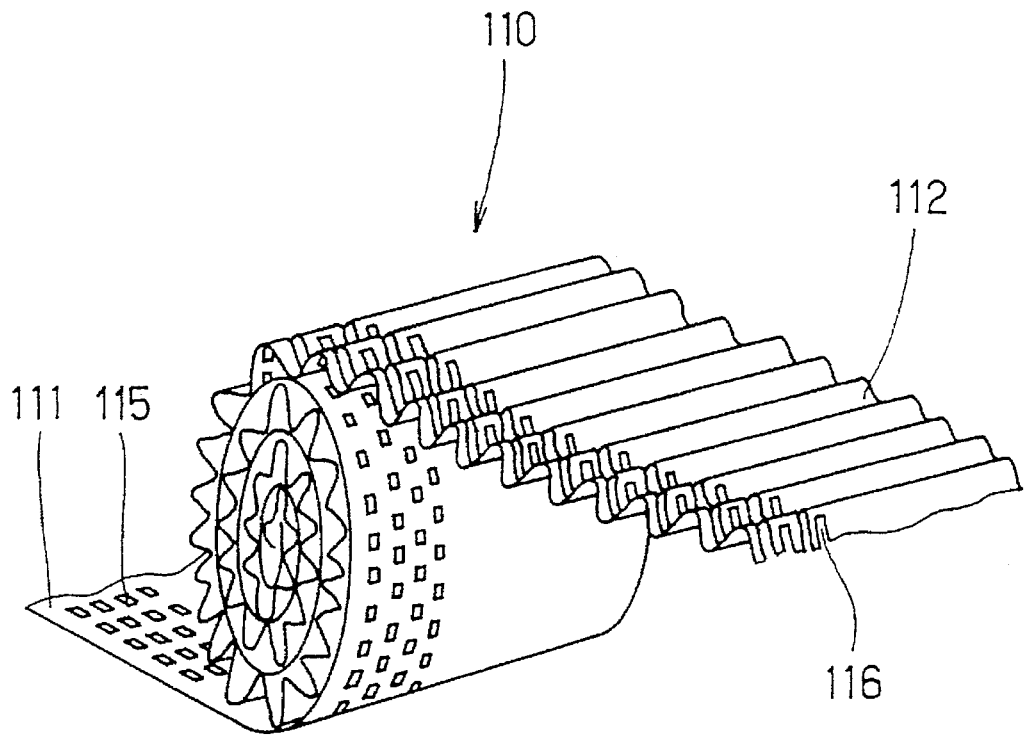
FIG. 22 is a fragmentary exploded view illustrating the metal carrier of the fifth embodiment.

FIG. 22 is a type view of the metal carrier 110 of the fifth embodiment illustrating the half-wound state.

This metal carrier 110 is composed of an alternating lamination and winding of a flat sheet 111 and a corrugated sheet 112.

The flat sheet 111 and the corrugated sheet 112 are of Fe-Cr-Al composition with Cr of 18 to 24 wt %, Al of 4.5 to 5.5 wt %, rare earth metal elements (REM) of 0.1 to 0.2 wt % and the rest, Fe, respectively.

The flat sheet 111 and the corrugated sheet 112 are 60 mm wide and 0.03 to 0.20 mm thick respectively. Both the flat sheet 111 and the corrugated sheet 112 are provided with slit parts 115 and 116, respectively for a width of 30.95 mm at one end side which are different from each other in length-breadth ratio.

Figure 23:
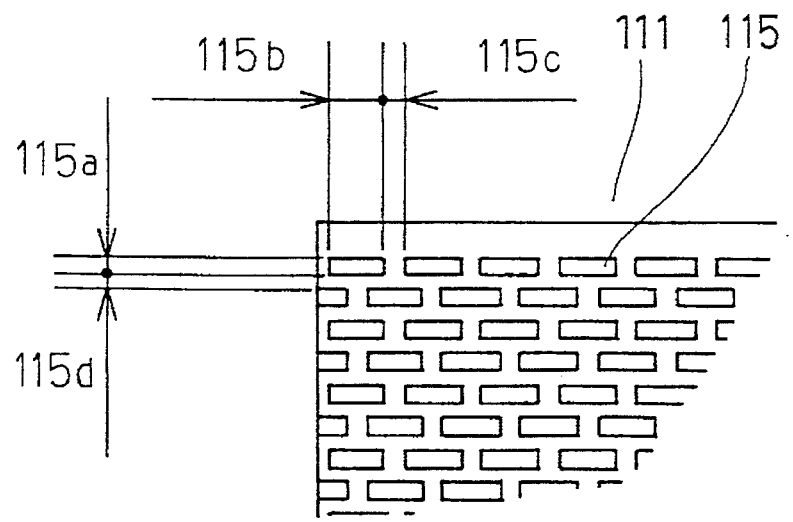
FIG. 23 is an illustrative view for illustrating the fifth embodiment.

FIG. 23 is a fragmentary enlarged view illustrating the shape of the slit parts 115 formed in the flat sheet 111 employed in the fifth embodiment.

Figure 24:
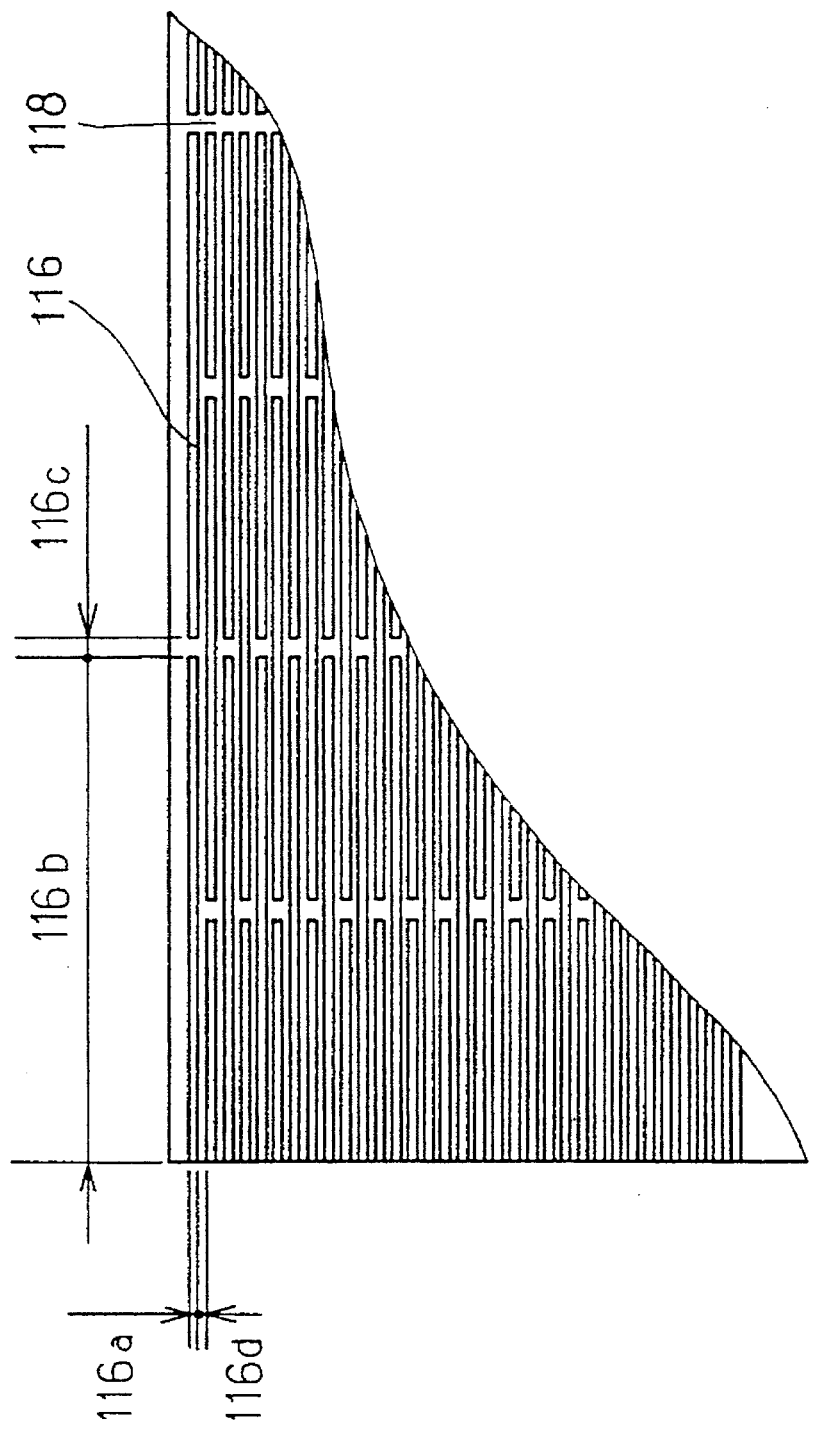
FIG. 24 is an illustrative view for illustrating the fifth embodiment.

FIG. 24 is a fragmentary enlarged view illustrating the shape of the slit parts 116 formed in the corrugated sheet 112 employed in the fifth embodiment.

In FIG. 23, the flat sheet 111 has a slit width 115a of 0.55 mm, a slit length 115b of 1.1 mm and a slit interval 115c of 0.6 mm, and each line of the slit parts 115 is displaced by a half pitch from the adjacent lines thereof with a mesh width 115d of 0.4 mm therebetween.

As illustrated in FIG. 24, the flat sheet 112 has a slit width 116a of 0.55 mm, a slit length 116b of 28 mm and a slit interval 116c of 1 mm, and each line of the slit parts 116 is displaced by a half pitch from the adjacent lines thereof with a mesh width 116d of 0.4 mm therebetween. Furthermore, non-slit parts 118 of 1 mm wide are provided at every 57 mm to improve the strength, and furthermore, uneven parts are successively formed at a pitch of 4.77 mm and a height of 1.75 mm.

Figure 25:
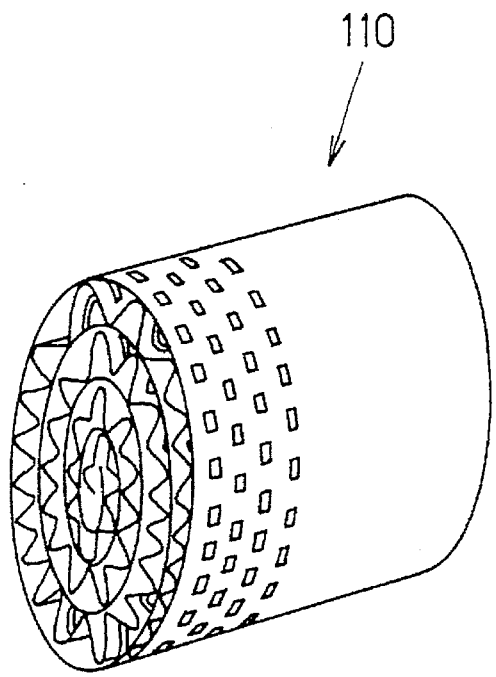
FIG. 25 is a perspective view illustrating the metal carrier of the fifth embodiment.

Then, by alternatingly laminating and winding the flat sheet 111 and the corrugated sheet 112, the metal carrier 110 of the fifth embodiment with a combination of the flat sheet 111 and corrugated sheet 112 with different slit length-breadth ratios as illustrated in FIG. 25 can be obtained.

In this way, in the fifth embodiment, the metal carrier 110 with a combination of the flat sheet 111 with a small slit length-breadth ratio (approx. 1:2) and the corrugated sheet 112 with a large slit length-breadth ratio (approx. 1:50) can be obtained.

Then, the functions of the metal carrier 110 will be described as to a case where the metal carrier 110 is arranged in the exhaust manifolds 3a and 3b, exhaust gas passages in FIG. 2 illustrating the first embodiment.

After the engine 2 starts, the exhaust gas emitted from each cylinder exhausting process flows through the exhaust manifolds 3a and 3b, and collides with the slit parts 115 and 116 positioned at the upstream side of the metal carrier 110.

At this time, the slit parts 116 of the corrugated sheet 112 are less rigid, and, due to slightly displaced pitches and subsequent turbulence effect, efficiently receives heat. Furthermore, due to smaller heat capacity and lower heat conductivity, the temperature of the slit parts 116 of the corrugated sheet 112 rises most rapidly.

Incidentally, the heat conductivity of the slit parts 116 of the fifth embodiment is approx. 1/1000 of the case where no slit parts are provided.

When the temperature of the slit parts 116 reaches the activation temperature of the catalyst held by the metal carrier 110 (about 300° C.), the exhaust gas is begun to be purified, and the catalyst activation is made at the side of the flat sheet 111 and the downstream by the reaction heat and the heat conduction within the metal carrier 110. In this way, in seconds after the engine 2 starts, the catalyst activation can be made throughout the metal carrier 110.

On the other hand, the pulsation of the exhaust gas collided with the slit parts 115 and 116 and the vibration of the engine 2 gives a considerable stimulus force (approx. 5 G) to the metal carrier 110. By setting the slit length-breadth ratio (115a:115b) to a small value, however, the resonance frequency of the metal carrier 110 can be improved better than the maximum stimulus frequency (approx. 500 Hz) of the engine 2. Consequently, the metal carrier 110 can have a highly durable structure.

In the fifth embodiment, though the slit length-breadth ratio of the flat sheet 111 is set to a smaller value than that of the corrugated sheet 112, reversely the slit length-breadth ratio of the corrugated sheet 112 may be set to a smaller value than that of the flat sheet 111.

Figure 26:
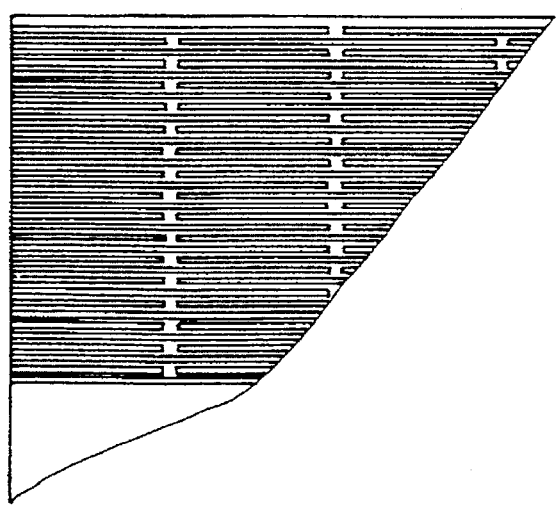
FIG. 26 is a development view illustrating another embodiment of slit shape to be used for the fifth embodiment.

Moreover, in the fifth embodiment, the non-slit parts 118 are provided on the corrugated sheet 112 with a larger slit length-breadth ratio to prevent the loss in the strength due to the formation of the slit parts 116. In the fifth embodiment, however, non-slit parts may not be provided as illustrated in FIG. 26, and by not providing non-slit parts, the metal carrier with a higher temperature rise performance can be obtained.

Still more, in the fifth embodiment, though the slit parts 115 and 116 are formed rectangular, the present invention is not limited to this shape but may form the slit parts 115 and 116 roughly rhombic as illustrated in FIG. 4 of the first embodiment, corrugated as illustrated in FIG. 12 or ellipsoidal as illustrated in FIG. 20.

As described in the above, according to the present invention, by differentiating the composition of the slit parts composed of a corrugated sheet and a flat sheet, or specifically by differentiating the length-breadth ratio of the slit parts, the temperature rise characteristics and vibration resistance of the corrugated sheet and flat sheet can be varied. For this reason, a metal carrier which is highly resistant to vibration and can achieve high purification performance in a short time can be obtained.

In the fifth embodiment, though metal carrier 110 is obtained by laminating and winding the flat sheet 111 and the corrugated sheet 112, the present invention is not limited to this method but may obtain the metal carrier by simply laminating the flat sheet 111 and the corrugated sheet 112.

Sixth Embodiment

The sixth embodiment relates to the holding method of the metal carriers of the above first to sixth embodiments.

Conventionally, as a catalyst converter for exhaust gas purification, the one as disclosed in the Japanese Examined Patent Publication No. 5-57197, etc. has been known, in which an outer ring, an intermediate tube and a metal carrier are partly connected in the axial direction and a heat insulation materials formed in each non-connected part to control heat radiation at a low temperature and ease thermal stress at a high temperature.

Another one disclosed in the Japanese Utility Model Publication Laid-Open No. 4-53450 has been known, in which the diameter of the downstream side of the exhaust gas passage of an outer ring is made smaller and the outer ring is connected to a metal carrier at this part to ease the thermal stress of the metal carrier.

However, in such a catalyst converter as disclosed in the above Japanese Examined Patent Publication No. 5-57197 or the Japanese Utility Model Publication Laid-Open No. 4-53450, flange structures with a larger heat capacity should be connected to the front and rear parts of the outer ring or the metal carrier itself should be fixed within a housing connected to a flange with a large heat capacity to enable the catalyst converter mounted in the course of the exhaust gas passages of internal combustion engines for vehicles, etc.

At any rate, flange structures, etc. with a large heat capacity should be connected in the vicinity of the upstream of the exhaust gas passages of the outer ring. Therefore, immediately after cold starting in which a large volume of harmful components (HC, CO, NOx) are emitted from the exhaust gas of all times, it takes long to reach the temperature at which the catalyst held by the metal carrier is activated, and sufficient purification can not be expected. What is worse, it takes a heavy cost to manufacture the catalyst converter itself.

The sixth embodiment is to solve the above problems.

Referring to FIGS. 27 through 33, the composition, functions and effects of the sixth embodiment will be described in depth.

Figure 27:
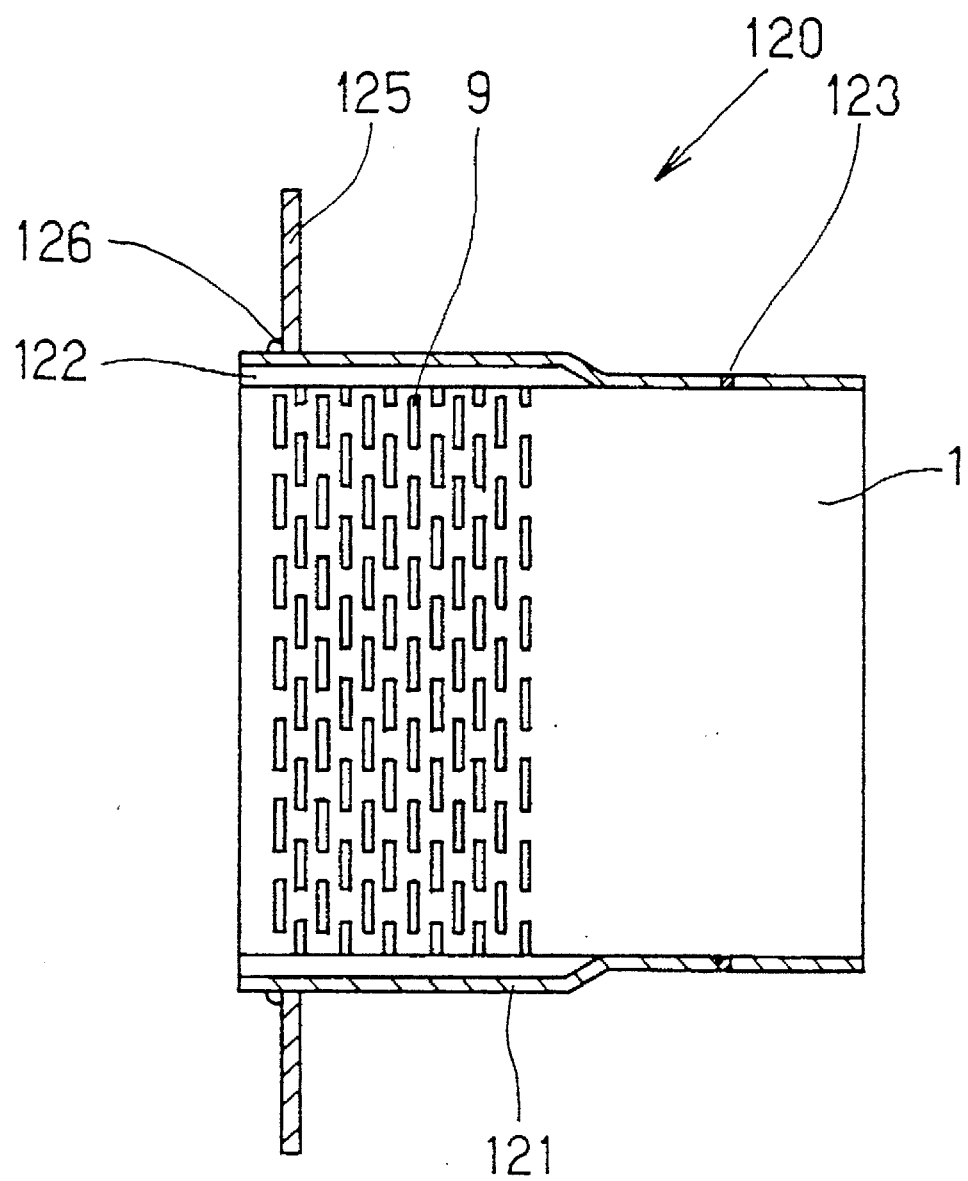
FIG. 27 is a perspective view illustrating the metal carrier of the sixth embodiment.
Figure 28:
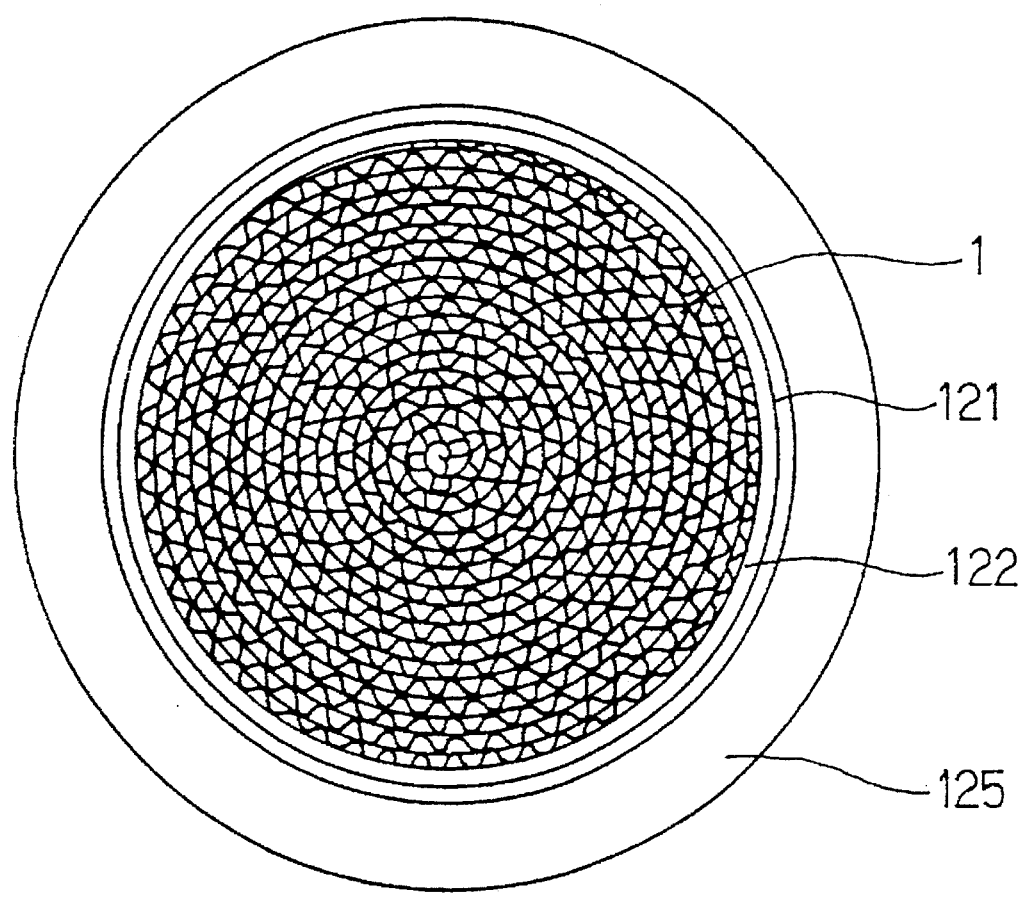
FIG. 28 is a front view illustrating the metal carrier of the sixth embodiment.

FIGS. 27 and 28 illustrates the most typical catalyst converter 120 according to the present invention. FIG. 27 is a cross-sectional view cut across in the direction of exhaust gas flow, and FIG. 28 is a front view illustrating the catalyst converter 120.

In these figures, the numeral 1 denotes the metal carrier of the first embodiment with a plurality of slit parts 9 formed at an end part thereof.

The numeral 121 denotes an outer ring for fixedly holding the metal carrier 1. A space part 122 is provided between the metal carrier 1 and the outer ring 121 at the upstream side of the exhaust gas passage. The metal carrier 1 and the outer ring 121 are connected to each other at one or more connecting points 123 at the downstream side of the exhaust gas passage.

Brim-like flanges 125 both having a small heat capacity is circumferentially connected to the outer periphery of the outer ring 121 at a connecting part 126 within a section in which the space part 122 is provided between the metal carrier 1 and the outer ring 121.

By composing the catalyst converter 120 in the same way as the sixth embodiment for connecting the metal carrier 1 to the outer ring 121 only at the downstream side of the exhaust gas passage (cantilever structure), thermal stress caused in the axial and radial directions can be eased and sufficient durability can be obtained.

The catalyst converter 120 is characterized by comparatively small volume not to disturb the rapid temperature rise and activation of a large-volume catalyst converter which is arranged behind the catalyst converter 120.

The functions of the sixth embodiment will now be described referring to FIGS. 29 and 30.

Figure 29:
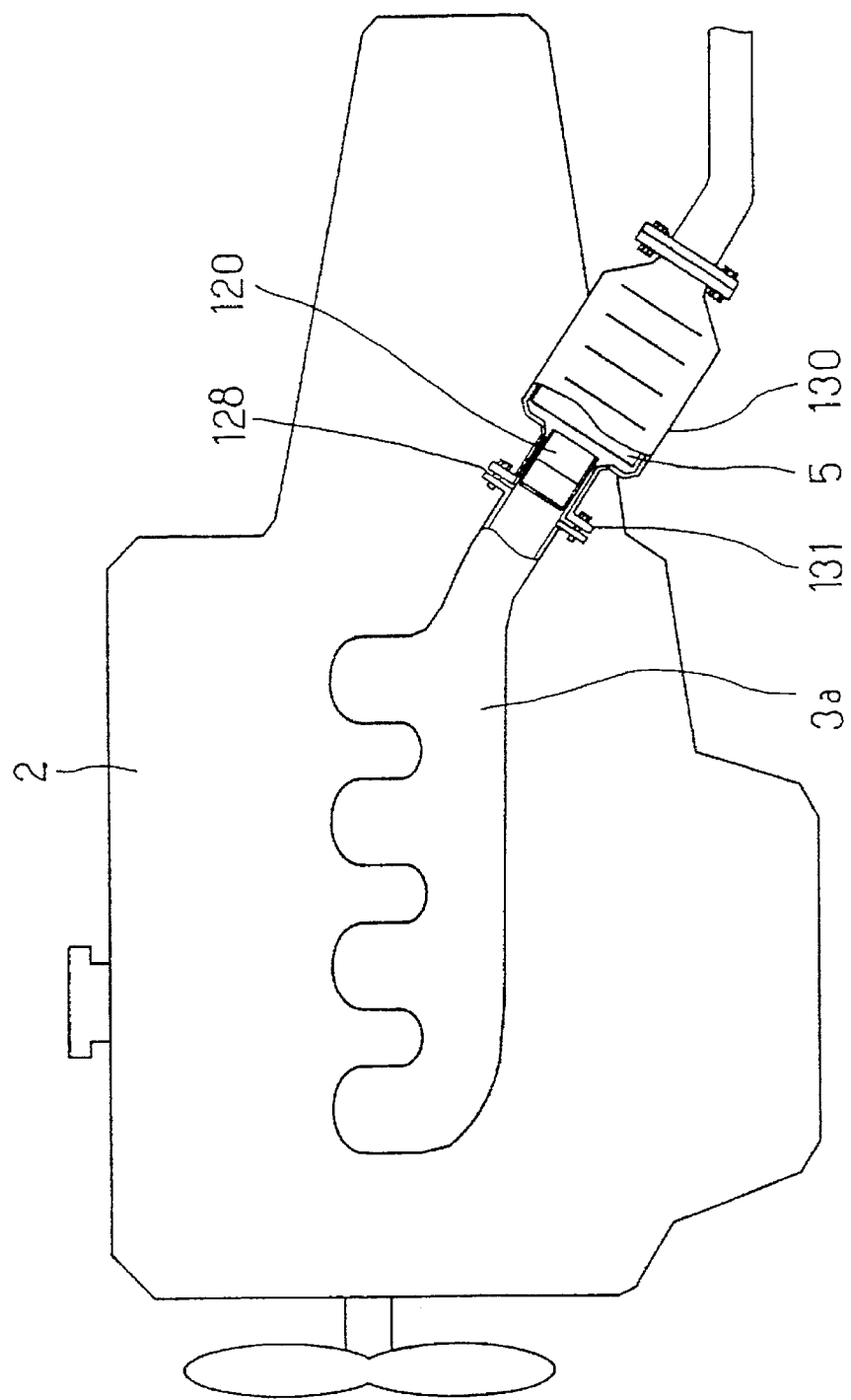
FIG. 29 is a composition view illustrating the entirety mounted with the metal carrier of the sixth embodiment.

FIG. 29 is a system view illustrating the catalyst converter 120 as per FIG. 27 mounted in the engine 2. The catalyst converter 120 of the sixth embodiment is arranged within the exhaust manifold 3a.

In addition, the start catalyst 5, a large-volume catalyst converter, is arranged immediately behind the catalyst converter 120.

Figure 30:
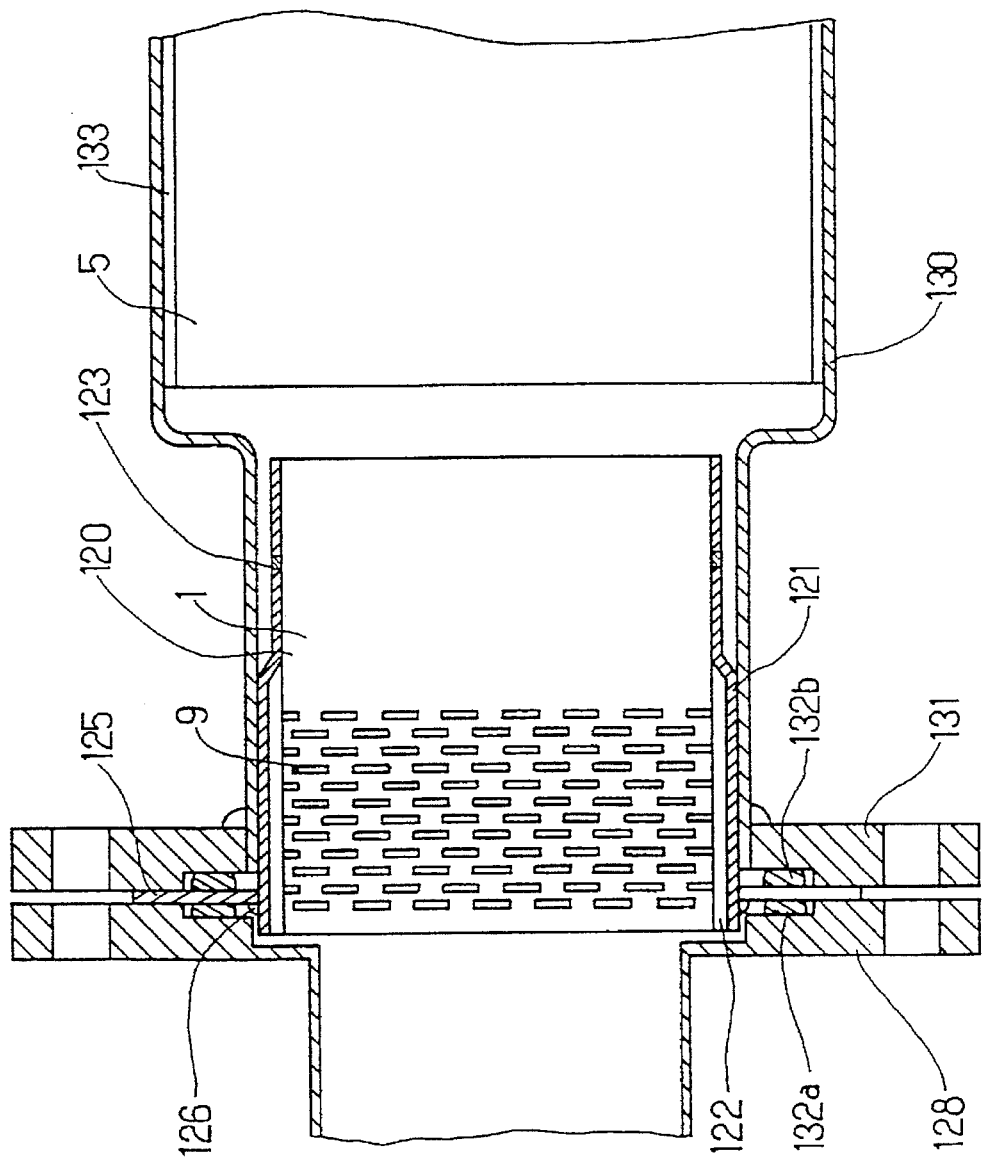
FIG. 30 is a fragmentary sectional composition view illustrating the mounted metal carrier of the sixth embodiment.

FIG. 30 is a view enlargingly illustrating the catalyst converter 120 of the sixth embodiment as per FIG. 27 and the start catalyst 5, a large-volume catalyst converter.

In FIG. 30, the catalyst converter 120 is integrally composed with the start catalyst 5 by means of a housing 130 having a flange 131 at the upstream side.

Within this housing 130, with the flange 125 of the catalyst converter 120 via gaskets 132a and 132b caught between an outlet side flange 128 of the exhaust manifold 3a and a flange 131, the catalyst converter 120 is fixedly and held. On the other hand, the start catalyst 5 is fixedly held via a heat insulating material 133 within the housing 130.

Also as illustrated in FIG. 30, the vicinity of the upstream side of the metal carrier 1 is almost coincided in position on the exhaust gas passage with the large-volume outlet side flange 128 of the exhaust manifold 3a.

The functions of the sixth embodiment will further be described.

Immediately after the engine 2 starts, the exhaust gas passes through the exhaust manifold 3a and reaches the upstream side end part of the catalyst converter 120.

At the upstream side end part of the catalyst converter 120, the outer ring 121 and the metal carrier 1 can not directly contact each other due to the space part 122 provided in the catalyst converter 120. For this reason, the quantity of heat which the exhaust gas has can be effectively provided to the vicinity of the upstream end of the metal carrier 1 before being absorbed by the flange 128.

Furthermore, the heat capacity is arranged to be sufficiently small at the upstream side of the metal carrier 1 by means of the slit parts 9 provided at the upstream side of the metal carrier 1, heat is intensively generated in the vicinity of the upstream end of the metal carrier 1. Therefore, the temperature of the catalyst supported by the metal carrier 1 rapidly reaches the activation temperature at which the catalyst can fully exert its purification performance (generally 300° to 350° C. for ternary catalysts).

Then, due to the conduction of the reaction heat generated by the purification reaction of the exhaust gas at the upstream part of the metal carrier 1 to the downstream side thereof, the activation area is rapidly expanded.

As described in the above, after the engine 2 starts, the catalyst converter 120 can rapidly heat the catalyst to the activation temperature throughout the whole area. Moreover, the catalyst converter 120 can efficiently provide a large quantity of reaction heat generated by the purification reaction within the catalyst converter 120 to the large-volume start catalyst 5 for promoting the earlier temperature rise for activation.

In the sixth embodiment, due to the above functions, even under a condition in which a large volume of exhaust gas flows, such as when the engine 2 is in acceleration and the engine 2 is heavily loaded, sufficient purification performance can be secured.

Figure 31:
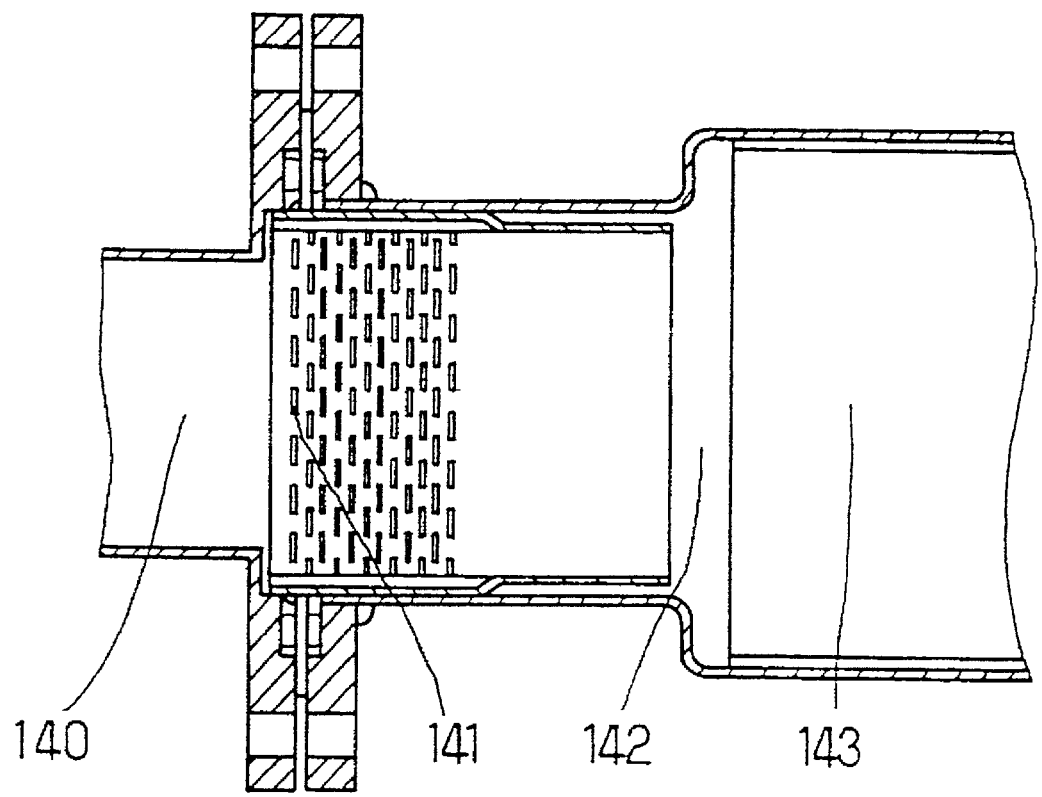
FIG. 31 is an illustrative view illustrating the measurement spots of the sixth embodiment.

The above effects will be described by using the actual measurement data. FIG. 31 illustrates the measurement positions for the internal temperature of the catalyst converter 120 of the sixth embodiment with the numerals 140 through 143.

Figure 32:
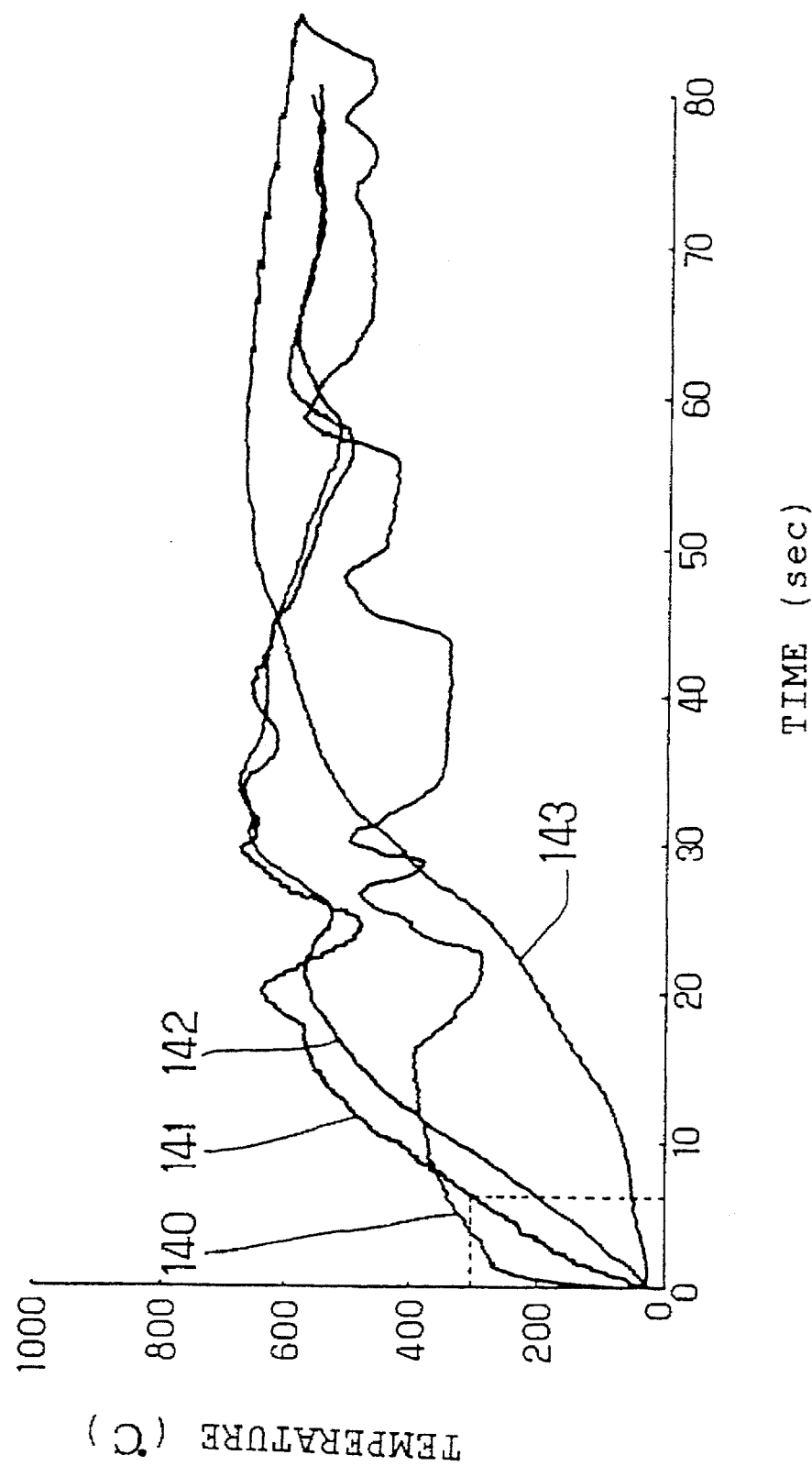
FIG. 32 is a relational view illustrating the relation between the time and the temperature in the metal carrier of the sixth embodiment.

FIG. 32 illustrates the results of the measurement.

FIG. 32 illustrates each temperature measurement data ingested immediately after the cold start of the engine 2 after leaving 8 hours in the atmosphere of 25° C.

The temperature in the exhaust gas passage at 140 is measured and the measured data is shown in FIG. 32. The temperature in the vicinity of the upstream end of the exhaust gas passage of the metal carrier 1, identified at 141, rises to the temperature at which the catalyst begun to be activated in seconds after the engine 2 starts, and due to the reaction heat generated by the catalyst reaction, the temperature further rises to exceed 500° C. within 20 seconds. Along with this temperature rise, the temperature of the exhaust gas from the metal carrier 1, identified at 142, also rises in the same way. Therefore, the temperature in the vicinity of the upstream side of the exhaust gas passage within the start catalyst 5 arranged immediately behind the metal catalyst carrier 1, identified at 143, rises to the activation temperature in about 25 seconds after the engine 2 starts. Then, due to the reaction heat of the start catalyst 5, the activated area rapidly expands towards the downstream side. As a result, even when the engine 2 is in acceleration or heavily loaded under which condition a large volume of exhaust gas flows, sufficient purification performance can be obtained.

Seventh Embodiment

Figure 33:
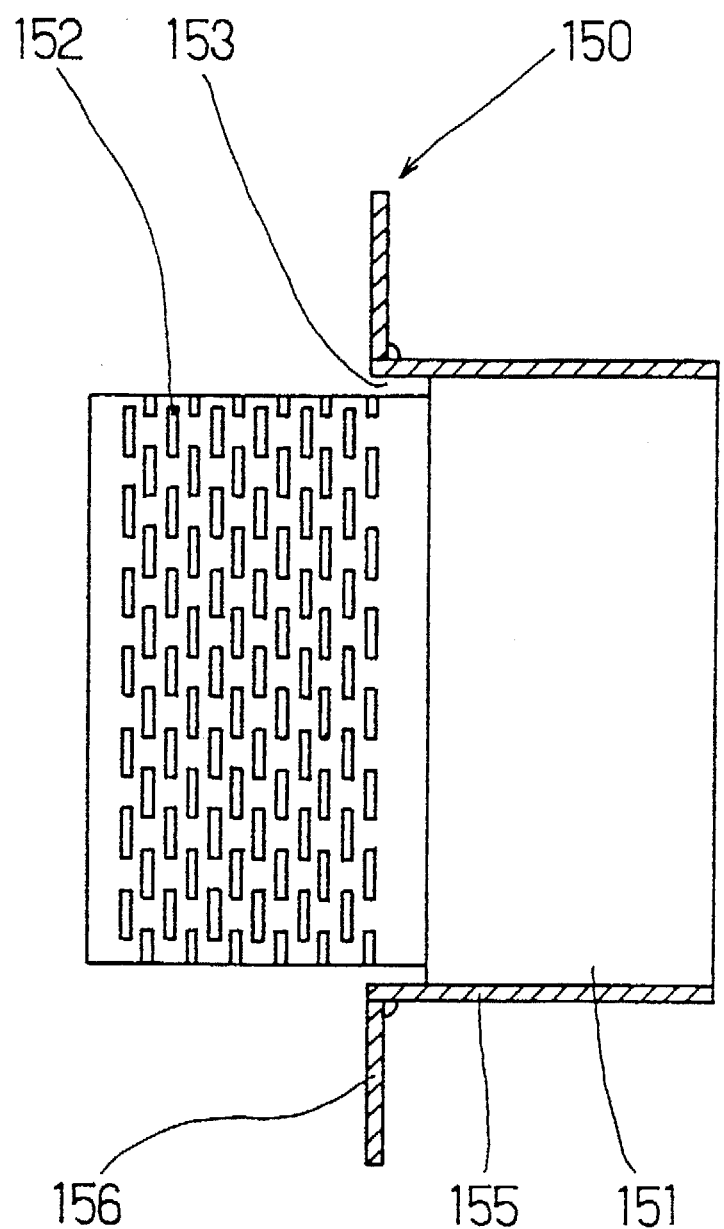
FIG. 33 is a cross-sectional view illustrating the metal carrier of the seventh embodiment.

The catalyst converter 150 of the seventh embodiment is illustrated in FIG. 33.

A metal carrier 151 of this catalyst converter 150 is, as composed in the first embodiment, a corrugated sheet and a flat sheet (both not illustrated) in which slit parts 152, collectively constituting a low-heat-capacity area, are formed only at the upstream side of the exhaust gas passage, are laminated or wound together.

However, the metal carrier 151 of the seventh embodiment is different from the metal carrier 1 of the first embodiment in that the number of windings of the corrugated sheet and flat sheet at the downstream side of the exhaust gas passage excluding the slit parts 152 is larger than that at the slit parts 152.

For this difference, the diameter of the metal carrier 151 at the slit parts 152, collectively constituting the upstream side of the exhaust gas passage, is smaller than that at the part with no slit parts, constituting the downstream side of the exhaust gas passage.

By composing the metal carrier 151, an outer ring 155 can be so arranged that a space part 153 is provided between the slit parts 152 of the metal carrier 151 and the outer ring 155 without swaging applied to the outer ring 121 of the sixth embodiment to change the diameter thereof.

Furthermore, in the seventh embodiment, the space part 153 formed between the slit parts 152 of the metal carrier 151 and the outer ring 155 is shorter in the axial direction that of the sixth embodiment.

On the other hand, the outer ring 155 is connected to the metal carrier 151 only at the place where the slit parts 152, constituting the downstream side of the exhaust gas passage of the metal carrier 151, are not formed, and a flange 156 is provided to the upstream side end part of the exhaust gas passage of the outer ring 155.

Figure 34:
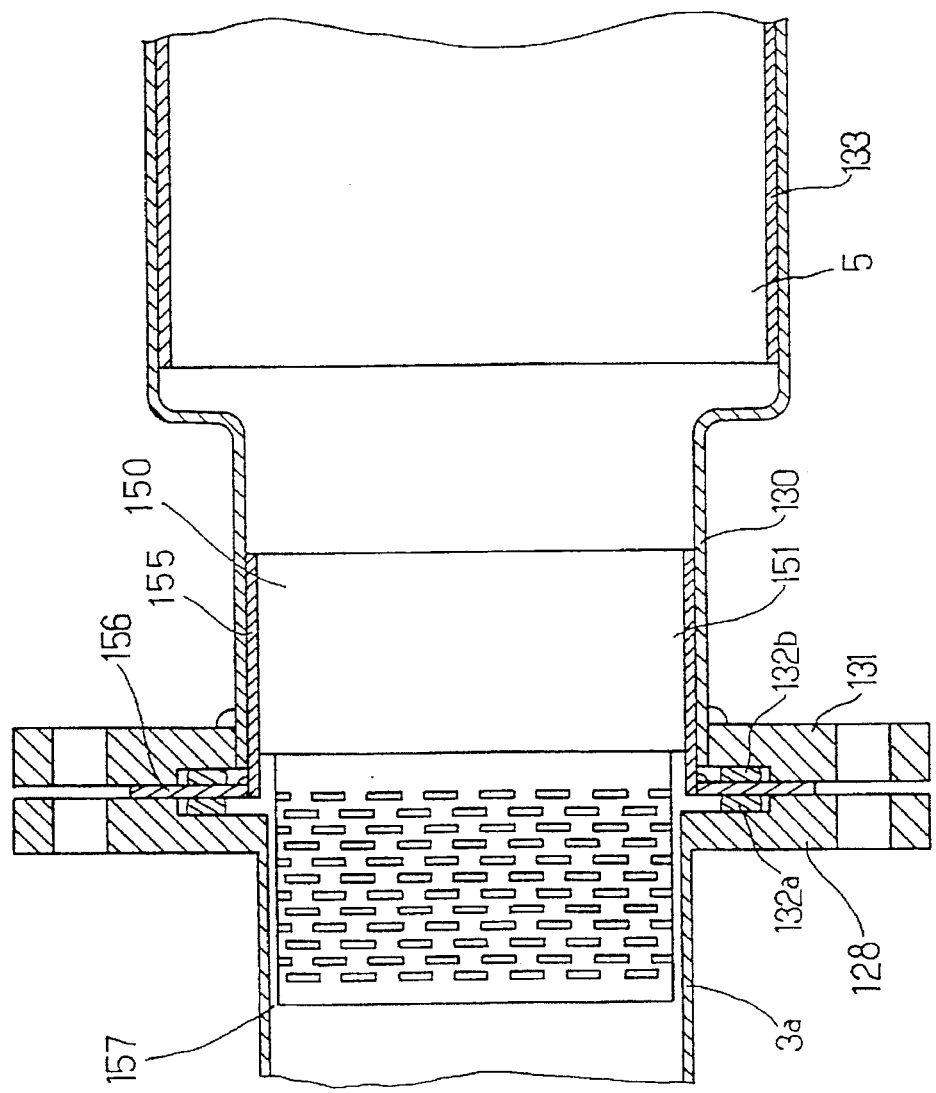
FIG. 34 is a fragmentary composition view illustrating a part mounted with metal carrier of the seventh embodiment.

FIG. 34 illustrates the composition with the catalyst converter 150 of the seventh embodiment is arranged within the exhaust gas passage.

As illustrated in FIG. 34, also in the seventh embodiment, the catalyst converter 150 is fixedly held within the exhaust gas passage with the flange 156 of the outer ring 155 caught between the outlet side flange 128 and the flange 131 via the gaskets 132a and 132b.

By fixedly holding the catalyst converter 150 in the above way, a space part 157 is formed between the metal carrier 151 and the exhaust manifold 3a.

According to the above arrangement, by shortening the distance of the space part 153 in the axial direction than that of the sixth embodiment, the slit parts 152 formed at the upstream side of the exhaust gas passage of the metal carrier 151 can be positioned at the upstream side from the large-heat-capacity outlet side flange 128 of the above exhaust manifold 3a.

As a result, at the temperature rise time in the slit parts 152 of the metal carrier 151, the heat shrink of the metal carrier 151 can not easily be caused due to the large-heat-capacity flange 128.

Eighth Embodiment

Figure 35:
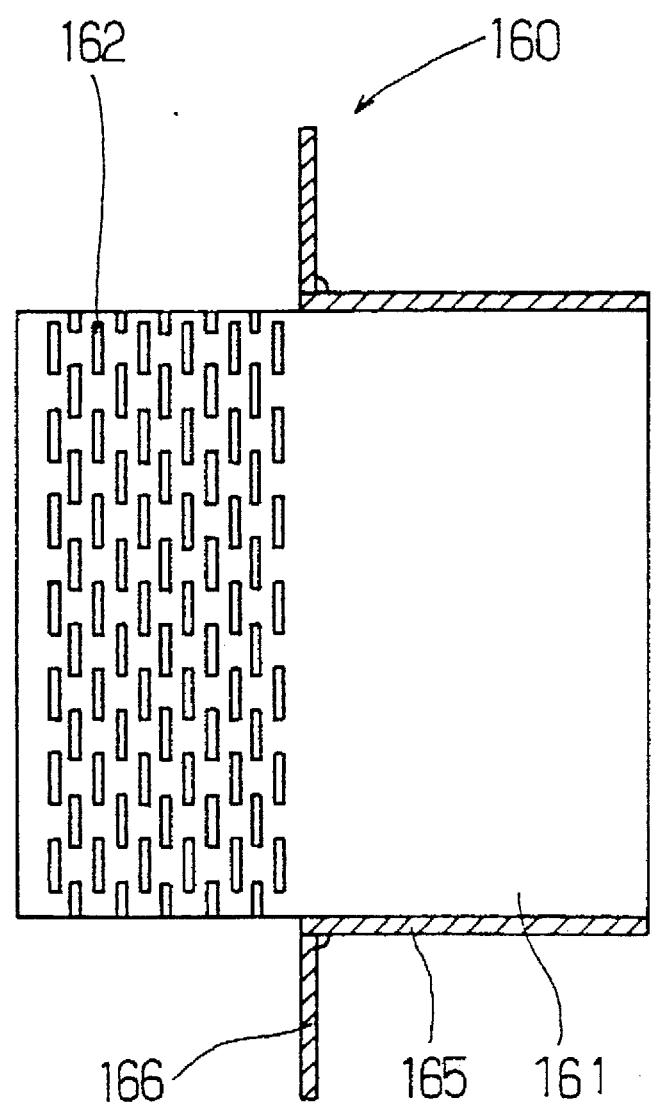
FIG. 35 is a cross-sectional view illustrating the metal carrier of the eighth embodiment.

The catalyst converter 160 of the eighth embodiment is illustrated in FIG. 35. As composed in the first embodiment, a metal carrier 161 composing the catalyst converter 160 of the eighth embodiment is composed of a lamination and winding of flat sheet and a corrugated sheet (both not illustrated) with slit parts 162 formed at the upstream side of the exhaust gas passage.

The metal carrier 161 is connected to an outer ring 165 at the downstream side of the exhaust gas passage where the slit parts 162 are not formed. A space 167 is provided between metal carrier 161 and exhaust manifold 3a at the upstream side of the exhaust gas passages where the slit parts 162 are formed.

Figure 36:
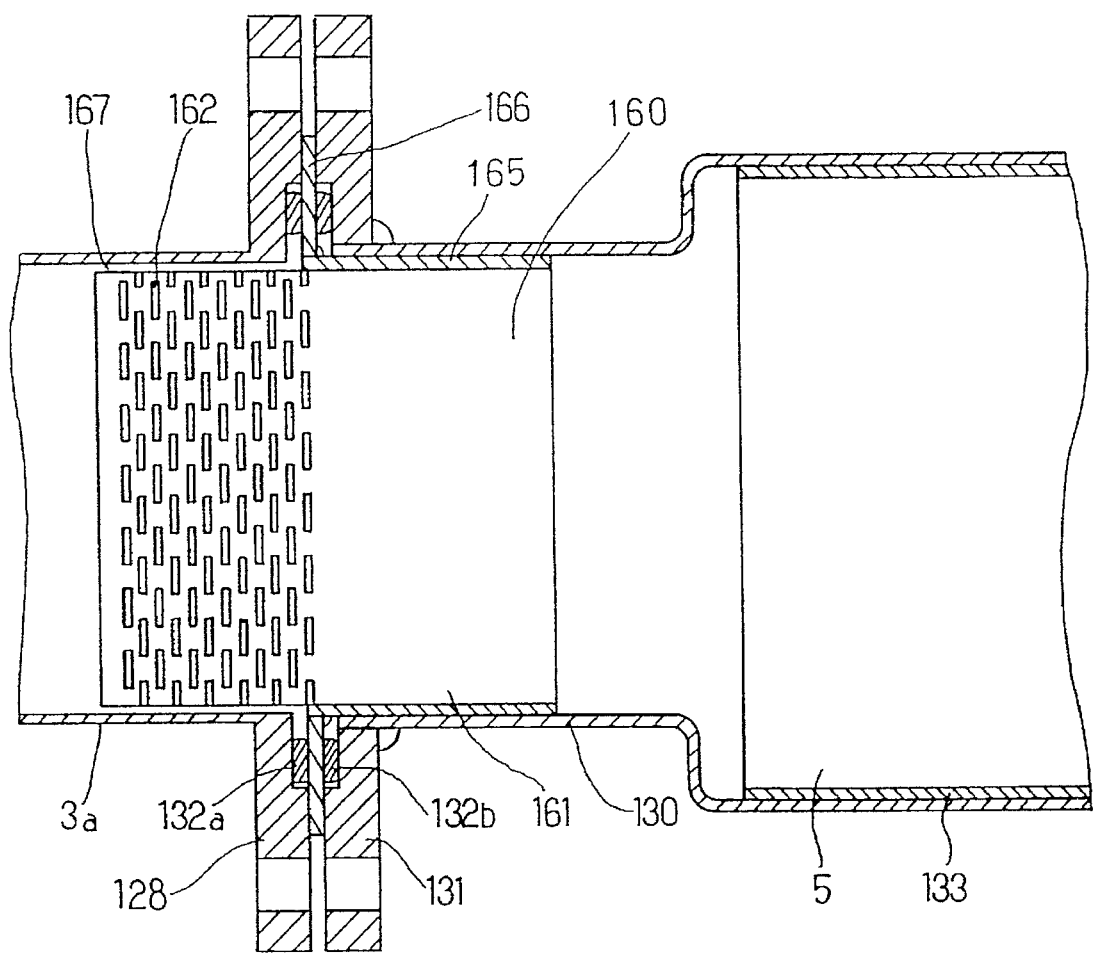
FIG. 36 is a fragmentary composition view illustrating a part mounted with the metal carrier of the eighth embodiment.

The eighth embodiment is different from the sixth embodiment in that any space part is not provided between the outer ring 165 and the metal carrier 161. The composition of the catalyst converter 160 arranged within the exhaust gas passage is illustrated in FIG. 36. As illustrated in FIG. 36, also in the eighth embodiment, the catalyst converter 160 is fixedly held within the exhaust gas passage with a flange 166 provided on an outer ring 165 caught between the outlet side flange 128 and the flange 131 via the gaskets 132a and 132b.

According to the above arrangement, in the same way as the seventh embodiment, the slit parts 162 formed at the upstream side of the exhaust gas passage of the metal carrier 161 can be positioned at the upstream side from the large-heat-capacity outlet side flange 128 of the above exhaust manifold 3a.

As a result, at the temperature rise time in the slit parts 162 of the metal carrier 161, the heat shrink of the metal carrier 161 can not easily be caused due to the large-heat-capacity flange 128.

This can improve the temperature rise characteristics of the metal carrier 161.

By employing the sixth, seventh or eighth embodiment, the upstream side part of the exhaust gas passage of the metal carrier can control the heat radiation in the radial direction due to the heat insulation effect of the air layer provided between the outer surface of the metal carrier and the inner surface of the outer ring.

Furthermore, due to no large-heat-capacity flange structure for arranging the catalyst converter body in some place within the exhaust gas passage, the temperature of the catalyst can rapidly be raised to the activation temperature at which the catalyst can exert the sufficient purification performance immediately after the cold start of the engine 2 in particular. Also in the eighth embodiment, the metal carrier may be obtained by only laminating a flat sheet and a corrugated sheet.

Ninth Embodiment

In the catalyst converter 120 of the sixth embodiment, the connection of the metal carrier 1 and the outer ring 121 is made at an end part of the metal carrier 1 where the slit parts 9 of the metal carrier 1 are not formed.

According to this arrangement, the conduction of the heat received by the slit parts 9 of the metal carrier 1 can be checked on the way from the metal carrier 1 to the outer ring 121 by forming the space part 122.

However, this arrangement of connecting the outer ring 121 to the metal carrier 1 at an end part is equivalent to cantilevering the metal carrier 1.

The catalyst converter 120 arranged within the exhaust gas passage is easily affected by vibration, etc, when the applied vehicle is in traveling due to this cantilevering of the metal carrier 1, causing problems, such as the breakage of the metal carrier 1 and incomplete holding back of the metal carrier 1.

Furthermore, the metal carrier 1 itself is heated to a high temperature due to the catalyst reaction with the exhaust gas, and the allowable stress of the material of the outer ring 121 is sharply reduced. As a result, the catalyst converter 120 is easily affected by the vibration, etc. when the applied vehicle is in travelling.

In order to solve these problems, it is necessary to minimize the force applied to the connecting points between the outer ring 121 and the metal carrier 1.

Accordingly, it is a primary object of the ninth embodiment to reduce the force applied to the connecting points of the metal carrier 1 and the outer ring 121.

Figure 37:
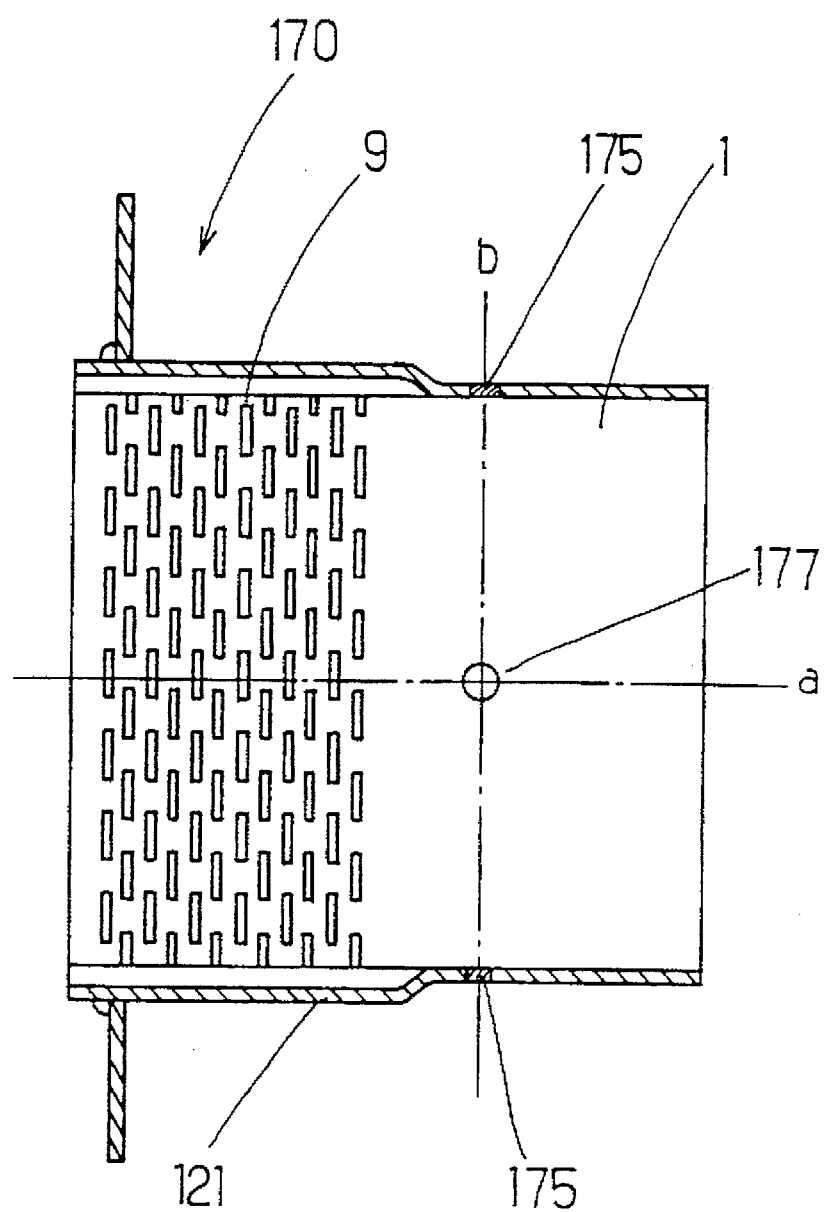
FIG. 37 a cross-sectional view illustrating the metal carrier of the ninth embodiment.

FIG. 37 is a cross-sectional view illustrating the catalyst converter 170 of the ninth embodiment cut across in the axial direction. As composed in the first embodiment, the metal carrier 1 of the ninth embodiment is composed of an alternating winding of a flat sheet and a corrugated sheet both with slit parts 9 at one side.

In this ninth embodiment, the metal carrier 1 and the outer ring 121 are connected at more than one connecting points. The ninth embodiment is characterized by the position of these connecting points 175.

Specifically, the ninth embodiment is characterized by the connecting points 175 which are provided in the vicinity of a line b perpendicular at the center of gravity 177 of the metal carrier 1 to the axial line a of the metal carrier 1 passing through the center of gravity.

By setting the contact points 175 to the specified positions, the load applied on the contact points due to cantilevering the metal carrier 1 can be eliminated. As a result, the damage to and incomplete holding back of the metal carrier 1 due to vibration, etc. when the applied vehicle is in travelling, can be controlled, and durability to such vibration, etc. can be improved.

In addition, by adjusting the width of the slit parts 9 formed in the metal carrier 1 and shifting the center of gravity of the metal carrier 1 to any position, the positions of these contact points 175 can also be freely adjusted.

In the ninth embodiment, by providing slit parts as a small-heat-capacity area, the center of gravity of the metal carrier 1 can be shifted to the downstream side of the exhaust gas passage of the metal carrier 1.

Figure 38:
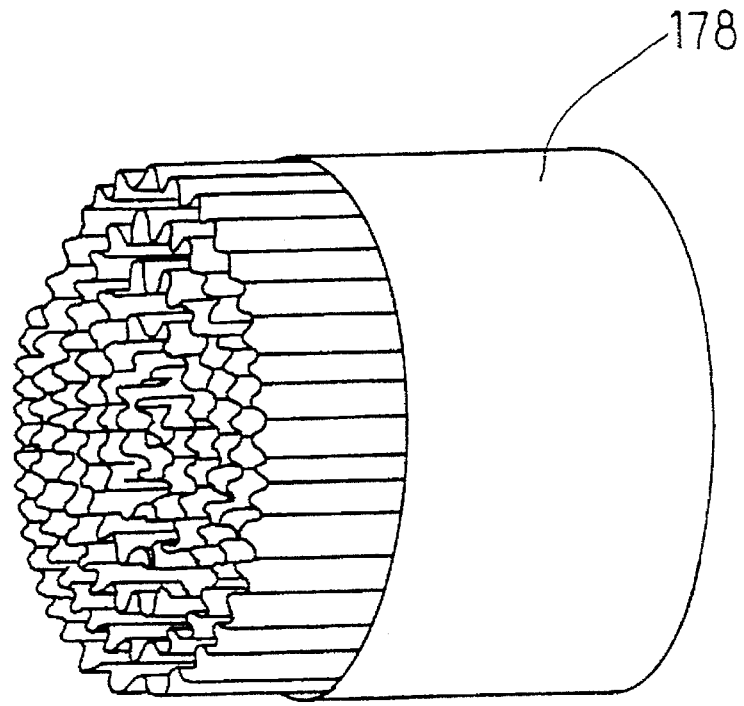
FIG. 38 is a perspective view illustrating the metal carrier of another embodiment according to the ninth embodiment.
Figure 39:
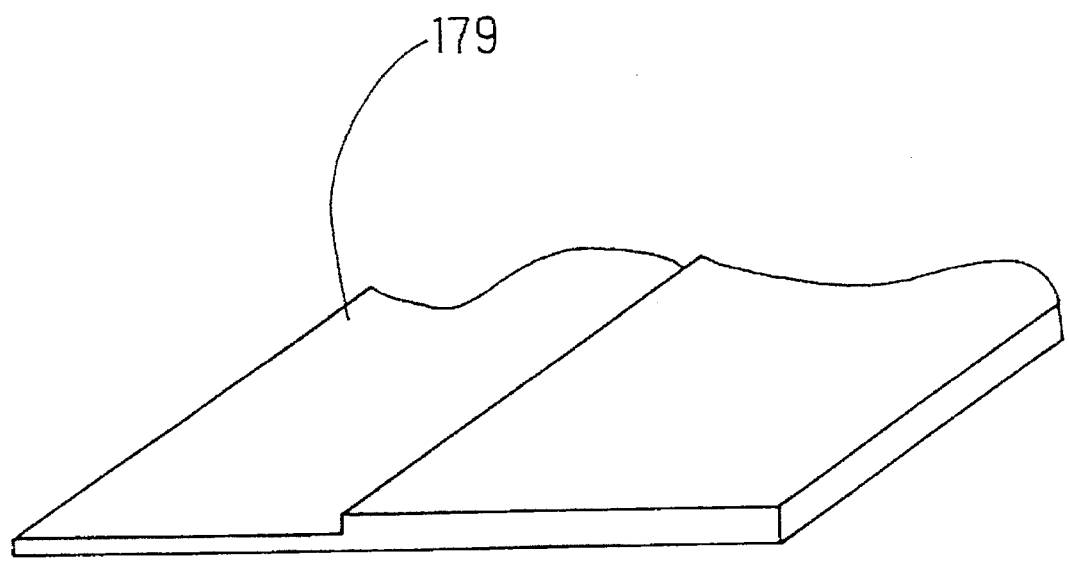
FIG. 39 is a schematic view illustrating the flat sheet forming the metal carrier of another embodiment according to the ninth embodiment.

FIGS. 38 and 39 illustrate other embodiment according to the present invention. As illustrated in FIG. 38, the center of gravity of a metal carrier 178 may be shifted backwards by shortening either a corrugated sheet or a flat sheet both composing the metal carrier 178 to form a low-heat-capacity area.

Furthermore, as illustrated in FIG. 39, the center of gravity of the metal carrier 178 may be shifted backwards by thinning either side of a metal sheet 179, either corrugated or flat, to form a low-heat-capacity area.

Also in the ninth embodiment, the metal carrier 1 may be formed only by alternatingly laminating the flat sheet and the corrugated sheet.

Tenth Embodiment

In the sixth embodiment, the catalyst converter 120 is composed of the metal carrier 1 and the outer ring 121.

For application to the sixth embodiment, the metal carrier 1 and the outer ring 121 may be fixedly connected to each other by forced fitting. When the outer ring 121 is forcedly fit over the metal carrier 1, a problem may be caused that the metal carrier 1 is deformed by the friction force generated between the most outer periphery of the metal catalyst carrier 1 and the inner periphery of the outer ring 121.

Accordingly, it is the primary object of the tenth embodiment to prevent the deformation of the metal carrier 1 in such forced fitting.

Figure 40:
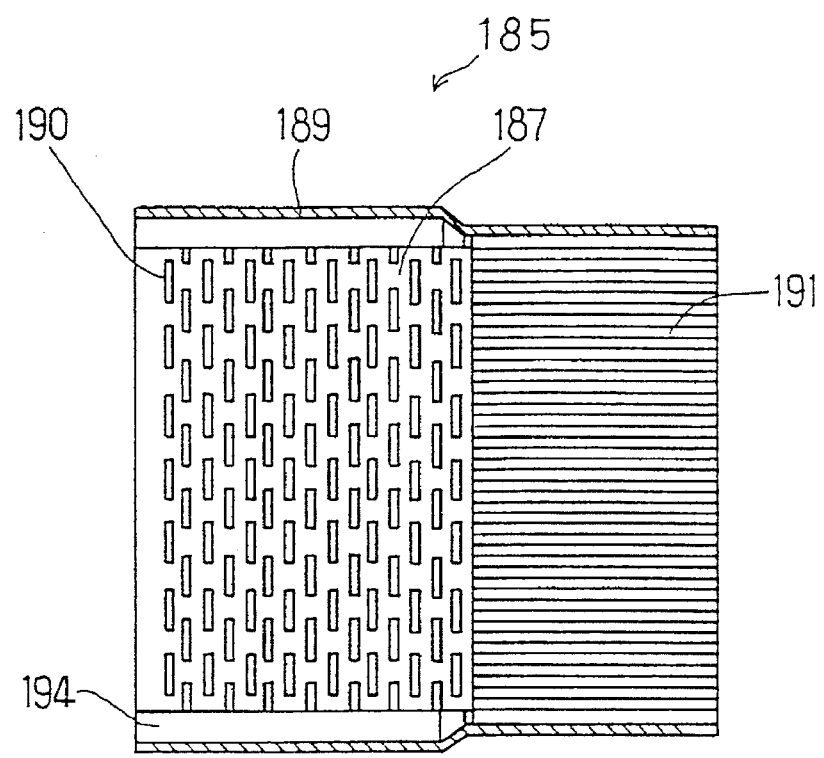
FIG. 40 a cross-sectional view illustrating the metal carrier of the tenth embodiment.
Figure 41:
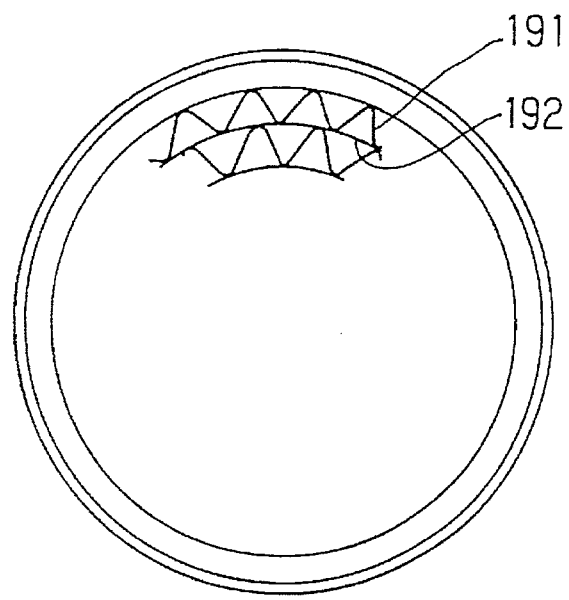
FIG. 41 is a front view illustrating the metal carrier of the tenth embodiment.

The tenth embodiment will be described referring to FIG. 40 through 43. FIGS. 40 and 41 illustrate the configuration of the catalyst converter 185 of the tenth embodiment.

Here, FIG. 40 is a cross-sectional view illustrating the catalyst converter 185 of the tenth embodiment cut across in the axial direction, and FIG. 41 is a front view illustrating the catalyst converter 185.

The catalyst converter 185 is composed of a metal catalyst carrier 187 and an outer ring 189 for fixedly holding back this metal carrier 187.

The metal carrier 187 is composed of an alternating winding of a corrugated sheet 191 and a flat sheet 192 both with slit parts 190 formed at one end side. The corrugated sheet 191 and the flat sheet 192 are connected by means of laser welding, etc. at the end part in the axial direction.

The metal carrier 187 is so arranged that the corrugated sheet 191 and the flat sheet 192 are wound together so that the corrugated sheet 191 defines the most outer periphery along only a portion of the metal carrier 187 and is in contact with the outer ring 189.

That is, by forcedly fitting the outer ring 189 over the most outer periphery of the corrugated sheet 191, the metal carrier 187 and the outer ring 189 are forcedly fixed each other. Furthermore, the metal carrier 187 and the outer ring 189 are connected by means of laser welding, etc. at the downstream side in the axial direction of the metal carrier 187.

At the upstream side of the metal carrier 187 in the axial direction, where the slit parts 190 are formed, a space part 194 is formed between the outer periphery of the metal carrier 187 and the outer ring 189 connected to the metal carrier 187 only at one end part.

Figure 42:
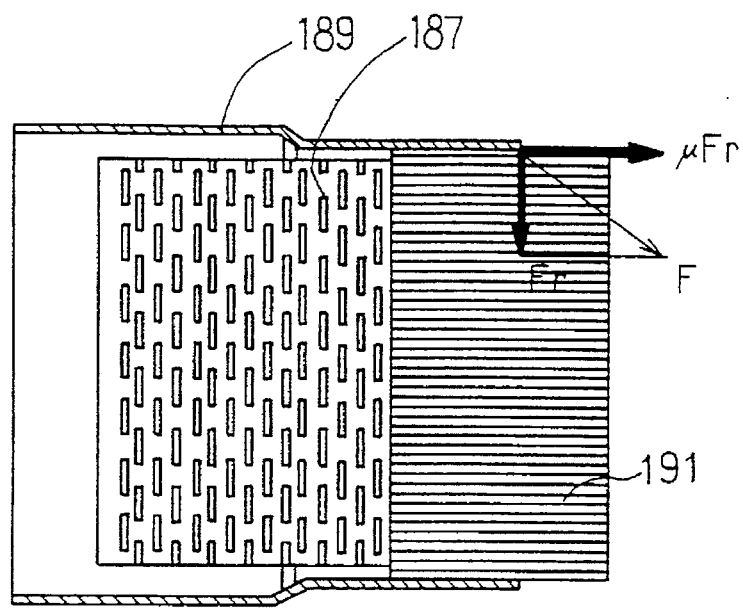
FIG. 42 is an illustrative view illustrating the effects of the tenth embodiment.

The tenth embodiment is characterized by the method of connecting the metal carrier 187 and the outer ring 189, which will be further described referring to FIG. 42.

The corrugated sheet 191 is wound around the most outer periphery of the metal carrier 187 at the end part of the downstream side. The outside diameter of the metal carrier 187 is set to be equal to or slightly larger than the inside diameter of the outer ring 189. When the outer ring 189 is forcedly fit over the corrugated sheet 191 which constitutes the connecting part only at the downstream part in the axial direction, an end side of the metal carrier 187, the metal carrier 187 and the outer ring 189 are fixed.

When the outer ring 189 is forcedly fixed over the metal carrier 187, a radially shrinking force Fr is caused to the corrugated sheet 191 constituting the most outer periphery and the outer ring 189 and a friction force μFr is caused to between the corrugated sheet 191 constituting the most outer periphery of the metal carrier 187 and the outer ring 189. Therefore, as illustrated in FIG. 42, at an end part of the outer ring 189, the resultant force F of the radial shrinking force Fr and the friction force μFr acts on the honeycomb catalyst carrier 187.

Furthermore, as the friction force μFr intensively acts on the interface between the corrugated sheet 191 constituting the most outer periphery of the metal carrier 187 and the outer ring 189, the resultant force F caused to the metal carrier 187 is the largest when the outer ring 189 is forcedly fix over the metal carrier 187.

Compared with the outer ring 189, the metal carrier 187 is smaller in wall thickness and lower in rigidity due to the reason of its own structure. What is more, the corrugated sheet 191 is formed on the most outer periphery of the metal carrier 187 at the connecting surface between the metal carrier 187 and the outer ring 189, and the corrugated sheet 191 is welded to the flat sheet 192 only at the inner periphery thereof. Therefore, when friction force is applied from the outside, the corrugated sheet 191 may easily be deformed.

Figure 43:
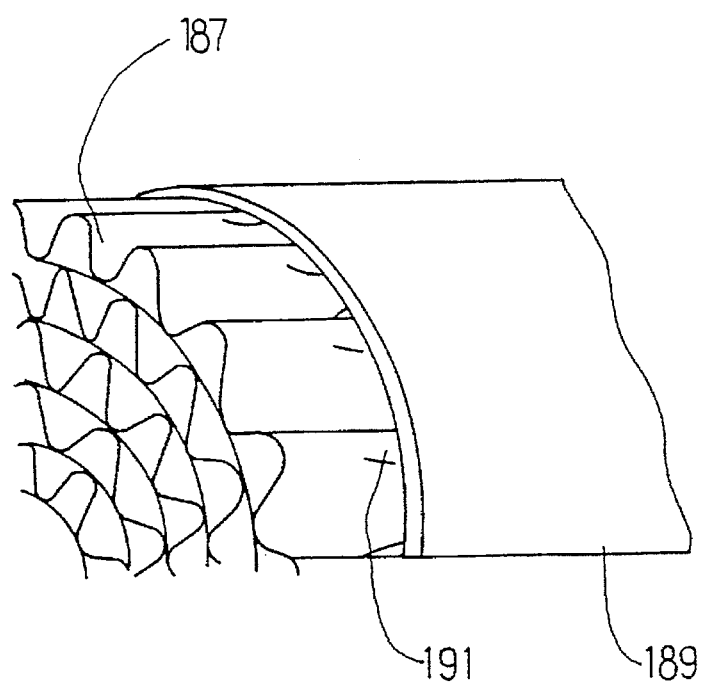
FIG. 43 is an illustrative view illustrating the effects of the tenth embodiment.

Consequently, as illustrated in FIG. 43, when the outer ring 189 is forcedly fit over the metal carrier 187, the corrugated sheet 191 of the most outer periphery, which is a part most likely to be deformed of all the parts of the metal carrier 187, is deformed first of all.

The resultant force F of the radial shrinking force Fr and the friction force μFr is absorbed by the deformation of the corrugated sheet 191, and, as a result, the stress working on the entirety of the metal carrier 187 can be reduced.

After the outer ring 189 is forcedly fit over the metal carrier 187, the outer ring 189 and the metal carrier 187 are connected by means of laser welding, etc. at the most outer periphery of the deformed corrugated sheet part 191.

At this time, the most outer periphery of the corrugated sheet 191, which is coincided with the connecting part of the metal carrier 187 and the outer ring 189 and deformed first of all in the force fitting, has a larger area to contact the outer ring due to the deformation.

For this reason, the metal carrier 187 and the outer ring 189 can have an increased contact area and consequently better welding condition.

As a result, the mechanical strength and durability of the catalyst converter 135 can be improved.

Figure 44:
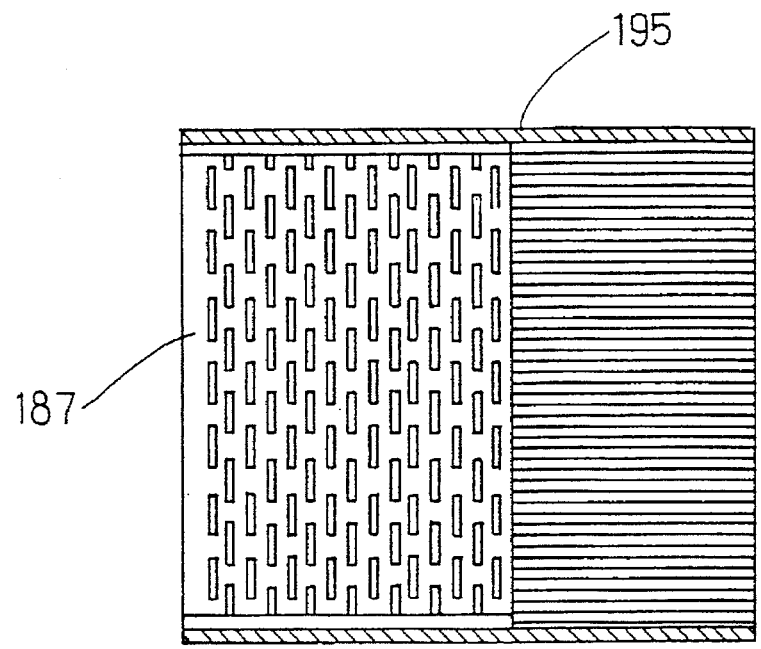
FIG. 44 is a cross-sectional view illustrating the metal carrier of another embodiment according to the tenth embodiment.

In the tenth embodiment, the diameter of the outer ring 189 at the end part corresponding to the slit parts 190 of the metal carrier 187 is larger than the diameter of the other end part. However, the tenth embodiment is not limited to this arrangement but may be simply tubular as an outer ring 195 illustrated in FIG. 44 for example.

Figure 45:
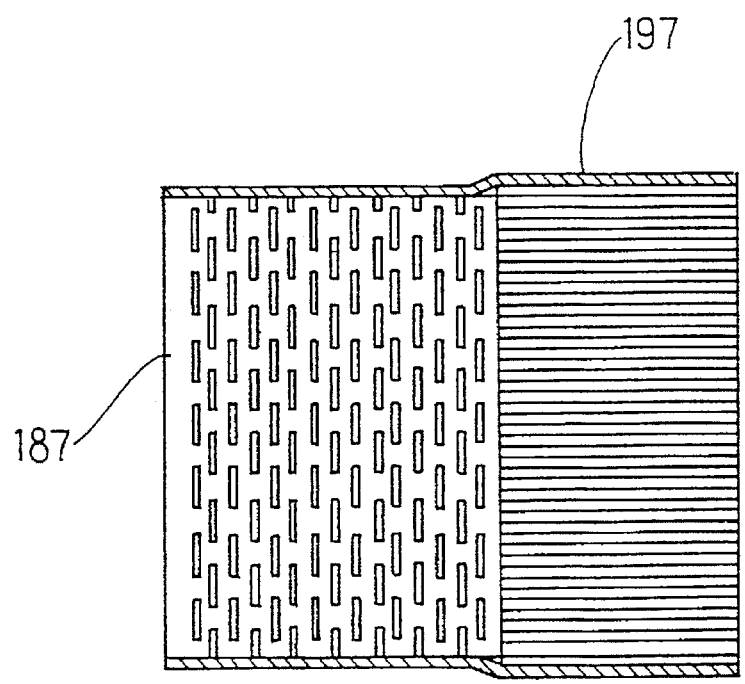
FIG. 45 is a cross-sectional view illustrating the metal carrier of another embodiment according to the tenth embodiment.

Furthermore, the shape like an outer ring 197 illustrated in FIG. 45, for example, is also acceptable.

Figure 46:
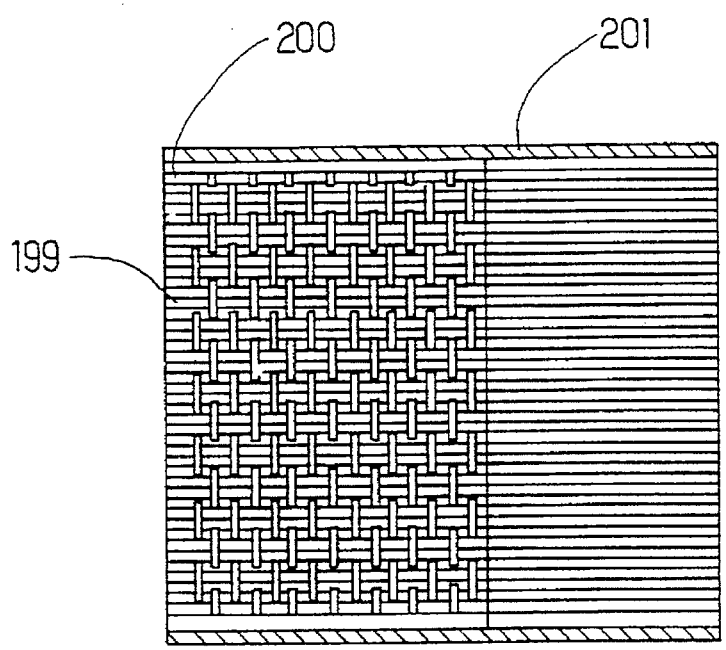
FIG. 46 is a cross-sectional view illustrating the metal carrier of another embodiment according to the tenth embodiment.

What is more, in the above description, the most outer periphery is the corrugated sheet 191 only at the interface of the metal carrier 187 and outer ring 189. However, the tenth embodiment is not limited to this arrangement but may be so arranged as illustrated in FIG. 46 that all the most outer periphery of the metal carrier 199 is a corrugated sheet 200 and a tubular outer ring 201 is forcedly fit over the metal carrier 199.

When all the outer periphery of the metal carrier is composed of one corrugated sheet 200, the most outer periphery of the metal carrier 199 over which the outer ring 201 is not forcedly fit is also subject to the effects of the deformation of the corrugated sheet 200 over which the outer ring 201 is forcedly fit.

Figure 47:
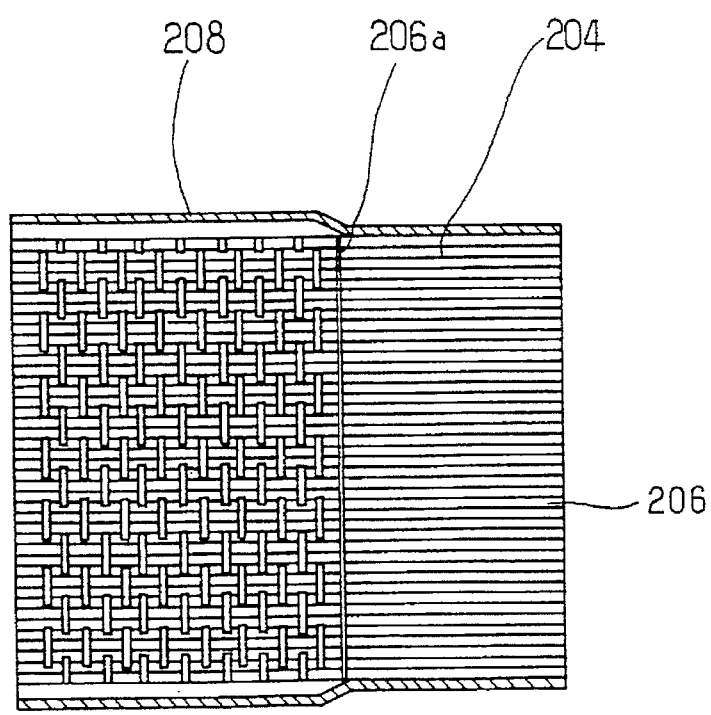
FIG. 47 is a cross-sectional view illustrating the metal carrier of another embodiment according to the tenth embodiment.

Therefore, as illustrated in FIG. 47, the tenth embodiment may be so arranged that a metal carrier 204 is alternatingly wound by a flat sheet and a corrugated sheet and then only the most outer periphery of the corrugated sheet of the metal carrier 204 is provided with a cutout part 206a.

By providing the cutout part 206a only to the most outer periphery of the corrugated sheet 206 in the above way, the effects of the deformation caused to the corrugated sheet when the outer ring 208 is forcedly fit thereover to the most outer periphery of the corrugated sheet can be prevented.

Figure 48:
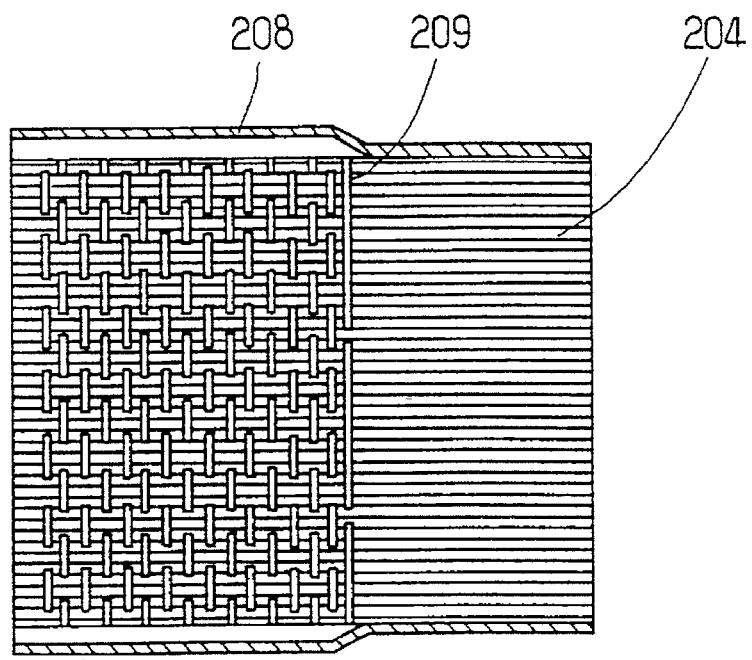
FIG. 48 is a cross-sectional view illustrating the metal carrier of another embodiment according to the tenth embodiment.

Furthermore, the shape of the cutout part is not limited to the one which extends all over the most outer periphery of the corrugated sheet 206, but may elongate only the last slits of the slit parts such as the one 209 illustrated in FIG. 48.

Figure 49:
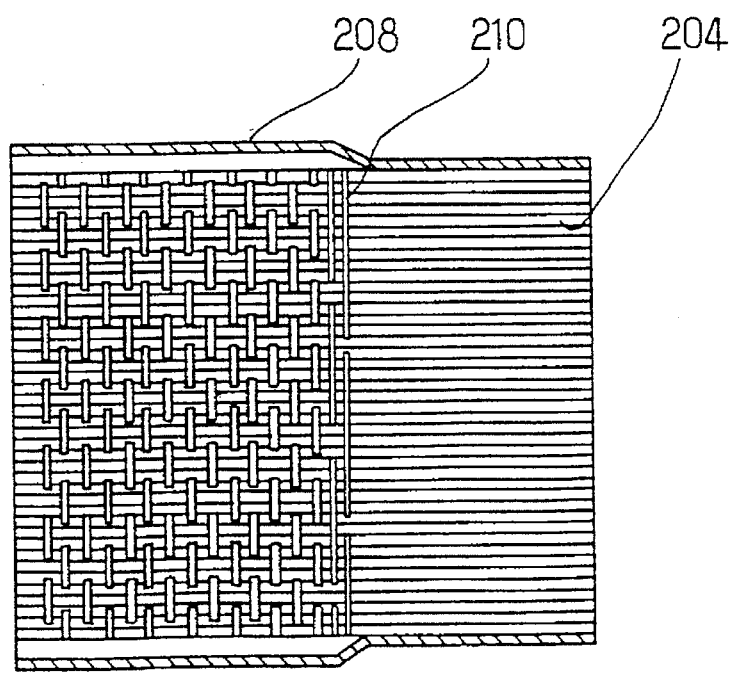
FIG. 49 is a cross-sectional view illustrating the metal carrier of another embodiment according to the tenth embodiment.

Moreover, as illustrated in FIG. 49, the cutout part 210 may be shaped by elongating the last few lines of slits may be increasingly elongated.

Also, the metal carrier may be composed only of a lamination of the flat sheet and the corrugated sheet.

Eleventh Embodiment

In the sixth embodiment, it is proposed that the outer ring 121 should be provided, which is connected to the most outer periphery of the metal carrier 1 at the downstream side in the axial direction of the metal carrier 1 which includes the slit parts at the upstream side in the axial direction thereof.

In such arrangement, the connection of the metal carrier 1 and outer ring 121 is achieved by apply welding to a plurality of spots. In such arrangement, however, it is difficult to simultaneously apply welding to all the connecting places, and therefore, welding should be applied to each spot one by one or to a group of places group by group.

Here, possible problems with this welding method will be described referring to FIGS. 52A and 52B.

Figure 52A:
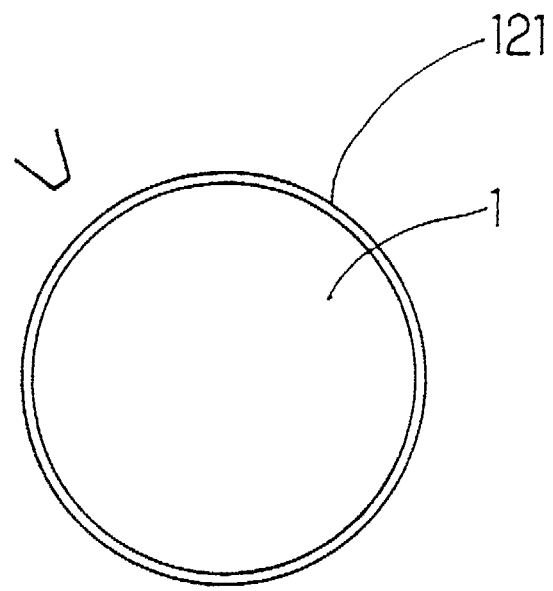
FIGS. 52A and 52B are illustrative views illustrating the problems with the eleventh embodiment.
Figure 52B:
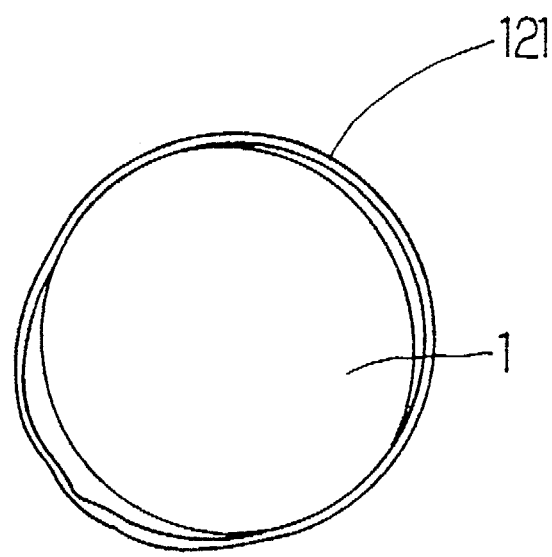

FIG. 52A is a schematic rear view illustrating the condition of the catalyst converter with the metal carrier 1 and the outer ring 121 forcedly fit over the metal carrier 1 but not yet welded. FIG. 52B is also a schematic rear view illustrating the condition of the catalyst converter with the metal carrier 1 and the outer ring 121 forcedly fit over the metal carrier 1 and welded at one spot.

As illustrated in FIG. 52A, the catalyst converter is in good condition with no clearance between the metal carrier 1 and the outer ring 121 before welding. After applying welding at one spot, however, the welded spot is heated to near the melting point of each material of the outer ring 121 and the metal carrier 1, and, as a result, the outer ring 121 sustains thermal deformation and thermal strain. This causes troubles, such as clearance between the outer ring 121 and the metal carrier 1 at the welded spot, and defective welding may be caused, and it is difficult to obtain good welding strength.

Accordingly, it is the primary object of the eleventh embodiment to reduce the effects of the thermal deformation at the welded parts on the other welded parts and obtain good welding strength by providing cutouts at the rear part of the metal carrier 1 in the axal direction from the rear end in the axial direction.

Figure 50:
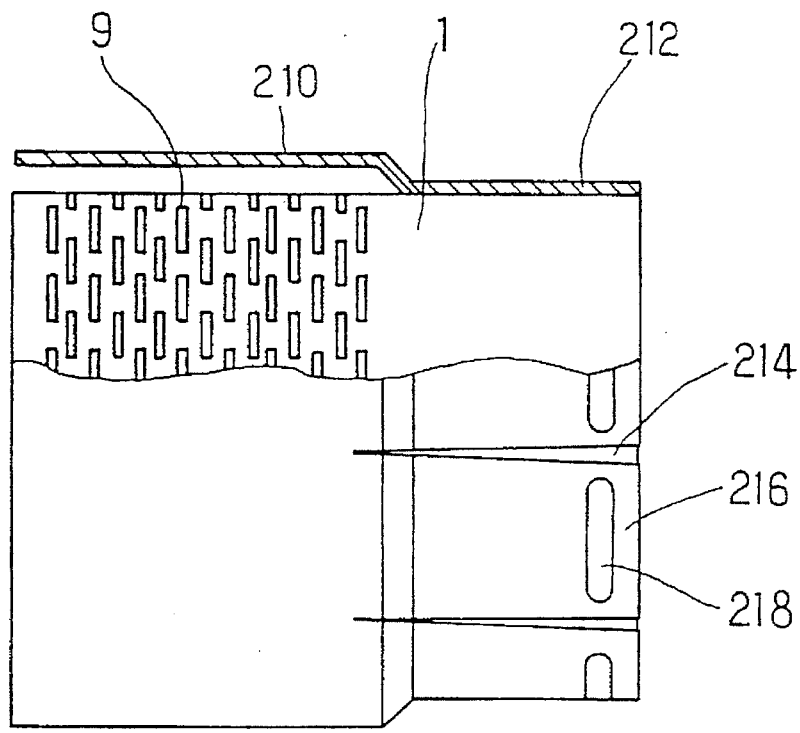
FIG. 50 is a fragmentary sectional view illustrating the metal carrier of the eleventh embodiment.
Figure 51:
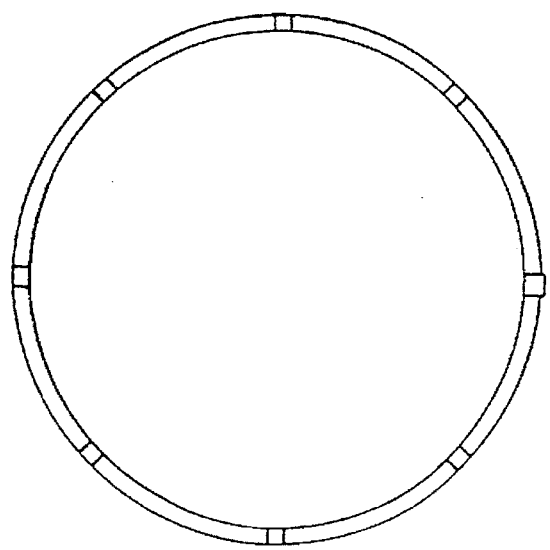
FIG. 51 is a schematic rear view illustrating the metal carrier of the eleventh embodiment.

FIG. 50 illustrates the cross-sectional view of the catalyst converter 210 of the eleventh embodiment cut across in the axial direction. FIG. 51 illustrates a rough rear view of the catalyst converter 210.

The catalyst converter 210 is composed of the metal carrier 1 described in the description of the first embodiment and an outer ring 212 for fixedly holding back the metal carrier 1.

The eleventh embodiment is characterized by the shape of the outer ring 212.

The outer ring 212 is cylindrical, and connected to the metal carrier 1 at the downstream side in the axial direction where the slit parts 9 are not formed. Particularly, the side where this outer ring 212 is connected to the metal carrier 1 includes strip parts 216.

The outer ring 212 is forcedly fit over the metal carrier 1 at the downstream side of the metal carrier 1 in the axial direction. Subsequently, the metal carrier 1 and the outer ring 212 are welded by means of laser welding, etc. at welding places 218 which are coincident with the end part of the downstream side of the strip parts 216 in the axial direction.

At this time, the welding places 218 may be continuous in the radial direction, and the welding method is not limited to laser welding.

The functions of the eleventh embodiment will now be described. The eleventh embodiment is characterized by providing the strip parts 216 by forming the cutout parts 214 in the outer ring 212.

By arranging like the above, the outer ring 212 can be selectively welded to the metal carrier 1 at any strip parts 216. That is, by providing free welding places, the holding strength of the metal carrier 1 can be adjusted to any level.

As illustrated in FIG. 50, the welding spots 218 should preferably be provided at the downstream side of the strip parts 216 in the axial direction. In this arrangement, the heat conduction distance between the mutual strip parts 216 of the outer ring 212 can be extended, and whereby the effects of the thermal stress and thermal strain caused by welding may be checked.

However, as the width of these cutout parts 214, c (FIG. 53), may cause gas leakage, the width c should preferably be minimized.

Furthermore, in the eleventh embodiment, the strip parts 216 are formed at the outer ring 212, and these strip parts 216 are of cantilever structure. For this structure, the metal carrier 1 can be fixedly held by taking advantage of the deflection of the strip parts 216.

In addition, as the outer ring 212 can be welded to the metal carrier 1 while being pressed against the metal carrier, stable and good welded parts can be obtained.

Figure 53:
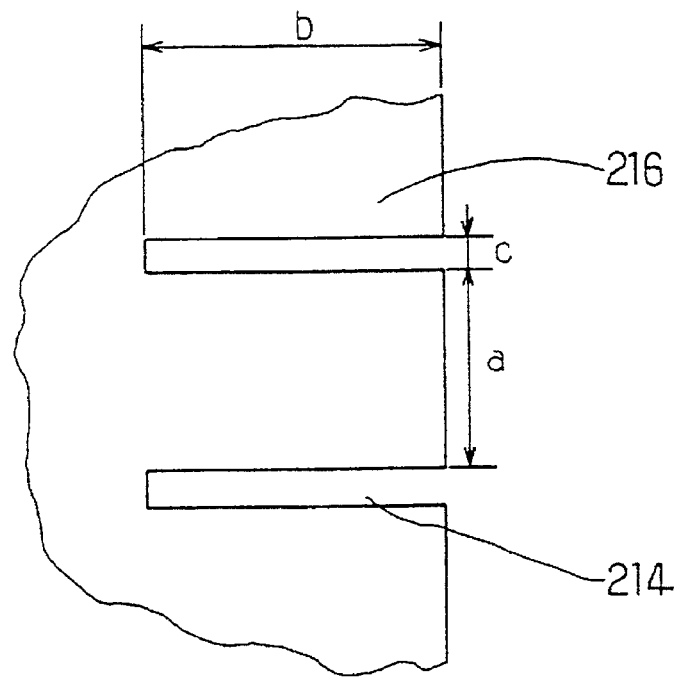
FIG. 53 is an illustrative view illustrating the eleventh embodiment.

Incidentally, for effective utilization of the deflection of the strip parts 216, the length of the strip parts 216, b, should preferably be equal to or larger than a (FIG. 53).

What is more, when the metal carrier 1 is forcedly fit into the outer ring 212, the strip parts 216 of the outer ring 212 deflects. This deflection generates pressing force against the metal carrier 1, and whereby good welded places of the metal carrier 1 and outer ring 212 can be obtained.

Figure 54:
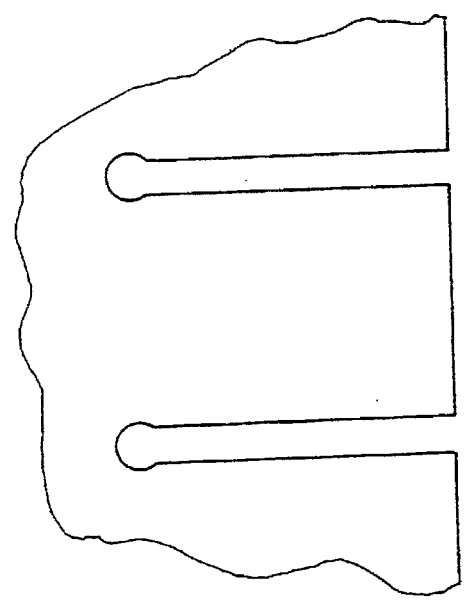
FIG. 54 is a fragmentary enlarged view illustrating another cutout shape of the eleventh embodiment.
Figure 55:
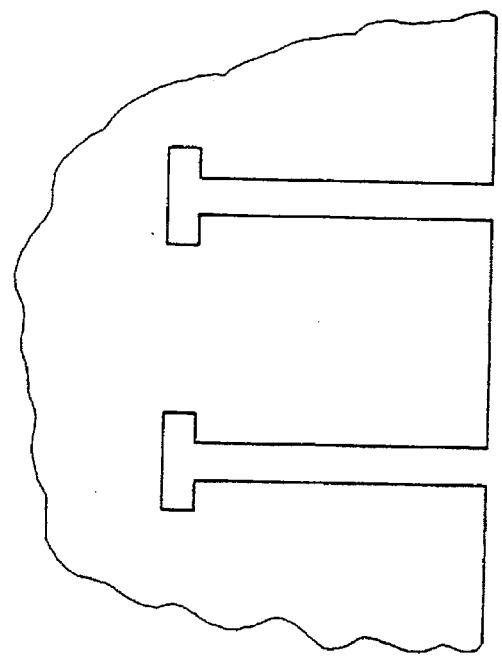
FIG. 55 is a fragmentary enlarged view illustrating another cutout shape of the eleventh embodiment.
Figure 56:
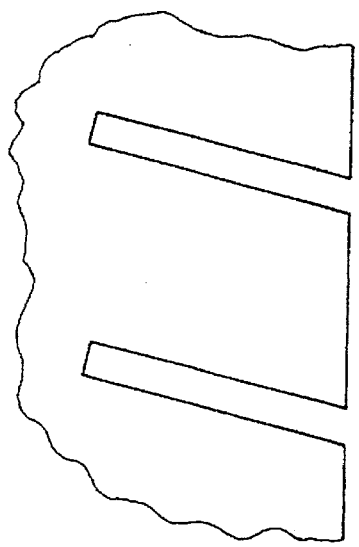
FIG. 56 is a fragmentary enlarged view illustrating another cutout shape of the eleventh embodiment.

In the above embodiment, though the cutout parts 214 are simply shaped into slits, the cutout parts 214 is not limited to this shape but may be composed as illustrated in FIGS. 54 through 56. Incidentally, in FIG. 56, though cutouts extend askew with respect to the axial direction, the cutouts may be curved with respect to the axial direction.

Figure 57:
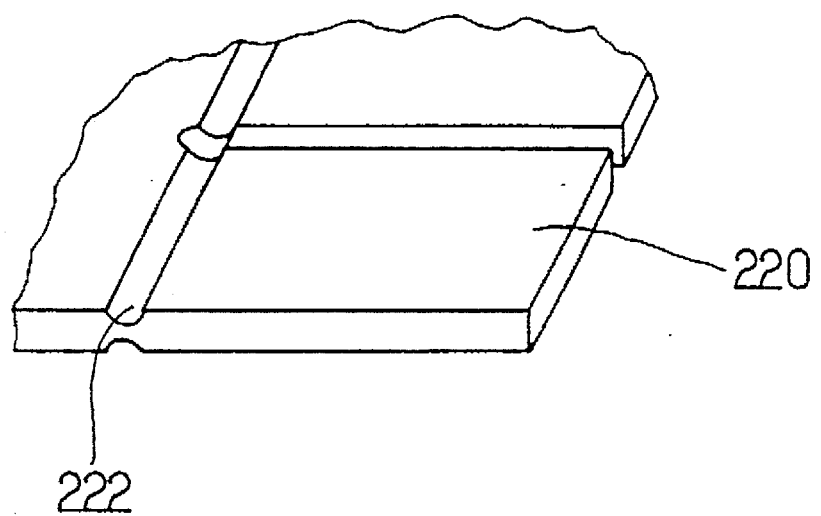
FIG. 57 is a fragmentary enlarged view illustrating another cutout shape of the eleventh embodiment.

In FIG. 57, cutouts 222 are formed at the root parts of the strip parts 220 in the thickness direction. This arrangement can also obtain the same effects as the above.

Twelfth Embodiment

In the sixth embodiment, the catalyst converter 120 is obtained by forcedly fitting the metal carrier 1 into the outer ring 121 and then welding the metal carrier 1 to the outer ring 121. At this time, the outer ring 121 is provided with the flange 125 for fixing the catalyst converter 120 within the housing 130.

In the twelfth embodiment, however, a method of fixing the catalyst converter 120 within the housing 130 without providing a flange on the outer ring 232 will be described.

Figure 58:
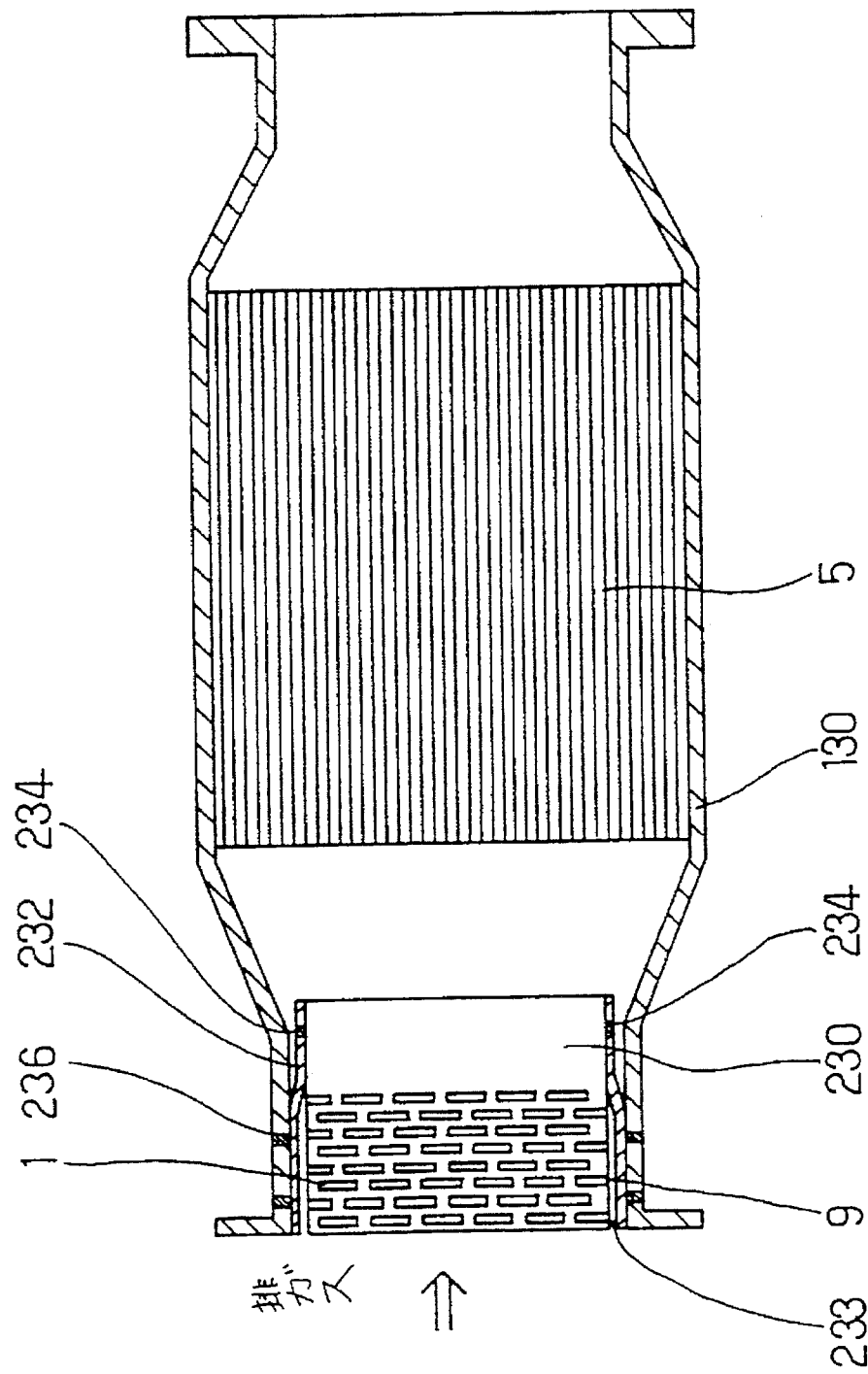
FIG. 58 is a cross-sectional view illustrating the catalyst converter of the twelfth embodiment.

The catalyst converter 230 of the twelfth embodiment is illustrated in FIG. 58. In FIG. 58, numeral 5 denotes a start catalyst fixed within the housing 130. The catalyst converter 230 of the twelfth embodiment is composed of the metal carrier 1 which is formed by an alternating winding of a flat sheet and a corrugated sheet and a flangeless outer ring 232.

Both the flat sheet and corrugated sheet of the metal carrier 1 are provided with the slit parts 9 at the upstream side of the exhaust gas passage of the metal carrier 1 as described in the description of the sixth embodiment.

On the other hand, at the downstream side of the exhaust gas passage of the metal carrier 1, the outer ring 232 is connected to the metal carrier 1 by welding at the connecting places 234.

Furthermore, at the upstream side of the exhaust gas passage of the outer ring 232, the outer ring 232 is in opposition to the metal carrier 1 with a space part 233 therebetween.

The outer ring 232 and the housing 130 are connected to each other within the range in the axial direction where the space part 233 is formed at one or more the connecting points 236 on the inner wall of the housing 130 and the outer surface of the outer ring 232 by applying completely circumferential welding or partial welding.

That is, the catalyst converter 230 is fixed within the housing 130 at the connecting parts 236.

Now, the functions of the space parts 233 provided particularly at the upstream side of the exhaust gas passage between the metal carrier 1 and the outer ring 232 will be described.

By providing the space part 233, the heat generated in welding the housing 130 and the outer ring 232 passes through outer ring 232 and reaches the metal carrier 1.

For example, when the outer ring 232 is connected to the housing 130 by welding, the welding heat can not directly affect the metal carrier 1 by providing the space part 233. Therefore, the catalyst held by the metal carrier can be protected from damage and degradation in the welding process.

Furthermore, as the catalyst converter 230 can be welded to the housing 130, the catalyst converter 230 can easily be positioned with respect to the housing 130.

Moreover, as there is no need to provide any flange to the outer ring 232, the number of parts can be reduced.

In addition to the above, the space part 233 can control heat radiation from the metal carrier 1 in the radial direction when applied to actual vehicles, and rapid temperature rise and activation in cold starting can be achieved.

Thirteenth Embodiment

Figure 59:
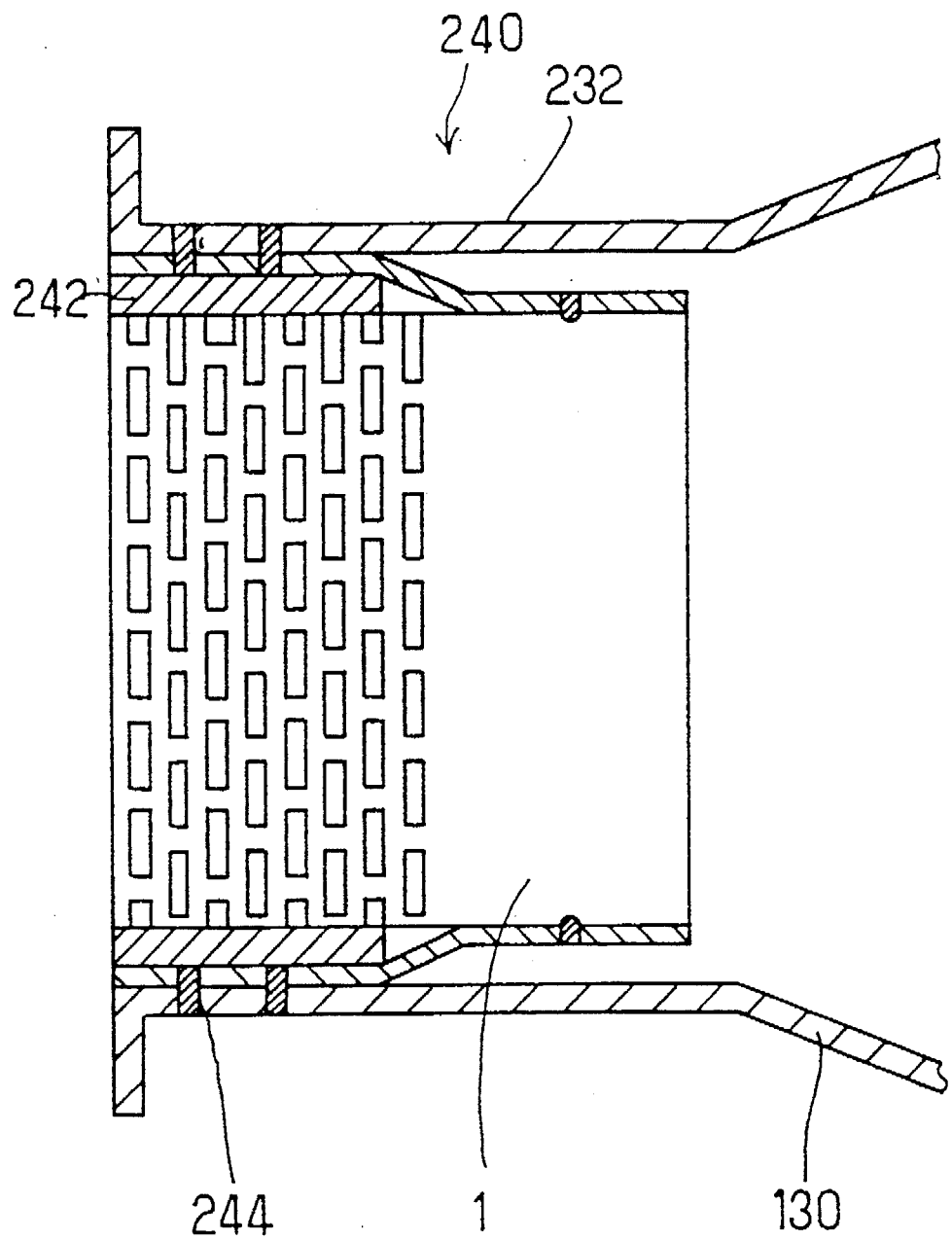
FIG. 59 is a cross-sectional view illustrating the catalyst converter of the thirteenth embodiment.

FIG. 59 illustrates the catalyst converter 240 of the thirteenth embodiment. In a catalyst converter 240 of the thirteenth embodiment, a heat insulation layer is formed by providing a heat insulation material 242 in a space formed between the metal carrier 1 and outer ring 232 of the catalyst converter 240 of the twelfth embodiment.

The heat insulation material 242 is provided on part of or the whole of the outer periphery of the slit parts 9 of the metal carrier 1.

By providing the heat insulation material 242, the direct conduction of the heat generated by welding at the connecting places 244 of the outer ring 232 and housing 130 to the metal carrier 1 can be prevented.

Furthermore, the vibration due to the cantilevering of the metal carrier 1 caused by vibration when applied to vehicles can be controlled, and consequently the durability of the metal carrier 1 can be improved.

Fourteenth Embodiment

In FIG. 58, by reducing the diameter of the outer ring 232 at the downstream side of the exhaust gas passage, the space part 233 is provided between the outer ring 232 and the metal carrier 1.

Figure 60:
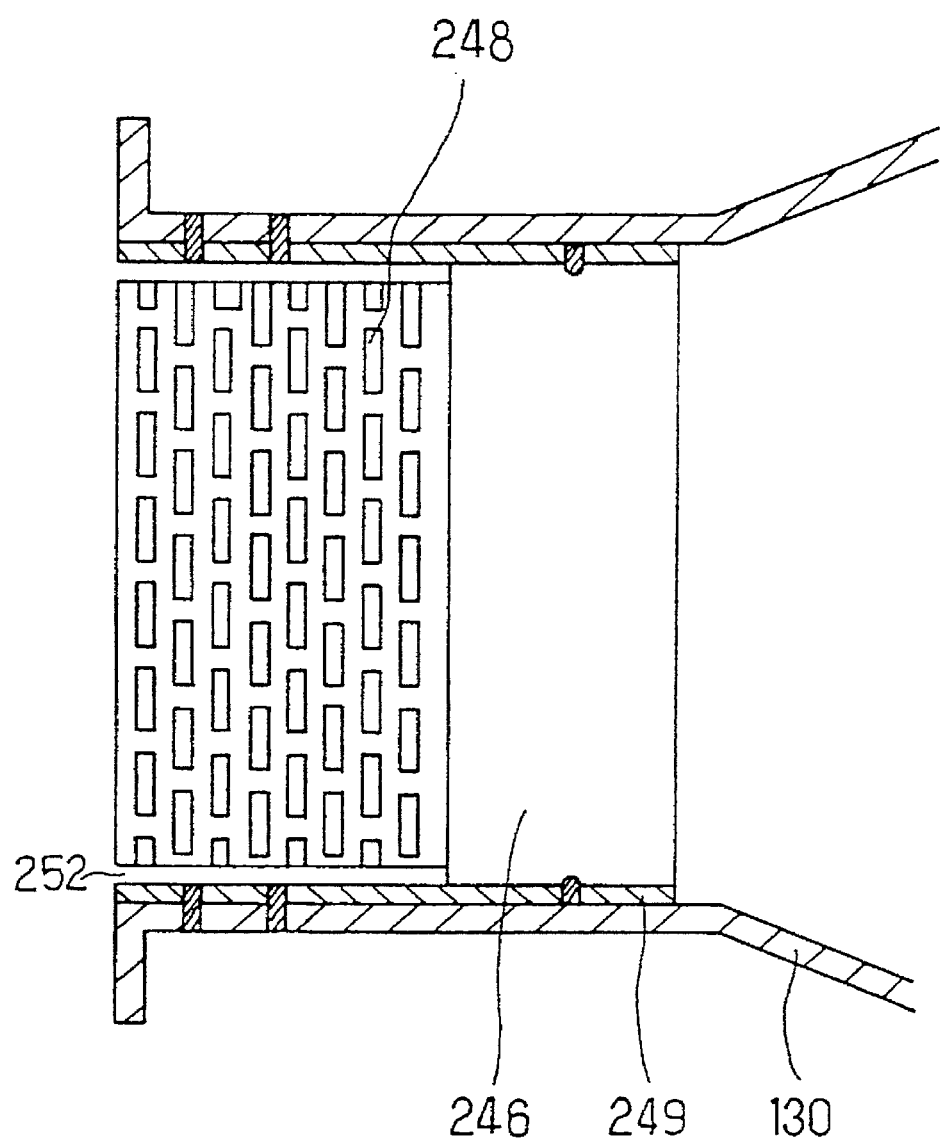
FIG. 60 is a cross-sectional view illustrating the catalyst converter of the fourteenth embodiment.

As is the case with the metal carrier 246 illustrated in FIG. 60, however, compared with the diameter of the metal carrier 246 where slit parts 248 are formed, the diameter thereof where the slit part 248 are not formed may be arranged larger.

At the side where the slit parts 248 are not formed, the metal carrier 246 is forcedly fix into an outer ring 249 and then welded thereto. As a result, a space part 252 is formed between the outer ring 249 and the metal carrier 246 by the difference in diameter between the part where the slit parts 248 are formed and the part where the slip part 248 are not formed.

As described in the above, a space part 252 may be provided by making the outer ring 249 simply cylindrical and the shape of the metal carrier 246 changed.

That is, it may be so arranged that, in welding the metal carrier to the flange of the outer ring, the welding heat can be prevented from conducting to the metal carrier.

As described in the above, in the twelfth, thirteenth and fourteenth embodiments, the space part or the insulating material is provided between the metal carrier and the outer ring.

Fifteenth Embodiment

Figure 61:
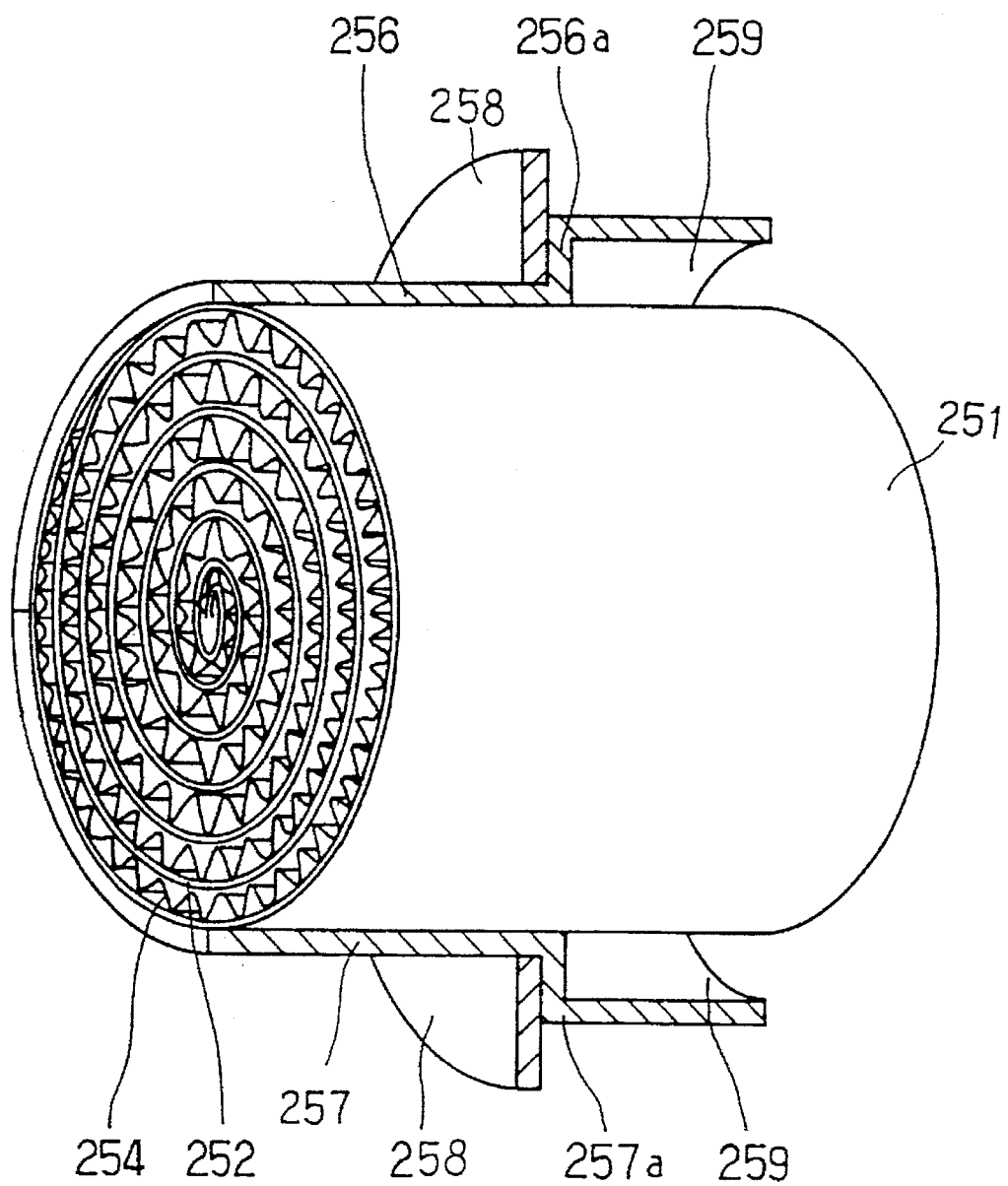
FIG. 61 is a fragmentary sectional view illustrating the metal carrier of the fifteenth embodiment.

FIG. 61 is a cross-sectional view illustrating the catalyst converter 250 of the fifteenth embodiment.

The catalyst converter 250 is composed of a metal carrier 251, an outer rings 256 and 257 for fixedly holding back the metal carrier 251, and a ring 258 for fixing the outer rings 256 and 257.

The metal carrier 251 is an iron (Fe) based alloy and a ferrite type heat resistant steel including of chrome (Cr,18 to 24 wt %), aluminum (Al, 4.5 to 5.5 wt %) and rare earth metal elements (REM, 0.1 to 0.2 wt %). The metal carrier 251 is formed into honeycomb by alternatingly winding one or more pairs of a flat sheet 252 of several μm in thickness and a corrugated sheet 254 shaped into corrugation from the flat sheet 252. Furthermore, the flat sheet 252 and the corrugated sheet 254 adjacent to each other are connected to each other by means of brazing, resistance welding, laser welding or electrical discharge welding. The metal carrier 251 is provided with catalyst holdback by means of γ-coat or other and catalyst purification ability.

Next, the outer rings 256 and 257 and the ring 258, which are characteristic parts of the fifteenth embodiment, will be described.

The outer rings 256 and 257 for covering the metal carrier 1 are of split structure.

Furthermore, the outer rings 256 and 257 are provided with step parts 256a and 257a. By forming these step parts 256a and 257a, the metal carrier 251 and the outer rings 256 and 257 contact the outer periphery of the metal carrier 251 only at one side of the metal carrier 251, and the other side of the outer periphery of the metal carrier 251 forms a space part 259 with the outer rings 256 and 257.

The outer rings 256 and 257 are fixedly connected to the metal carrier 251 by means of laser welding or brazing.

The split outer rings 256 and 257 are fixed by the ring 258 which is set on the outer periphery of the split outer rings 256 and 257 in contact with the step parts 256a and 257a.

In the fifteenth embodiment, the inside diameter of the ring 258 is set to be equal to or slightly smaller than the outside diameter which is formed by coupling the split outer rings 256 and 257. Therefore, the outer rings 256 and 257 can be firmly fixed by the ring 258.

Furthermore, the outer rings 256 and 257 are fixed further strongly by means of welding applied to the end surfaces of the outer rings 256 and 257 and the inner periphery of the ring 258.

In the above arrangement, the metal carrier 251, the outer rings 256 and 257 and the ring 258 are integrally combined to form the catalyst converter 250.

On the other hand, welding to be applied to the outer rings 256 and 257 and the ring 258 may be arc welding or laser welding. Furthermore, the clearance between the two pieces of the split outer rings 256 and 257 is closed by means of welding or other.

As the metal carrier 251 is disposed between the outer rings 256 and 257 and then the ring 258 is forcedly fit on the outer rings 256 and 257 from the outer periphery, the positioning of the metal carrier 251 with respect to the outer rings 256 and 257 and the fixation of the metal carrier 251 to the outer rings 256 and 257 at the same time, and therefore, the catalyst converter 250 can easily be obtained.

Moreover, by forming the step parts 256a and 257a on the outer rings 256 and 257, the ring 258 can easily be positioned.

What is more, by splitting the outer ring into the outer rings 256 and 257, the metal carrier 251 can easily be housed within the outer rings 256 and 257 without applying an extra shrinking stress, such as forcedly fitting. For this reason, the durability of the metal carrier 251 can be improved.

Still more, as the positioning of the metal carrier 251 with respect to the outer rings 256 and 267 can easily be made, the housing of the metal carrier 251 can easily be made, as well.

In addition, the ring 258 for the catalyst converter 250 may also be used as a flange.

Figure 62:
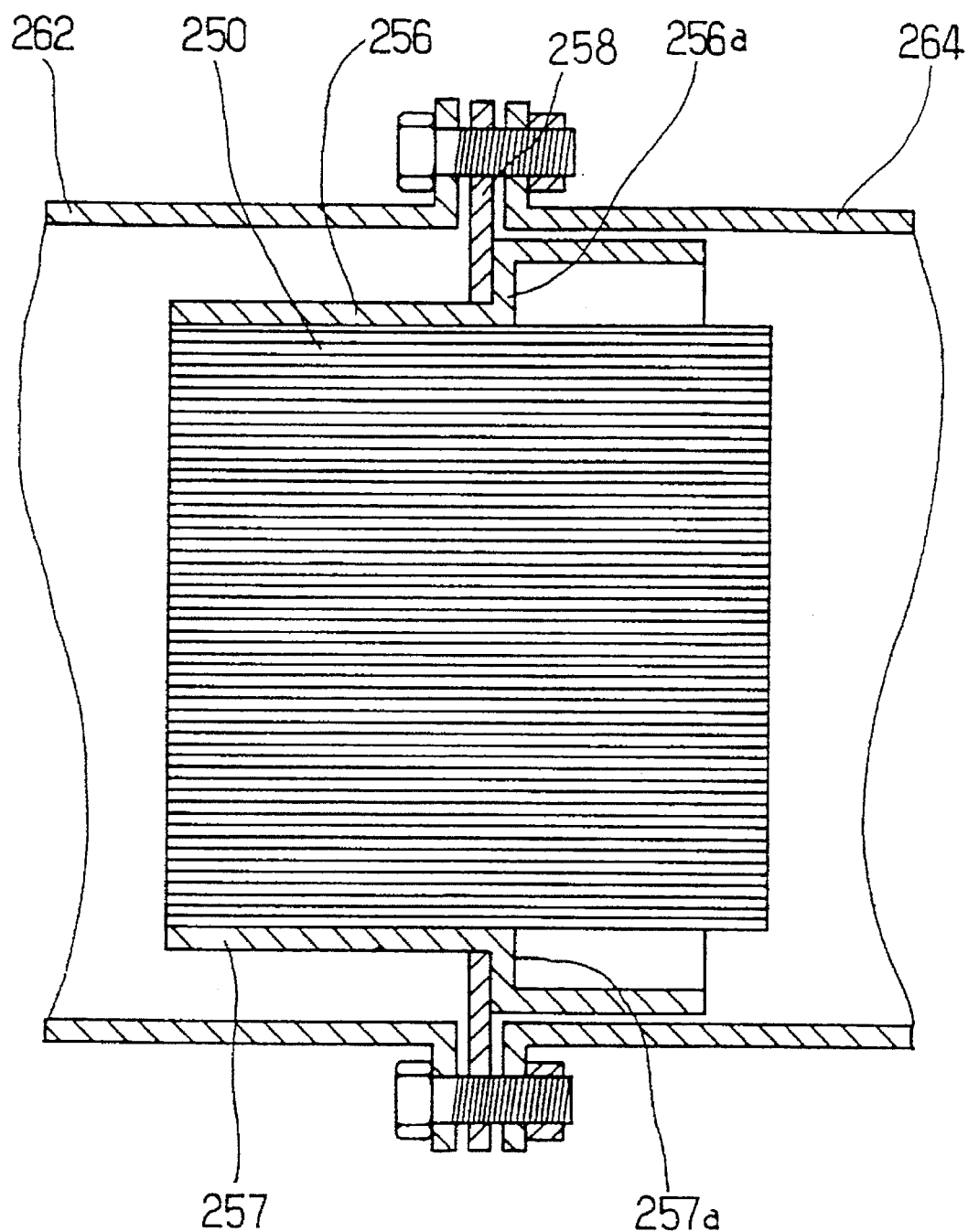
FIG. 62 is a cross-sectional view illustrating the mounting of the metal carrier of the fifteenth embodiment.

Specifically, as illustrated in FIG. 62, the ring 258 may be placed in some place between exhaust manifolds 262 and 264 or in front of another catalyst converter (not illustrated). By arranging in this way, the catalyst converter 250 of the fifteenth embodiment can be installed without changing the composition of the exhaust manifolds 262 and 264 and another catalyst converter.

Sixteenth Embodiment

In the fifteenth embodiment, the outer rings composing the catalyst converter 250 are composed of the upper and lower split outer rings 256 and 257, and the clearance between the split outer rings 256 and 257 is closed by welding or other means.

Figure 63:
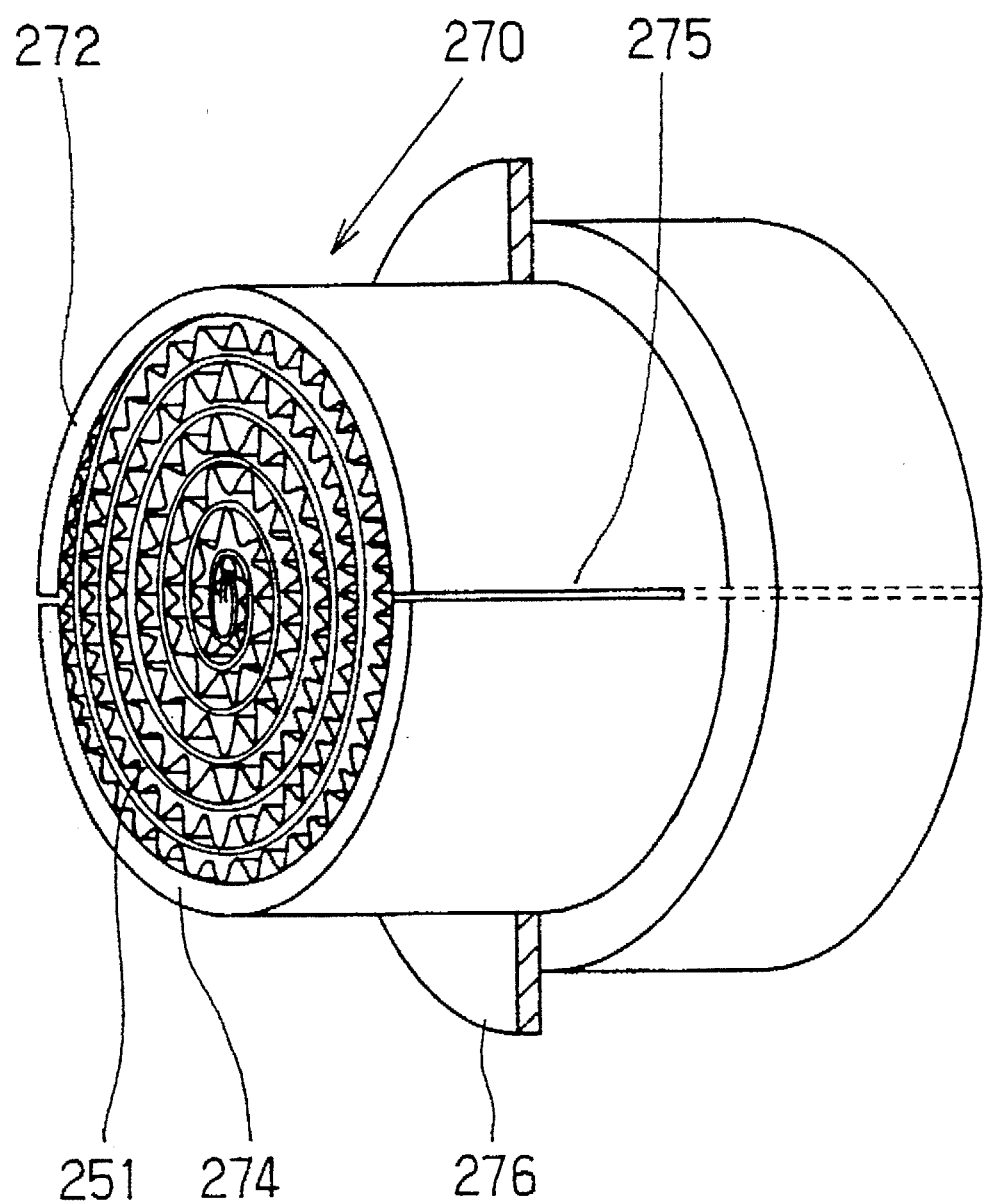
FIG. 63 is a fragmentary sectional view illustrating the metal carrier of the sixteenth embodiment.
Figure 64:
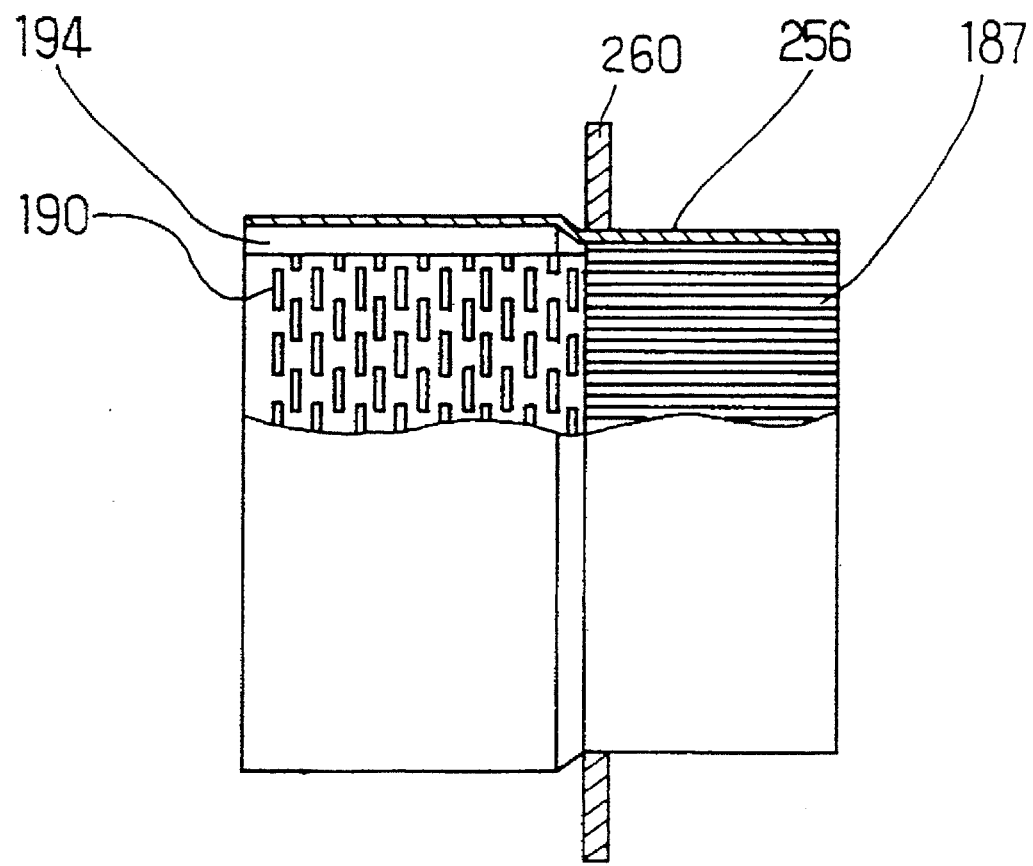

However, in the sixteenth embodiment, this clearance is slightly left. The catalyst converter 270 of the sixteenth embodiment is illustrated in FIG. 63.

In the catalyst converter 270, a clearance part 275 is formed at the connecting surface of outer rings 272 and 274 for fixedly holding back the metal carrier 251.

This clearance part 275 is formed to such an extent that the gas including the exhaust gas passing through the catalyst converter 270 can not be leaked from the clearance part 275 when such gas passes therethrough.

Then, these outer rings 272 and 274 are fixed by a ring 276.

According to the sixteenth embodiment, when the reaction heat is generated by the catalyst held by the metal carrier 251 when high-temperature gas, such as exhaust gas, flows into the metal carrier 251, and even if, for example, the metal carrier 251 sustains thermal expansion, the thermal stress caused between the metal carrier 251 and the outer rings 272 and 274 can be reduced by forming the clearance part 275 between the outer rings 272 and 274 so that the clearance part 275 can be push apart wider.

Furthermore, in fixing the metal carrier 251 to the outer rings 272 and 274 by welding, the clearance or deformation to be caused by welding strain can be prevented, and problems, such as defective welding, can be solved.

In the fifteenth and sixteenth embodiments, though the ring is used for the fixation to the exhaust manifold, direct welding to the exhaust manifold may be employed instead or a flange-like ring may be formed at both ends.

In addition, in the above embodiments, the metal carrier is obtained by alternatingly winding the flat sheet and the corrugated sheet. However, these embodiments are not limited to this method but the metal carrier may be of lamination type simply laminating the flat sheet and the corrugated sheet alternatingly.

Moreover, for the metal carrier according to the fifteenth and sixteenth embodiments, the metal carrier 1 described in the description of the first embodiment may be employed, and the metal carrier 187 according to the tenth embodiment may also be employed.

In the above first to sixteenth embodiments, it is so arranged that the temperature of the metal carrier according to the present invention is rapidly be raised by not electrically continuing the metal carrier to promote the activation of the catalyst.

However, the metal carrier according to the present invention is not to be employed only for the catalyst converter which is to be used without electrically continuing, but may be so arranged that the metal carrier is electrically continued to be better catalyst converter with better temperature rise characteristics.

Specifically, the metal carrier may be electrically continued from the downstream side of the exhaust gas passage to the upstream side thereof.

What is claimed is:

1. A metal carrier for cleaning an exhaust gas and arranged in the course of an exhaust gas passage of an internal combustion engine, comprising:

at least one flat metal sheet; and at least one corrugated metal sheet superimposed with said flat metal sheet one over the other and defining a plurality of axial gas passages to allow an exhaust gas to flow axially from an upstream side to a downstream side of said gas passages, said flat metal sheet and said corrugated metal sheet each having an upstream portion and a downstream portion;

wherein both said flat metal sheet and said corrugated metal sheet have slit parts formed from through-holes which are defined solely in said upstream portions of said flat sheet and of said corrugated sheet.

2. The metal carrier according to claim 1, wherein at least one of said flat metal sheet and said corrugated metal sheet holds a catalyst thereon.

3. The metal carrier according to claim 2, wherein said through-holes formed in said flat sheet are different in shape from said through-holes formed in said corrugated sheet.

4. The metal carrier according to claim 1, wherein at least one of said flat sheet and said corrugated sheet has non-slit parts in which no slits have been formed, at said the upstream side of said gas passages and which extends along said gas passages.

5. The metal carrier according to claim 1, wherein the flat sheet and the corrugated sheet are wound together so that said corrugated sheet defines an outerperiphery of said metal carrier.

6. A catalytic converter for cleaning an exhaust gas and arranged in the course of an exhaust gas passage of an internal combustion engine, comprising:

a metal carrier including:
      at least one flat metal sheet; and
      at least one corrugated metal sheet superimposed with said flat metal sheet one over the other and defining a plurality of axial gas passages to allow an exhaust gas to flow axially from an upstream side to a downstream side of said gas passages, said flat metal sheet and said corrugated metal sheet each having an upstream portion and a downstream portion;

wherein both said flat metal sheet and said corrugated sheet have slit parts formed from through-holes which are defined solely in said upstream portions of said flat sheet and of said corrugated sheet; and an outer ring for fixedly holding said metal carrier, said outer ring connecting with said metal carrier at the downstream side of said gas passages and having a space with said metal carrier at the upstream side of said gas passages.

7. The catalytic converter according to claim 6, further comprising an insulation material disposed in said space between said metal carrier and said outer ring.

8. The catalytic converter according to claim 6, wherein the flat sheet and the corrugated sheet are wound together so that said corrugated sheet defines an outerperiphery of said metal carrier.

9. The catalytic converter according to claim 6, wherein said outer ring is divided into at least two parts along an axis of said metal carrier.

10. The catalytic converter according to claim 6, wherein said outer ring has slit parts formed from through-holes at one end thereof.

11. The catalytic converter according to claim 9, wherein said outer ring has a flange extending perpendicularly to the axis of said metal carrier and formed at an outerperiphery of said outer ring for mounting to an exhaust gas passage.

12. A metal carrier for cleaning an exhaust gas and arranged in the course of an exhaust gas passage of an internal combustion engine, comprising:

at least one flat metal sheet; and at least one corrugated metal sheet superimposed with said flat metal sheet one over the other and defining a plurality of axial gas passages to allow an exhaust gas to flow axially from an upstream side to a downstream side of said gas passages; said flat metal sheet and said corrugated metal sheet each having an upstream portion and a downstream portion;

wherein both said flat metal sheet and said corrugated metal sheet have slit parts formed from through-holes which are defined solely in said upstream portion of said flat sheet and of said corrugated sheet, said through-holes being disposed in an area limited to about 18% to 52% of the width of said two metal sheets.

* * * * *

UNITED STATES PATENT AND TRADEMARK OFFICE
CERTIFICATE OF CORRECTION

PATENT NO. : 5,648,050
DATED : JULY 15, 1997
INVENTOR(S) : MATSUMOTO ET AL

It is certified that error appears in the above-identified patent and that said Letters Patent is hereby corrected as shown below:

ON THE TITLE PAGE:

Item: [30]    Foreign Application Priority Data
      Dec. 24, 1993 [JP]   Japan   ..................5-350447"

should be

--[30]    Foreign Application Priority Data
      Dec. 27, 1993 [JP]   Japan   ..................5-350447--

Signed and Sealed this

Twenty-seventh Day of January, 1998

Attest:

BRUCE LEHMAN

Attesting Officer      Commissioner of Patents and Trademarks